US012097482B2

(12) United States Patent
Sheludko et al.

(10) Patent No.: US 12,097,482 B2
(45) Date of Patent: *Sep. 24, 2024

(54) SYSTEMS AND METHODS FOR PROCESSING AMMONIA

(71) Applicant: AMOGY Inc., Brooklyn, NY (US)

(72) Inventors: Boris Sheludko, Brooklyn, NY (US); Junyoung Cha, Brooklyn, NY (US); Young Suk Jo, Brooklyn, NY (US)

(73) Assignee: AMOGY, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,388

(22) Filed: Apr. 11, 2023

(65) Prior Publication Data

US 2024/0066501 A1 Feb. 29, 2024

Related U.S. Application Data

(63) Continuation of application No. 17/886,219, filed on Aug. 11, 2022, now Pat. No. 11,697,108, which is a continuation of application No. PCT/US2022/033088, filed on Jun. 10, 2022.

(60) Provisional application No. 63/257,904, filed on Oct. 20, 2021, provisional application No. 63/209,530, filed on Jun. 11, 2021.

(51) Int. Cl.
| | |
|---|---|
| *B01J 23/10* | (2006.01) |
| *B01J 21/04* | (2006.01) |
| *B01J 23/00* | (2006.01) |
| *B01J 23/46* | (2006.01) |
| *B01J 23/63* | (2006.01) |
| *B01J 35/00* | (2024.01) |
| *B01J 37/02* | (2006.01) |
| *B01J 37/08* | (2006.01) |
| *C01B 3/04* | (2006.01) |

(52) U.S. Cl.
CPC .............. *B01J 23/10* (2013.01); *B01J 21/04* (2013.01); *B01J 23/002* (2013.01); *B01J 23/462* (2013.01); *B01J 23/63* (2013.01); *B01J 35/19* (2024.01); *B01J 37/0205* (2013.01); *B01J 37/0209* (2013.01); *B01J 37/08* (2013.01); *C01B 3/047* (2013.01); *B01J 2523/13* (2013.01); *B01J 2523/14* (2013.01); *B01J 2523/15* (2013.01); *B01J 2523/31* (2013.01); *B01J 2523/3706* (2013.01); *B01J 2523/3712* (2013.01); *B01J 2523/48* (2013.01); *B01J 2523/821* (2013.01); *C01B 2203/0277* (2013.01); *C01B 2203/066* (2013.01); *C01B 2203/1082* (2013.01); *C01B 2203/1094* (2013.01)

(58) Field of Classification Search
CPC ........ B01J 23/10; B01J 23/002; B01J 23/462; B01J 21/04; B01J 35/19; B01J 37/0205; B01J 37/0209; B01J 37/08; C01B 3/047
See application file for complete search history.

(56) References Cited

U.S. PATENT DOCUMENTS

| | | | |
|---|---|---|---|
| 2,601,221 | A | 6/1952 | Rosenblatt et al. |
| 3,689,042 | A | 9/1972 | Pere et al. |
| 4,155,986 | A | 5/1979 | Gladden |
| 5,055,282 | A | 10/1991 | Shikada et al. |
| 5,912,198 | A | 6/1999 | Feitelberg et al. |
| 6,350,540 | B1 | 2/2002 | Sugita et al. |
| 6,555,084 | B2 | 4/2003 | Ohtsuka |
| 6,936,363 | B2 | 8/2005 | Kordesch et al. |
| 6,984,750 | B2 | 1/2006 | Chaturvedi et al. |
| 7,071,239 | B2 | 7/2006 | Ortego, Jr. et al. |
| 7,157,166 | B2 | 1/2007 | Vajo |
| 7,160,360 | B2 | 1/2007 | Wu et al. |
| 7,220,699 | B2 | 5/2007 | Chellappa |
| 7,276,214 | B2 | 10/2007 | Johnston et al. |
| 7,282,467 | B2 | 10/2007 | Huisman et al. |
| 7,294,425 | B2 | 11/2007 | Hodge et al. |
| 7,374,838 | B2 | 5/2008 | Gallagher |
| 7,439,273 | B2 | 10/2008 | Woods et al. |

(Continued)

FOREIGN PATENT DOCUMENTS

| | | |
|---|---|---|
| AU | 2020267318 A1 | 6/2021 |
| CA | 2676027 A1 | 8/2008 |

(Continued)

OTHER PUBLICATIONS

Sima et al., International J of Hydrogen Energy, (2020), v45, p. 9342-9352.*

(Continued)

*Primary Examiner* — Yong L Chu
(74) *Attorney, Agent, or Firm* — Wilson Sonsini Goodrich & Rosati

(57) ABSTRACT

The present disclosure provides methods for fabricating catalysts for ammonia decomposition. The method may comprise (a) subjecting a catalyst support to one or more physical or chemical processes to optimize one or more pores, morphologies, and/or surface chemistry or property of the catalyst support; (b) depositing a composite support material on the catalyst support, wherein the composite support material comprises a morphology or surface chemistry or property; and (c) depositing one or more active metals on at least one of the composite support material and the catalyst support, wherein the one or more active metals comprise one or more nanoparticles configured to conform to the morphology of the composite support material and/or catalyst support material, thereby optimizing one or more active sites on the nanoparticles for ammonia processing.

15 Claims, 43 Drawing Sheets

(56) References Cited

U.S. PATENT DOCUMENTS

| | | |
|---|---|---|
| 7,569,294 B2 | 8/2009 | Graham et al. |
| 7,662,435 B2 | 2/2010 | Chellappa et al. |
| 7,670,587 B2 | 3/2010 | Porter et al. |
| 7,731,918 B2 | 6/2010 | Chellappa |
| 7,763,086 B2 | 7/2010 | Woods et al. |
| 7,803,496 B2 | 9/2010 | Koyama et al. |
| 7,862,631 B2 | 1/2011 | Burch et al. |
| 8,043,767 B2 | 10/2011 | Benson |
| 8,166,926 B2 | 5/2012 | Sasaki et al. |
| 8,440,357 B2 | 5/2013 | Hossain et al. |
| 8,617,265 B2 | 12/2013 | Chellappa |
| 8,664,148 B2 | 3/2014 | Brey et al. |
| 8,795,918 B2 | 8/2014 | Shimomura |
| 8,877,407 B2 | 11/2014 | Akiyama |
| 8,900,420 B2 | 12/2014 | Veeraraghavan et al. |
| 8,916,300 B2 | 12/2014 | McElroy et al. |
| 8,921,000 B2 | 12/2014 | Takeshita et al. |
| 8,932,773 B2 | 1/2015 | Nakanishi et al. |
| 8,961,923 B2 | 2/2015 | Grannell et al. |
| 9,023,542 B2 | 5/2015 | Kaneko et al. |
| 9,105,891 B2 | 8/2015 | Nagaosa |
| 9,163,541 B2 | 10/2015 | Kumagai et al. |
| 9,172,106 B2 | 10/2015 | Berning |
| 9,187,321 B2 | 11/2015 | Fuse et al. |
| 9,236,624 B2 | 1/2016 | Page et al. |
| 9,341,111 B2 | 5/2016 | Hikazudani et al. |
| 9,359,270 B2 | 6/2016 | Daly et al. |
| 9,359,271 B2 | 6/2016 | LeViness et al. |
| 9,506,400 B2 | 11/2016 | Tange et al. |
| 9,670,063 B2 | 6/2017 | David et al. |
| 9,737,869 B2 | 8/2017 | Kamata et al. |
| 9,819,040 B2 | 11/2017 | Littau |
| 9,861,951 B2 | 1/2018 | Vu |
| 9,884,770 B2 | 2/2018 | Takeshima |
| 9,896,332 B2 | 2/2018 | Hikazudani et al. |
| 9,958,211 B2 | 5/2018 | Vernon |
| 10,166,526 B2 | 1/2019 | Hamada et al. |
| 10,322,940 B2 | 6/2019 | Hosono et al. |
| 10,449,506 B2 | 10/2019 | Kamata et al. |
| 10,450,192 B2 | 10/2019 | Finkelshtain et al. |
| 10,478,805 B2 | 11/2019 | Hinokuma et al. |
| 10,596,551 B2 | 3/2020 | Sharma et al. |
| 10,830,125 B2 | 11/2020 | Pomar |
| 10,875,002 B2 | 12/2020 | Patel et al. |
| 10,906,804 B2 | 2/2021 | Li et al. |
| 10,914,212 B1 | 2/2021 | Bargman et al. |
| 10,919,025 B2 | 2/2021 | Li et al. |
| 10,961,890 B2 | 3/2021 | Sung et al. |
| 11,014,809 B2 | 5/2021 | Miura |
| 11,038,181 B2 | 6/2021 | Kandlikar |
| 11,065,591 B2 | 7/2021 | Speth et al. |
| 11,084,012 B2 | 8/2021 | Jiang et al. |
| 11,084,719 B2 | 8/2021 | Andersen et al. |
| 11,110,434 B2 | 9/2021 | Jiang et al. |
| 11,117,809 B2 | 9/2021 | Hojlund Nielsen |
| 11,148,955 B2 | 10/2021 | Gorval et al. |
| 11,149,662 B2 | 10/2021 | Heggen |
| 11,156,168 B2 | 10/2021 | Nose et al. |
| 11,161,739 B2 | 11/2021 | Gray |
| 11,167,732 B1 | 11/2021 | Cohen et al. |
| 11,287,089 B1 | 3/2022 | Cohen et al. |
| 11,305,250 B2 | 4/2022 | Verykios et al. |
| 11,309,568 B2 | 4/2022 | Achrai et al. |
| 11,374,246 B2 | 6/2022 | Luo et al. |
| 11,437,637 B2 | 9/2022 | Ikemoto et al. |
| 11,465,114 B2 | 10/2022 | Jo et al. |
| 11,539,063 B1 | 12/2022 | Choi et al. |
| 11,697,108 B2 * | 7/2023 | Sheludko ............... B01J 35/19 502/304 |
| 11,724,245 B2 | 8/2023 | Jo et al. |
| 11,764,381 B2 | 9/2023 | Choi et al. |
| 11,769,893 B2 | 9/2023 | Choi et al. |
| 11,795,055 B1 * | 10/2023 | Sheludko ............... B01J 23/44 |
| 2002/0028171 A1 | 3/2002 | Goetsch et al. |
| 2003/0015093 A1 | 1/2003 | Wegeng et al. |
| 2003/0189037 A1 | 10/2003 | Kochman et al. |
| 2005/0281735 A1 | 12/2005 | Chellappa et al. |
| 2006/0048808 A1 | 3/2006 | Ruckman et al. |
| 2006/0112636 A1 | 6/2006 | Chellappa et al. |
| 2006/0121322 A1 | 6/2006 | Haas et al. |
| 2007/0190389 A1 | 8/2007 | Hinsenkamp et al. |
| 2007/0221060 A1 | 9/2007 | Song |
| 2007/0254204 A1 | 11/2007 | Shin et al. |
| 2008/0145733 A1 | 6/2008 | Asazawa et al. |
| 2008/0171255 A1 | 7/2008 | Brantley et al. |
| 2010/0060404 A1 | 3/2010 | Raiser et al. |
| 2011/0136027 A1 | 6/2011 | Chen et al. |
| 2012/0088168 A1 | 4/2012 | Pledger |
| 2012/0121488 A1 | 5/2012 | Comrie |
| 2013/0140295 A1 | 6/2013 | Yoshioka et al. |
| 2013/0156687 A1 | 6/2013 | Araki et al. |
| 2013/0189603 A1 | 7/2013 | Sakamoto et al. |
| 2014/0005041 A1 | 1/2014 | Jia et al. |
| 2014/0154163 A1 | 6/2014 | Andersen et al. |
| 2014/0287911 A1 | 9/2014 | Wang et al. |
| 2014/0356738 A1 | 12/2014 | Bell et al. |
| 2016/0167962 A1 | 6/2016 | Hikazudani et al. |
| 2016/0339387 A1 | 11/2016 | Ikoma et al. |
| 2017/0070088 A1 | 3/2017 | Berntsen et al. |
| 2017/0087541 A1 | 3/2017 | Andersen et al. |
| 2018/0015443 A1 | 1/2018 | Finkelshtain et al. |
| 2020/0032676 A1 | 1/2020 | Nose et al. |
| 2020/0062590 A1 | 2/2020 | McCullough et al. |
| 2020/0099072 A1 | 3/2020 | Ikemoto et al. |
| 2020/0123006 A1 | 4/2020 | Speth et al. |
| 2020/0197889 A1 | 6/2020 | Jo et al. |
| 2020/0266469 A1 | 8/2020 | Kojima et al. |
| 2020/0269208 A1 | 8/2020 | Way et al. |
| 2020/0346937 A1 | 11/2020 | Beach et al. |
| 2020/0388869 A1 | 12/2020 | Galbiati |
| 2020/0398240 A1 | 12/2020 | Jiang et al. |
| 2020/0403258 A1 | 12/2020 | Luo et al. |
| 2021/0001311 A1 | 1/2021 | Wu et al. |
| 2021/0113983 A1 | 4/2021 | Mortensen et al. |
| 2021/0178377 A1 | 6/2021 | Khatiwada et al. |
| 2021/0178378 A1 | 6/2021 | Khatiwada et al. |
| 2021/0234179 A1 | 7/2021 | Klein et al. |
| 2021/0237046 A1 | 8/2021 | Gascon et al. |
| 2021/0245139 A1 | 8/2021 | Seabaugh et al. |
| 2021/0395082 A1 | 12/2021 | Iwai |
| 2021/0395101 A1 | 12/2021 | Giddey et al. |
| 2021/0395883 A1 | 12/2021 | Dip |
| 2022/0002151 A1 | 1/2022 | Katikaneni et al. |
| 2022/0090576 A1 | 3/2022 | Sia |
| 2022/0119250 A1 | 4/2022 | Shin et al. |
| 2022/0154646 A1 | 5/2022 | Araki et al. |
| 2022/0158202 A1 | 5/2022 | Nishibayashi et al. |
| 2022/0162490 A1 | 5/2022 | Jo et al. |
| 2022/0162989 A1 | 5/2022 | Cocks et al. |
| 2022/0162999 A1 | 5/2022 | Cocks et al. |
| 2022/0163002 A1 | 5/2022 | Takeuchi |
| 2022/0195919 A1 | 6/2022 | Akbari et al. |
| 2022/0205415 A1 | 6/2022 | Takeuchi et al. |
| 2022/0212172 A1 | 7/2022 | Song et al. |
| 2022/0234886 A1 | 7/2022 | Yamazaki et al. |
| 2022/0347644 A1 | 11/2022 | Jo et al. |
| 2022/0362748 A1 | 11/2022 | Jo et al. |
| 2022/0364505 A1 | 11/2022 | Kim et al. |
| 2022/0389864 A1 | 12/2022 | Jo et al. |
| 2022/0395810 A1 | 12/2022 | Sheludko et al. |
| 2022/0395812 A1 | 12/2022 | Sheludko et al. |
| 2022/0403775 A1 | 12/2022 | Jo et al. |
| 2023/0001377 A1 | 1/2023 | Jo et al. |
| 2023/0053230 A1 | 2/2023 | Jo et al. |
| 2023/0053549 A1 | 2/2023 | Choi et al. |
| 2023/0055180 A1 | 2/2023 | Choi et al. |
| 2023/0055949 A1 | 2/2023 | Choi et al. |
| 2023/0118083 A1 | 4/2023 | Jo et al. |
| 2023/0123946 A1 | 4/2023 | Mann |

FOREIGN PATENT DOCUMENTS

| | | |
|---|---|---|
| CA | 3132213 A1 | 9/2020 |
| CN | 1946470 A | 4/2007 |

(56) References Cited

FOREIGN PATENT DOCUMENTS

| | | |
|---|---|---|
| CN | 101172575 A | 5/2008 |
| CN | 106517092 A | 3/2017 |
| CN | 110265688 A | 9/2019 |
| CN | 210528460 U | 5/2020 |
| CN | 111332447 A | 6/2020 |
| CN | 210973870 U | 7/2020 |
| CN | 112901339 A | 6/2021 |
| CN | 113048469 A | 6/2021 |
| CN | 113058595 A | 7/2021 |
| CN | 113058610 A | 7/2021 |
| CN | 113074046 A | 7/2021 |
| CN | 113181957 A | 7/2021 |
| CN | 213651846 U | 7/2021 |
| CN | 213726378 U | 7/2021 |
| CN | 213738601 U | 7/2021 |
| CN | 113198476 A | 8/2021 |
| CN | 113202660 A | 8/2021 |
| CN | 113289693 A | 8/2021 |
| CN | 213943062 U | 8/2021 |
| CN | 213976966 U | 8/2021 |
| CN | 214059903 U | 8/2021 |
| CN | 214060653 U | 8/2021 |
| CN | 113332987 A | 9/2021 |
| CN | 113363545 A | 9/2021 |
| CN | 113451615 A | 9/2021 |
| CN | 113540541 A | 10/2021 |
| CN | 214399815 U | 10/2021 |
| CN | 214406970 U | 10/2021 |
| CN | 214406981 U | 10/2021 |
| CN | 214486811 U | 10/2021 |
| CN | 113604813 A | 11/2021 |
| CN | 113666334 A | 11/2021 |
| CN | 113694922 A | 11/2021 |
| CN | 214611516 U | 11/2021 |
| CN | 214716493 U | 11/2021 |
| CN | 214753865 U | 11/2021 |
| CN | 214880199 U | 11/2021 |
| CN | 214959115 U | 11/2021 |
| CN | 214959751 U | 11/2021 |
| CN | 113775924 A | 12/2021 |
| CN | 113788134 A | 12/2021 |
| CN | 113864783 A | 12/2021 |
| CN | 214990264 U | 12/2021 |
| CN | 215002336 U | 12/2021 |
| CN | 215066412 U | 12/2021 |
| CN | 215364901 U | 12/2021 |
| CN | 113896168 A | 1/2022 |
| CN | 215578650 U | 1/2022 |
| CN | 215592611 U | 1/2022 |
| DE | 102017011833 A1 | 6/2019 |
| DK | 201900097 U3 | 3/2020 |
| EP | 2070141 B1 | 12/2012 |
| EP | 2774202 B1 | 8/2015 |
| EP | 1868941 B9 | 2/2017 |
| EP | 3028990 B1 | 8/2017 |
| EP | 3059206 B1 | 8/2017 |
| EP | 3258524 A1 | 12/2017 |
| EP | 2715847 B1 | 1/2019 |
| EP | 3448803 A1 | 3/2019 |
| EP | 3632543 A1 | 4/2020 |
| EP | 2332646 B1 | 7/2020 |
| EP | 3409354 B1 | 9/2021 |
| EP | 3878806 A1 | 9/2021 |
| EP | 3015164 B1 | 2/2022 |
| EP | 3981054 A1 | 4/2022 |
| EP | 3981739 A1 | 4/2022 |
| EP | 4017947 A1 | 6/2022 |
| IN | 394309 B | 4/2022 |
| JP | H11253759 A | 9/1999 |
| JP | 2005145748 A | 6/2005 |
| JP | 3940551 B2 | 7/2007 |
| JP | 2008153091 A | 7/2008 |
| JP | 2009035458 A | 2/2009 |
| JP | 2010195642 A | 9/2010 |
| JP | 4666301 B2 | 4/2011 |
| JP | 2012005926 A | 1/2012 |
| JP | 5263677 B2 | 8/2013 |
| JP | 5272762 B2 | 8/2013 |
| JP | 5272767 B2 | 8/2013 |
| JP | 5321230 B2 | 10/2013 |
| JP | 5346693 B2 | 11/2013 |
| JP | 5352343 B2 | 11/2013 |
| JP | 5371542 B2 | 12/2013 |
| JP | 5380233 B2 | 1/2014 |
| JP | 5389525 B2 | 1/2014 |
| JP | 5426201 B2 | 2/2014 |
| JP | 5430224 B2 | 2/2014 |
| JP | 5755160 B2 | 7/2015 |
| JP | 5810710 B2 | 11/2015 |
| JP | 5811494 B2 | 11/2015 |
| JP | 2016131065 A | 7/2016 |
| JP | 2016198720 A | 12/2016 |
| JP | 6308844 B2 | 4/2018 |
| JP | 2018076214 A | 5/2018 |
| JP | 6381131 B2 | 8/2018 |
| JP | 6482022 B2 | 3/2019 |
| JP | 2019053854 A | 4/2019 |
| JP | 2019177381 A | 10/2019 |
| JP | 6604501 B2 | 11/2019 |
| JP | 2020040860 A | 3/2020 |
| JP | WO2018221701 A1 | 4/2020 |
| JP | 6706277 B2 | 6/2020 |
| JP | 6778370 B2 | 11/2020 |
| JP | 6789080 B2 | 11/2020 |
| JP | 2020183337 A | 11/2020 |
| JP | 2020196646 A | 12/2020 |
| JP | 2020197169 A | 12/2020 |
| JP | 6850449 B2 | 3/2021 |
| JP | 6866570 B2 | 4/2021 |
| JP | 2021095300 A | 6/2021 |
| JP | 2021110463 A | 8/2021 |
| JP | 6929045 B2 | 9/2021 |
| JP | 6938186 B2 | 9/2021 |
| JP | 2021127861 A | 9/2021 |
| JP | 2021128904 A | 9/2021 |
| JP | 2021130100 A | 9/2021 |
| JP | 2021161006 A | 10/2021 |
| JP | 2021161921 A | 10/2021 |
| JP | 2021173232 A | 11/2021 |
| JP | 6996181 B2 | 2/2022 |
| JP | 7036318 B2 | 3/2022 |
| JP | 7074103 B2 | 5/2022 |
| JP | 7076930 B2 | 5/2022 |
| JP | 7079068 B2 | 6/2022 |
| KR | 20040039951 A | 5/2004 |
| KR | 101173456 B1 | 8/2012 |
| KR | 101388755 B1 | 4/2014 |
| KR | 101689356 B1 | 12/2016 |
| KR | 101768078 B1 | 8/2017 |
| KR | 102159237 B1 | 9/2020 |
| KR | 102174654 B1 | 11/2020 |
| KR | 102219136 B1 | 2/2021 |
| KR | 102247199 B1 | 5/2021 |
| KR | 102254196 B1 | 5/2021 |
| KR | 102256907 B1 | 5/2021 |
| KR | 102303094 B1 | 9/2021 |
| KR | 102304381 B1 | 9/2021 |
| KR | 102304406 B1 | 9/2021 |
| KR | 102309466 B1 | 10/2021 |
| KR | 102315763 B1 | 10/2021 |
| KR | 20210136381 A | 11/2021 |
| KR | 102335322 B1 | 12/2021 |
| KR | 20220005829 A | 1/2022 |
| KR | 102392578 B1 | 5/2022 |
| KR | 20220057717 A | 5/2022 |
| KR | 20220093960 A | 7/2022 |
| KR | 20220094475 A | 7/2022 |
| NL | 2017963 B1 | 6/2018 |
| TW | 1274604 B | 3/2007 |
| WO | WO-9840311 A1 | 9/1998 |
| WO | WO-0183108 A1 | 11/2001 |
| WO | WO-0187770 A1 | 11/2001 |
| WO | WO-0208117 A1 | 1/2002 |
| WO | WO-02071451 A2 | 9/2002 |

(56) References Cited

FOREIGN PATENT DOCUMENTS

| | | |
|---|---|---|
| WO | WO-02086987 A2 | 10/2002 |
| WO | WO-2005091418 A2 | 9/2005 |
| WO | WO-2005099885 A1 | 10/2005 |
| WO | WO-2006113451 A2 | 10/2006 |
| WO | WO-2006134419 A2 | 12/2006 |
| WO | WO-2007119262 A2 | 10/2007 |
| WO | WO-2008024089 A2 | 2/2008 |
| WO | WO-2008088319 A2 | 7/2008 |
| WO | WO-2009098452 A2 | 8/2009 |
| WO | WO-2009116679 A1 | 9/2009 |
| WO | WO-2010116874 A3 | 4/2011 |
| WO | WO-2011107279 A1 | 9/2011 |
| WO | WO-2012039183 A1 | 3/2012 |
| WO | WO-2013057473 A1 | 4/2013 |
| WO | WO-2013063169 A1 | 5/2013 |
| WO | WO-2013122849 A1 | 8/2013 |
| WO | WO-2013142123 A1 | 9/2013 |
| WO | WO-2014054277 A1 | 4/2014 |
| WO | WO-2015044691 A1 | 4/2015 |
| WO | WO-2015074127 A1 | 5/2015 |
| WO | WO-2016013652 A1 | 1/2016 |
| WO | WO-2016051633 A1 | 4/2016 |
| WO | WO-2017099143 A1 | 6/2017 |
| WO | WO-2017186614 A1 | 11/2017 |
| WO | WO-2018185663 A1 | 10/2018 |
| WO | WO-2018198635 A1 | 11/2018 |
| WO | WO-2019032591 A1 | 2/2019 |
| WO | WO-2019038251 A1 | 2/2019 |
| WO | WO-2021063795 A1 | 4/2021 |
| WO | WO-2021156626 A1 | 8/2021 |
| WO | WO-2021168226 A1 | 8/2021 |
| WO | WO-2021172545 A1 | 9/2021 |
| WO | WO-2021177359 A1 | 9/2021 |
| WO | WO-2021221943 A1 | 11/2021 |
| WO | WO-2021225254 A1 | 11/2021 |
| WO | WO-2021228428 A1 | 11/2021 |
| WO | WO-2021241841 A1 | 12/2021 |
| WO | WO-2021260108 A1 | 12/2021 |
| WO | WO-2022010178 A1 | 1/2022 |
| WO | WO-2022055225 A1 | 3/2022 |
| WO | WO-2021257944 A9 | 4/2022 |
| WO | WO-2022070597 A1 | 4/2022 |
| WO | WO-2022076341 A1 | 4/2022 |
| WO | WO-2022079435 A1 | 4/2022 |
| WO | WO-2022106568 A1 | 5/2022 |
| WO | WO-2022119376 A1 | 6/2022 |
| WO | WO-2022129294 A1 | 6/2022 |
| WO | WO-2022153059 A1 | 7/2022 |
| WO | WO-2022153060 A1 | 7/2022 |
| WO | WO-2022153061 A1 | 7/2022 |
| WO | WO-2022153718 A1 | 7/2022 |
| WO | WO-2022153719 A1 | 7/2022 |
| WO | WO-2022153720 A1 | 7/2022 |
| WO | WO-2022241260 A1 | 11/2022 |
| WO | WO-2022261488 A1 | 12/2022 |
| WO | WO-2023022995 A1 | 2/2023 |

OTHER PUBLICATIONS

Co-pending U.S. Appl. No. 17/974,885, inventors Jo; Young Suk et al., filed Oct. 27, 2022.
Co-pending U.S. Appl. No. 17/974,997, inventors Jo; Young Suk et al., filed Oct. 27, 2022.
Co-pending U.S. Appl. No. 17/975,184, inventors Jo; Young Suk et al., filed Oct. 27, 2022.
Co-pending U.S. Appl. No. 18/065,915, inventors Sheludko; Boris et al., filed Dec. 14, 2022.
Co-pending U.S. Appl. No. 18/066,163, inventors Sheludko; Boris et al., filed Dec. 14, 2022.
Gallucci, M. The Ammonia Solution: Ammonia engines and fuel cells in cargo ships could slash their carbon emissions. IEEE Spectrum. 58(3): 44-50. Mar. 2021. doi: 10.1109/MSPEC.2021.9370109.
Hansgen, et al. Using first principles to predict bimetallic catalysts for the ammonia decomposition reaction. Nat Chem. Jun. 2010;2(6):484-489. doi: 10.1038/nchem.626. Epub Apr. 25, 2010.
International search report with written opinion dated Sep. 21, 2022 for PCT/US2022/029264.
International search report with written opinion dated Oct. 18, 2022 for PCT/US2022/033088.
Kumar S. Heat Exchanger—Types, Working, Construction. https://marinerspoint.in/working-of-heatexchanger/2020/11/, Nov. 4, 2020, 9 pages.
Notice of Allowance dated Mar. 1, 2023 for U.S. Appl. No. 18/065,915.
Notice of Allowance dated Aug. 11, 2022 for U.S. Appl. No. 17/589,287.
Notice of Allowance dated Sep. 14, 2022 for U.S. Appl. No. 17/589,287.
Office action dated Feb. 16, 2023 for U.S. Appl. No. 18/066,163.
Office action dated Jun. 2, 2022 for U.S. Appl. No. 17/589,287.
Co-pending U.S. Appl. No. 18/214,424, inventors Choi; Jongwon et al., filed Jun. 26, 2023.
Co-pending U.S. Appl. No. 18/454,638, inventors Jo; Young Suk et al., filed Aug. 23, 2023.
Co-pending U.S. Appl. No. 18/454,692, inventors Jo; Young Suk et al., filed Aug. 23, 2023.
Notice of Allowance dated Jun. 28, 2023 for U.S. Appl. No. 18/065,915.
Notice of Allowance dated Sep. 1, 2023 for U.S. Appl. No. 18/066,163.
Notice of Allowance dated Feb. 27, 2023 for U.S. Appl. No. 17/886,219.
Notice of Allowance dated Apr. 6, 2023 for U.S. Appl. No. 17/886,219.
Office action dated Jan. 24, 2023 for U.S. Appl. No. 17/886,219.

* cited by examiner

RE-Al$_2$O$_3$ Elemental Composition

| Sample | wt% Ru | wt% RE1 |
|---|---|---|
| 2Ru/15La-θ-Al2O3 | 0.8 | 8.8 |
| 2Ru/15Pr-θ-Al2O3 | 1.1 | 10.4 |
| 2Ru/15Nd-θ-Al$_2$O$_3$ | 3.4 | 21.5 |
| 2Ru/15Sm-θ-Al$_2$O$_3$ | 3.0 | 19.4 |
| 2Ru/15Eu-θ-Al$_2$O$_3$ | | |
| 2Ru/15Gd-θ-Al$_2$O$_3$ | 3.3 | 20.1 |
| 2Ru/15Tb-θ-Al$_2$O$_3$ | 2.6 | 19.7 |
| 2Ru/15Dy-θ-Al$_2$O$_3$ | 2.3 | 16.2 |
| 2Ru/15Ho-θ-Al$_2$O$_3$ | 3.1 | 20.1 |
| 2Ru/15Er-θ-Al$_2$O$_3$ | 2.8 | 21.9 |
| 2Ru/15Tm-θ-Al$_2$O$_3$ | 2.5 | 17.1 |
| 2Ru/15Yb-θ-Al$_2$O$_3$ | | |
| 2Ru/15Lu-θ-Al$_2$O$_3$ | 4.0 | 22.4 |
| 2Ru/15Y-θ-Al$_2$O$_3$ | | |
| 2Ru/15Sc-θ-Al$_2$O$_3$ | | |

*Elemental Composition determined via XRF

FIG. 19

| Catalyst | Metal Loading (%) | GHSV (mL$_{NH_3}$ g$_{cat}^{-1}$ hr$^{-1}$) | Temperature (°C) | Rate (mmol$_{H_2}$ g$_{cat}^{-1}$ min$^{-1}$) | Rate (mol$_{H_2}$ mol$_{M}^{-1}$ hr$^{-1}$) |
|---|---|---|---|---|---|
| Ru/K-10Ce-ZrO$_2$ | 1.43 | 21,283 | 450 | 13.8 | 5,842 |
| Ru/La-ZrO$_2$ | 3 | 30,000 | 450 | 25.4 | 5,143 |
| Ru-K/CNTs | 5 | 30,000 | 450 | 32.6 | 3,951 |
| Ru/CNTs | 5 | 30,000 | 450 | 14.8 | 1,775 |
| Ru-K/MCM-41 | 5 | 36,000 | 450 | 20.4 | 2,473 |
| Ru-K/Fumed SiO$_2$ | 5 | 36,000 | 450 | 16.4 | 1,990 |
| Ru/MgO-OP | 2.1 | 30,000 | 450 | 13.9 | 4,014 |
| Ru/Rb-Y | 1.98 | 30,000 | 450 | 7.7 | 1,885 |
| Ru/Mg-Al-LDO | 4.6 | 30,000 | 450 | 14.3 | 1,536 |
| Ru/Al$_2$O$_3$ | 4.6 | 30,000 | 450 | 11.7 | 2,383 |
| Ru/ZrO$_2$ | 5 | 30,000 | 450 | 8.3 | 1,007 |

*FIG. 21B*

SYSTEMS AND METHODS FOR PROCESSING AMMONIA

CROSS REFERENCE

This application is a continuation of U.S. patent application Ser. No. 17/886,219 filed Aug. 11, 2022, now U.S. Pat. No. 11,697,108, which is a continuation of International Patent Application No. PCT/US2022/033088, filed Jun. 10, 2022, which in turn claims the benefit of U.S. Provisional Application No. 63/257,904 filed Oct. 20, 2021, and U.S. Provisional Application No. 63/209,530 filed Jun. 11, 2021, each of which is incorporated herein by reference in the entirety for all purposes.

BACKGROUND

Various systems may be operated using a fuel source. The fuel source may have a specific energy corresponding to an amount of energy stored or extractable per unit mass of fuel. The fuel source may be provided to the various systems to enable such systems to generate energy and/or deliver power (e.g., for movement or transportation purposes).

SUMMARY

Hydrogen can be leveraged as a clean energy source to power various systems. Hydrogen can provide a distinct advantage over other types of fuel such as diesel, gasoline, or jet fuel, which have specific energies of about 45 megajoules per kilogram (MJ/kg) (heat), or lithium-ion batteries, which have a specific energy of about 0.95 MJ/kg (electrical). In contrast, hydrogen has a specific energy of over 140 MJ/kg (heat). As such, 1 kg of hydrogen can provide the same amount of energy as about 3 kg of gasoline or kerosene. Thus, hydrogen as a fuel source can help to reduce the amount of fuel (by mass) needed to provide a comparable amount of energy as other traditional sources of fuel. Further, systems that use hydrogen as a fuel source (e.g., as a combustion reactant) generally produce benign or nontoxic byproducts such as water while producing minimal or near zero harmful emissions such as carbon dioxide or nitrous oxide emissions, thereby reducing the environmental impacts of various systems (e.g., modes of transportation) that use hydrogen as a fuel source.

Recognized herein are various limitations with conventional catalysts used to extract hydrogen from ammonia (e.g., through an ammonia decomposition process or reaction). Ammonia decomposition may also be referred to as ammonia cracking, ammonia reforming, or ammonia dissociation. Ammonia decomposition can be a highly structure-dependent reaction, and the ability to control the morphology and/or the physical or chemical properties of the active metal nanoparticles used to decompose ammonia molecules may be limited when using conventional catalyst fabrication methods. As such, optimal use of active metal nanoparticles is difficult, and conventional catalysts often comprise a higher than optimal active metal nanoparticle content. Further, the nanoparticles may not be highly dispersed, which can reduce the efficiency of the catalyst. Conventional catalysts may also exhibit low heat transfer rates, which is undesirable for endothermic ammonia decomposition reactions. Conventional catalysts may also lack stability at high temperatures, in the presence of impurities in industrial grade ammonia, or under mechanical perturbations, and may not be able to withstand harsh reaction conditions or maintain the necessary physical and chemical properties needed to optimally crack ammonia. Some conventional catalysts may comprise bead, extrudate or pellet type catalyst supports, but when catalyst materials are compressed into these form factors, the inside materials of the pellet may not be fully utilized, which can be wasteful and inefficient. As used herein, the morphology of the active metal nanoparticle support may correspond to a size, shape, aspect ratio, pore structure, pore size, pore shape, pore volume, pore density, pore size distribution, grain structure, grain size, grain shape, crystal structure, flake size, or layered structure of the one or more active metal nanoparticles. As used herein, the physical or chemical property of the active metal nanoparticles may comprise a size, a size distribution, an aspect ratio, a facet distribution, an Arrhenius acidity or basicity, a Lewis acidity or basicity, or a hydrophilicity or hydrophobicity of the one or more active metal nanoparticles.

The present disclosure provides systems and methods for addressing at least the abovementioned shortcomings noted for conventional catalysts. Some embodiments of the present disclosure are directed to optimized catalyst materials, related systems and methods for fabricating such optimized catalyst materials, and methods of using such optimized catalyst materials. The optimized catalyst materials may exhibit an optimal morphology and/or physical or chemical property for the active metal nanoparticles used to facilitate ammonia decomposition. The physical or chemical property may comprise a surface chemistry or property of the one or more active metal nanoparticles. The optimized catalyst materials may also exhibit an optimal level of dispersion of the active metal nanoparticles. The optimized catalyst materials may further maintain favorable physical and chemical properties under harsh reaction conditions, and may exhibit high thermal stability and optimal heat transfer rates to enable efficient endothermic ammonia decomposition reactions.

The present disclosure further provides methods for fabricating catalysts comprising an optimized material composition, active metal nanoparticle morphology, surface chemistry or property, and/or support-metal interactions. The fabrication methods disclosed herein may be implemented to produce catalyst materials with high thermal stability and optimized heat transfer characteristics. The catalyst materials produced using the methods of the present disclosure can be used to decompose ammonia efficiently at lower reaction temperatures for a longer duration, compared to conventional catalysts, and may extract a greater amount of hydrogen per unit weight or volume of ammonia while using a lower concentration of active metals (e.g., lower ruthenium contents).

The present disclosure further provides one or more catalysts for processing ammonia. The one or more catalysts may comprise, for example, an optimized pore structure and active metal nanoparticle morphology and/or surface chemistry or property. The catalyst materials of the present disclosure may have high thermal stability and optimized heat transfer characteristics. The catalyst materials may be used to decompose ammonia efficiently at lower reaction temperatures, and may extract a greater amount of hydrogen per unit weight or volume of ammonia while using a lower concentration of active metals. In some cases, for the same amount of catalyst material used, more hydrogen may be produced. In some cases, the hydrogen may be produced at lower reaction temperatures.

In one aspect, the present disclosure provides a method of fabricating a catalyst for ammonia processing or decomposition, comprising: (a) providing a catalyst support; (b) thermally, chemically, physically, or electrochemically processing the catalyst support to alter a pore characteristic of the catalyst support; (c) depositing a composite support material on the catalyst support, wherein the composite support material comprises a morphology or a surface chemistry or property; and (d) depositing one or more active metals on at least one of the composite support material and the catalyst support, wherein the one or more active metals comprise one or more nanoparticles configured to conform to the morphology or the surface chemistry or property of the composite support material when subjected to a thermal or chemical treatment, thereby optimizing one or more active sites on the nanoparticles for ammonia processing or decomposition.

In some embodiments, the morphology comprises a pore structure, a pore size, a pore shape, a pore volume, a pore density, a pore size distribution, a grain structure, a grain size, a grain shape, a crystal structure, a flake size, or a layered structure. In some embodiments, the surface chemistry or property comprises an elemental composition, an Arrhenius acidity or basicity, a Lewis acidity or basicity, a surface hydroxyl group density, or a hydrophilicity or hydrophobicity. In some embodiments, thermally, chemically, physically, or electrochemically processing the catalyst support comprises subjecting the catalyst support to one or more thermal, chemical, physical, or electrochemical processes or treatments to optimize one or more pores or a surface chemistry or property of the catalyst support. In some embodiments, optimizing the one or more pores comprises (i) modifying a size of the one or more pores, (ii) modifying a pore volume of the catalyst support, (iii) modifying the pore size distribution or (iv) modifying a pore density of the catalyst support. In some embodiments, optimizing the surface chemistry or property comprises modifying (i) an Arrhenius acidity or basicity, (ii) a Lewis acidity or basicity, (iii) a surface hydroxyl group density, or (iv) a surface hydrophilicity or hydrophobicity.

In some embodiments, the composite support material is deposited using physical vapor deposition or chemical vapor deposition. In some embodiments, the morphology or the surface chemistry or property of the composite support material conforms to a morphology or a surface chemistry or property of the catalyst support. In some embodiments, the one or more active metals are deposited using physical vapor deposition or chemical vapor deposition. In some embodiments, the method may further comprise thermally or chemically activating the one or more active metals. In some embodiments, thermally, physically, chemically, or electrochemically activating the one or more active metals induces a growth of one or more nanoparticles of the active metals. In some embodiments, the one or more nanoparticles are configured to grow while conforming to the morphology or the surface chemistry or property of the composite support material when thermally, physically, electrochemically, or chemically activated. In some embodiments, the method may further comprise combining the catalyst with one or more promoters to modify or optimize a morphology, an active site, an electron density, an Arrhenius acidity or basicity, a Lewis acidity or basicity, or an electron state of the catalyst.

In some embodiments, the one or more promoters comprise sodium (Na), potassium (K), rubidium (Rb), cesium (Cs), magnesium (Mg), calcium (Ca), strontium (Sr), or barium (Ba). In some embodiments, the one or more active metals comprise ruthenium (Ru), nickel (Ni), rhodium (Rh), iridium (Ir), cobalt (Co), molybdenum (Mo), iron (Fe), platinum (Pt), chromium (Cr), palladium (Pd), or copper (Cu). In some embodiments, the catalyst support comprises aluminum oxide ($Al_2O_3$), magnesium oxide (MgO), cerium dioxide ($CeO_2$), silicon dioxide ($SiO_2$), yttrium oxide ($Y_2O_3$), zirconium oxide ($ZrO_2$), one or more zeolites, titanium dioxide ($TiO_2$), lanthanum oxide ($La_2O_3$), chromium oxide ($Cr_2O_3$), or calcium oxide (CaO). In some embodiments, the composite support material comprises a carbon-based material, a boron-based material, or a metal oxide. In some embodiments, the carbon-based material comprises graphite, activated carbon (AC), one or more carbon nanotubes (CNT), one or more carbon nanofibers (CNF), graphene oxide (GO), one or more carbon nanoribbons, or reduced graphene oxide (rGO). In some embodiments, the boron-based material comprises hexagonal boron nitride (hBN), boron nitride nanotubes (BNNT), or boron nitride nanosheets (BNNS). In some embodiments, the metal oxide comprises aluminum oxide ($Al_2O_3$), titanium dioxide ($TiO_2$), magnesium oxide (MgO), lanthanum oxide ($La_2O_3$), cerium dioxide ($CeO_2$), yttrium oxide ($Y_2O_3$), one or more $CeO_2$ nanotubes, nanorods or nanocubes, mesoporous silica, zirconium dioxide ($ZrO_2$), chromium oxide ($Cr_2O_3$), or calcium oxide (CaO). In some embodiments, the composite support material may include yttria-stabilized zirconia (YSZ), hydrotalcite ($Mg_2Al$-LDO), a metal organic framework (MOF) (e.g., MIL-101), a zeolitic imidazolate framework (ZIF), an alkaline amide ($NaNH_2$, $Ca(NH_2)_2$, $Mg(NH_2)_2$), an inorganic electride (e.g., C12A7:e−), Halloysite nanotubes (HNT), $ABO_3$ Perovskite, $AB_2O_4$ Spinel, a mesoporous silicate (e.g., MCM-41), or any combination thereof.

In some embodiments, the method may further comprise thermally, physically, chemically or electrochemically treating a surface of the catalyst support material to optimize a pore structure or a surface chemistry or property of the catalyst support material. In some embodiments, the one or more ammonia molecules are configured to bind or attach to the one or more active sites on the active metals for decomposition of the one or more ammonia molecules. In some embodiments, the positions, orientations, and/or density of the one or more active sites are determined based at least in part on the morphology and/or surface chemistry or property. In some embodiments, the catalyst support comprises a bead, a pellet, a powder, a thin film, a monolith, a foam, a reactor wall, a heating element, one or more wires, a mesh, or a porous solid material form factor. In some embodiments, the pore characteristic comprises a pore structure, a pore size, a pore size distribution, a pore shape, a pore volume, or a pore density. In some embodiments, the method may comprise altering a pore density of the catalyst support. In some embodiments, the method may comprise increasing the pore density of the catalyst support.

In another aspect, the present disclosure provides a catalyst for ammonia processing, comprising: a catalyst support comprising one or more modified pore characteristics generated by thermal, physical, chemical, or electrochemical processing of the catalyst support; a composite support material provided on the catalyst support, wherein the composite support material comprises a morphology or a surface chemistry or property; and one or more active metals provided on or embedded in at least one of the composite support material and the catalyst support, wherein the one or more active metals comprise one or more nanoparticles configured to conform to the morphology or the surface chemistry or property of the composite support material when thermally, physically, chemically or electrochemically activated, thereby optimizing one or more active sites on the nanoparticles for ammonia processing or decomposition.

In some embodiments, the morphology comprises a pore structure, a pore size, a pore shape, a pore volume, a pore density, a pore size distribution, a grain structure, a grain size, a grain shape, a crystal structure, a flake size, or a layered structure. In some embodiments, the surface chemistry or property comprises an Arrhenius acidity or basicity, a Lewis acidity or basicity, a surface hydroxyl group density, a hydrophilicity or hydrophobicity. In some embodiments, the catalyst support comprises one or more properties or characteristics that are optimizable using one or more physical or chemical processes. In some embodiments, the one or more properties or characteristics comprise a morphology or a surface chemistry or property of the catalyst support. In some embodiments, the morphology comprises a pore structure, a pore size, a pore shape, a pore volume, a pore density, a pore size distribution, a grain structure, a grain size, a grain shape, a crystal structure, a flake size, or a layered structure. In some embodiments, the surface chemistry or property comprises an Arrhenius acidity or basicity, a Lewis acidity or basicity, a surface hydroxyl group density, or a hydrophilicity or hydrophobicity. In some embodiments, the composite support material is deposited using physical vapor deposition or chemical vapor deposition. In some embodiments, the morphology or the surface chemistry or property of the composite support material conforms to a morphology or a surface chemistry or property of the catalyst support. In some embodiments, the one or more active metals are deposited using physical vapor deposition or chemical vapor deposition. In some embodiments, the one or more active metals are configured to conform to the morphology or the surface chemistry or property of the composite support material when thermally or chemically activated. In some embodiments, the one or more active metals are configured to grow when thermally, physically, chemically, or electrochemically activated. In some embodiments, the one or more nanoparticles are configured to grow while conforming to the morphology or the surface chemistry or property of the composite support material.

In some embodiments, the catalyst is combined with one or more promoters. In some embodiments, the one or more promoters comprise Na, K, Rb, Cs, Mg, Ca, Sr, or Ba. In some embodiments, the one or more active metals comprise Ru, Ni, Rh, Ir, Co, Mo, Fe, Pt, Cr, Pd, or Cu. In some embodiments, the catalyst support comprises $Al_2O_3$, MgO, $CeO_2$, $SiO_2$, $Y_2O_3$, one or more zeolites, $TiO_2$, or $ZrO_2$. In some embodiments, the composite support comprises a carbon-based material, a boron-based material, or silicon-based material, or a metal oxide. In some embodiments, the carbon-based material comprises graphite, activated carbon (AC), one or more carbon nanotubes (CNT), one or more carbon nanofibers (CNF), graphene oxide (GO), one or more carbon nanoribbons, or reduced graphene oxide (rGO). In some embodiments, the boron-based material comprises hexagonal boron nitride (hBN), boron nitride nanotubes (BNNT), or boron nitride nanosheets (BNNS). In some embodiments, the silicon-based material comprises silicon carbide (SiC), silicon nitride (SiN), or silicon dioxide ($SiO_2$). In some embodiments, the metal oxide comprises $TiO_2$, MgO, $La_2O_3$, $CeO_2$, $Y_2O_3$ one or more $CeO_2$ nanotubes, nanorods, or nanocubes, mesoporous silica, $ZrO_2$, chromium oxide ($Cr_2O_3$), or calcium oxide (CaO). In some embodiments, the support comprises YSZ, Hydrotalcite ($Mg_2Al$-LDO), MOF (MIL-101, ZIFs), an alkaline amide ($NaNH_2$, $Ca(NH_2)_2$, $Mg(NH_2)_2$), $MgAl_2O_4$, $CaAl_2O_4$, $CoAl_2O_4$, an inorganic electride (C12A7:e−), Halloysite nanotubes (HNT), $ABO_3$ Perovskite, $AB_2O_4$ Spinel, MCM-41, or any combination thereof. In some embodiments, the morphology or the surface chemistry or property is generated or optimized by thermally, physically, chemically, or electrochemically treating a surface of the catalyst support material. In some embodiments, the one or more active metal nanoparticles comprise one or more active sites to which one or more ammonia molecules are configured to attach or bind for decomposition of the one or more ammonia molecules. In some embodiments, the positions, orientations, or density of the one or more active sites are determined based at least in part on the morphology or surface chemistry or property. In some embodiments, the catalyst support comprises a bead, a pellet, a powder, a thin film, a monolith, a foam, reactor wall, heating element, wires, mesh, or a porous solid material form factor.

In another aspect, the present disclosure provides a system for fabricating a catalyst for ammonia processing, comprising: a rotatable reaction chamber comprising one or more heating units, wherein the reaction chamber is configured to process one or more catalyst supports to generate one or more optimized catalysts for ammonia processing; and one or more precursor storage chambers in fluid communication with the rotatable reaction chamber, wherein the one or more precursor storage chambers are configured to provide a plurality of precursor materials, wherein the plurality of precursor materials comprise (i) a first precursor material comprising one or more functional materials that provide a platform for nanoparticle growth, (ii) a second precursor material comprising one or more active metal nanoparticles, and (iii) a third precursor material for promoting the one or more active metal nanoparticles.

In some embodiments, the one or more heating units are configured to heat the one or more catalyst supports to optimize one or more characteristics or properties of the one or more catalyst supports. In some embodiments, the one or more characteristics or properties comprise a morphology or a surface chemistry or property. In some embodiments, the one or more characteristics or properties comprise a pore size, a pore density, or a pore volume. In some embodiments, the morphology comprises a pore structure, a pore size, a pore shape, a pore volume, a pore density, a grain structure, a grain size, a grain shape, a crystal structure, a flake size, or a layered structure. In some embodiments, the surface chemistry or property comprises an Arrhenius acidity or basicity, a Lewis acidity or basicity, a surface hydroxyl group density, or a hydrophilicity or hydrophobicity.

In some embodiments, the rotatable reaction chamber comprises one or more inlets for receiving the first precursor material for deposition of a layer of the first precursor material onto a surface of the one or more catalyst supports. In some embodiments, the layer of the first precursor material is deposited using physical vapor deposition or chemical vapor deposition. In some embodiments, a morphology or a surface chemistry or property of the first precursor material conforms to a morphology or a surface chemistry or property of the one or more catalyst supports. In some embodiments, the morphology comprises a pore structure, a pore size, a pore shape, a pore volume, a pore density, a pore size distribution, a grain structure, a grain size, a grain shape, a crystal structure, a flake size, or a layered structure. In some embodiments, the surface chemistry or property comprises an Arrhenius acidity or basicity, a Lewis acidity or basicity, a surface hydroxyl group density, or a hydrophilicity or hydrophobicity.

In some embodiments, the layer of the first precursor material provides a platform for the one or more active metal nanoparticles to grow. In some embodiments, the rotatable reaction chamber is configured to receive a second precursor material for deposition of a layer of the second precursor material onto at least one of (i) the surface of the one or more catalyst supports and (ii) the layer of the first precursor material. In some embodiments, the one or more active metal nanoparticles of the second precursor material are configured to grow on the layer of the first precursor material. In some embodiments, the one or more active metal nanoparticles are configured to grow according to a morphology or a surface chemistry or property of the first precursor material when thermally or chemically activated. In some embodiments, the layer of the second precursor material is deposited using physical vapor deposition, chemical vapor deposition, vacuum vapor deposition, wetness impregnation, or incipient wet impregnation. In some embodiments, the morphology comprises a pore structure, a pore size, a pore shape, a pore volume, a pore density, a pore size distribution, a grain structure, a grain size, a grain shape, a crystal structure, a flake size, or a layered structure. In some embodiments, the surface chemistry or property comprises an Arrhenius acidity or basicity, a Lewis acidity or basicity, a surface hydroxyl group density, or a hydrophilicity or hydrophobicity.

In some embodiments, the rotatable reaction chamber is configured to receive a third precursor material for doping the layer of the first precursor material, the layer of the second precursor material, or for promoting the one or more active metal nanoparticles of the second precursor material. In some embodiments, doping comprises impregnation of one or more dopants in the layer of the first precursor material or in the layer of the second precursor material. In some embodiments, promoting comprises impregnation of one or more promoters in the layer comprising the one or more active metal nanoparticles for morphology modification, active site modification, electron density modification, Arrhenius acidity or basicity modification, Lewis acidity or basicity modification, or electron state modification. In some embodiments, the one or more promoters comprise Na, K, Rb, Cs, Mg, Ca, Sr, or Ba.

In some embodiments, the one or more heating units are configured to heat the catalyst supports comprising (i) the layer of the first precursor material and (ii) the layer of the second precursor material to thermally, physically, chemically or electrochemically activate the one or more active metal nanoparticles to facilitate a growth and a change in the one or more properties or characteristics of the nanoparticles. In some embodiments, the rotatable reaction chamber is configured to provide a reducing environment for thermal or chemical activation of the one or more active metal nanoparticles. In some embodiments, the reducing environment comprises hydrogen or ammonia gas or one or more noble gases. In some embodiments, the one or more active metal nanoparticles comprise Ru, Ni, Rh, Ir, Co, Mo, Fe, Pt, Cr, Pd, or Cu. In some embodiments, the catalyst support comprises $Al_2O_3$, MgO, $CeO_2$, $SiO_2$, $Y_2O_3$, AC, CNT, CNF, GO, rGO, hBN, BNNT, BNNS, SiC, SiN, $MgAl_2O_4$, $CaAl_2O_4$, $CoAl_2O_4$, one or more zeolites, $TiO_2$, or $ZrO_2$. In some embodiments, the one or more functional materials comprise a carbon-based material, a boron-based material, or a metal oxide. In some embodiments, the carbon-based material comprises graphite, activated carbon (AC), one or more carbon nanotubes (CNT), one or more carbon nanofibers (CNF), graphene oxide (GO), one or more carbon nanoribbons, or reduced graphene oxide (rGO). In some embodiments, the silicon-based material comprises silicon carbide (SiC), silicon nitride (SiN), or silicon dioxide ($SiO_2$). In some embodiments, the boron-based material comprises hexagonal boron nitride (hBN), boron nitride nanotubes (BNNT), or boron nitride nanosheets (BNNS). In some embodiments, the metal oxide comprises $TiO_2$, MgO, $La_2O_3$, $CeO_2$, $Y_2O_3$, one or more $CeO_2$ nanotubes, nanorods or nanocubes, mesoporous silica, $ZrO_2$, chromium oxide ($Cr_2O_3$), or calcium oxide (CaO). In some embodiments, the support comprises YSZ, Hydrotalcite ($Mg_2$Al-LDO), MOF (MIL-101, ZIFs), an alkaline amide (e.g., $NaNH_2$, Ca$(NH_2)_2$, $Mg(NH_2)_2$), $MgAl_2O_4$, $CaAl_2O_4$, $CoAl_2O_4$, an inorganic electride (C12A7:e−), Halloysite nanotubes (HNT), $ABO_3$ Perovskite, $AB_2O_4$ Spinel, MCM-41, or any combination thereof.

In some embodiments, the rotatable reaction chamber is in fluid communication with one or more gas sources comprising a reactive gas, hydrogen gas, or one or more noble gases. In some embodiments, the reactive gas is usable to chemically modify or optimize one or more pores of the catalyst support. In some embodiments, the hydrogen gas and the one or more noble gases are usable to provide a reducing environment during a thermal, physical, chemical or electrochemical activation of the one or more active metal nanoparticles.

In some embodiments, the system may further comprise one or more mass flow controllers for controlling a flow of fluid or materials into or out of the rotatable reaction chamber. In some embodiments, the system may further comprise a vacuum pump fluidly connected to the rotatable reaction chamber to provide a vacuum environment in the rotatable reaction chamber. In some embodiments, the system may further comprise an additional heating unit for heating or pre-heating the plurality of precursor materials.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspect of this disclosure provides a catalyst comprising a support comprising zirconium and oxygen ($Zr_aO_b$), a layer disposed adjacent to the support, and one or more active metal particles disposed adjacent to the layer. In some embodiments, 'a' and 'b' are numbers greater than zero. In some embodiments, the layer comprises $Zr_cO_d$ doped with cerium (Ce) and oxygen (O), wherein 'c' and 'd' are numbers greater than zero. In some embodiments, a molar ratio of Ce to Zr in the layer ranges from about 1:5 to about 1:25, and the catalyst is configured to decompose ammonia. In some cases, 'a' is 1 and 'b' is 2. In some embodiments, the layer comprises $CeO_2$. In some embodiments, 'c' is 1 and 'd' is 2. In some embodiments, the cerium in the layer is configured to upshift a D-band center of the one or more active metal particles. In some embodiments, the cerium in the layer is configured to increase the metal-support interaction of the one or more active metal particles on the layer. In some embodiments, the cerium in the layer is configured to reduce a binding energy of an electron in a $3P_{3/2}$ orbital of the one or more active metal particles on the layer. In some embodiments, the comprising the ($Ce_xO_y$) may increase the metal-support interaction. In some embodiments, the cerium in the layer is configured to reduce a metal-nitrogen binding energy during an ammonia decomposition reaction. In some embodiments, the cerium in the layer is configured to increase electron occupancy in a metal-nitrogen anti-bonding molecular orbital during an ammonia cracking reaction. In some embodiments, the molar ratio of the Ce to the Zr ranges from about 1:8 to about 1:12.

In some embodiments, the support further comprises aluminum oxide, silicon oxide, or carbon. In some embodiments, the aluminum oxide comprises $Al_2O_3$ or the silicon oxide comprises $SiO_2$. In some embodiments, the layer comprises an amorphous structure, a monoclinic structure, or a tetragonal network structure of $(Zr:Ce)O_2$. In some embodiments, the support comprises $ZrO_2$ having an amorphous, monoclinic, or tetragonal phase. In some embodiments, the layer comprises a plurality of nanoparticles comprising ceria. In some embodiments, the ceria comprises $CeO_2$. In some embodiments, the layer comprises $Ce^{3+}$ ions and $Ce^{4+}$ ions, optionally wherein a ratio of the $Ce^{3+}$ ions to the $Ce^{4+}$ ions ranges from about 0.3:1 to about 0.9:1. In some embodiments, the ratio of the $Ce^{3+}$ ions to the $Ce^{4+}$ ions ranges from about 0.7:1 to about 0.8:1. In some embodiments, the catalyst exhibits an X-ray powder diffraction (XRD) spectrum exhibiting a lower angle of diffraction as compared to a corresponding XRD spectrum of an undoped catalyst not comprising the layer comprising cerium, optionally wherein the catalyst comprises about 10 mol % to about 15 mol % of Ce. In some embodiments, the catalyst comprising at least about 20 mol % of Ce exhibits a ceria peak as determined by XRD.

In some embodiments, the catalyst is configured to induce oxygen vacancies ranging from about 0.1 millimole (mmol)/ gram (g) to about 10 mmol/g. In some embodiments, the oxygen vacancy concentration is from about 2 mmol/g to about 6 mmol/g. In some embodiments, the catalyst is configured to produce a density of acid sites ranging from about 10 micromole (mol)/gram (g) to about 1000 μmol/g. In some embodiments, the acid site concentration is from about 50 μmol/g to about 300 μmol/g.

In some embodiments, the support comprises one or more promoters that are configured to modify a basicity of the support. In some embodiments, the one or more promoters comprise one or more members selected from the group consisting of alkali metals and alkaline rare earth metals. In some embodiments, the one or more active metal particles comprise Ru having a binding energy of 460 eV to 465 eV for an electron in a $3p_{3/2}$ orbital, Ni having a binding energy of 870 eV to 880 eV for an electron in a Ni $2p_{1/2}$ orbital, Rh having a binding energy of 305 eV to 315 eV for an electron in a Rh $3d_{3/2}$ orbital, Ir having a binding energy of Ir 55 eV to 65 eV for an electron in a Ir $4f_{7/2}$ orbital, Co having a binding energy of 790 eV to 805 eV for an electron in a Co $2p_{1/2}$ orbital, Fe having a binding energy of 720 eV to 735 eV for an electron in a Fe$2p_{1/2}$ orbital, Pt having a binding energy of 67 eV to 75 eV for an electron in a Pt $4f_{7/2}$ orbital, Cr having a binding energy of 585 eV to 595 eV for an electron in a Cr $2p_{1/2}$ orbital, Mo having a binding energy of 230 eV to 240 eV for an electron in a Mo $3d_{3/2}$ orbital, Pd having a binding energy of 335 ev to 345 eV for an electron in a Pd $3d_{3/2}$ orbital, or Cu having a binding energy of 950 eV to 965 eV for an electron in a Cu $2p_{1/2}$ orbital. In some embodiments, the one or more active metal particles comprise one or more metals selected from the group consisting of Ru, Ni, Rh, Ir, Co, Fe, Pt, Cr, Mo, Pd, and Cu.

In some embodiments, the layer comprises one or more nanoparticles or nanorods comprising ceria. In some embodiments, the one or more nanoparticles or nanorods are attached adjacent to the support. In some embodiments, the one or more nanoparticles or nanorods are formed by co-impregnation of KOH and $Ce(NO_3)_3$. In some embodiments, at least 90 wt % of the catalyst is greater than 1 millimeter (mm) along at least one dimension.

The present disclosure also provides a method for producing a catalyst, comprising: (a) using (i) $Ce_xO_y$ or a precursor(s) thereof and (ii) $Zr_sO_t$ or a precursor(s) thereof, producing a support comprising cerium (Ce), zirconium (Zr), and oxygen (O), wherein 'x', 'y', 's', and 't' are numbers greater than zero; (b) depositing a precursor of one or more active metals adjacent to the support to produce the catalyst, wherein the catalyst is configured to decompose ammonia. In some embodiments, the method further comprises (b) heating the support to a target temperature, wherein (b) is performed at the target temperature. In some embodiments, 'x' is 1 and 'y' is 2. In some embodiments, the $Ce_xO_y$ comprises $CeO_2$. In some embodiments, 's' is 1 and 't' is 2. In some embodiments, the $Zr_sO_t$ comprises $ZrO_2$. In some embodiments, the (a) is performed with an oxide comprising cerium (Ce), zirconium (Zr), and oxygen (O). In some embodiments, the (a) is performed with the oxide comprising $CeO_2$ and $ZrO_2$. In some embodiments, the heating is performed in presence of an inert gas. In some embodiments, the method comprises doping the $Zr_sO_t$ with the precursor of $Ce_xO_y$ to produce the support comprising cerium (Ce), zirconium (Zr), and oxygen (O). In some embodiments, the method comprises reacting the precursor of $Ce_xO_y$ and the precursor of $Zr_sO_t$ to produce the support comprising cerium (Ce), zirconium (Zr), and oxygen (O).

In some embodiments, the precursor(s) of $Ce_xO_y$ comprises $Ce(NO_3)_3$, cerium nitrate hexahydrate, cerium nitrate x-hydrate, cerium chloride, cerium oxide, cerium oxide nanofiber, cerium fluoride, cerium chloride, cerium chloride heptahydrate, cerium chloride hydrate, cerium acetate hydrate, cerium sulfate, cerium nitrate hydrate, cerium nitrate hexahydrate, cerium bromide, ammonium cerium nitrate, cerium acetylacetonate hydrate, cerium iodide, cerium hydroxide, ammonium cerium sulfate dihydrate, cerium sulfate tetrahydrate, cerium carbonate hydrate, or cerium sulfate hydrate. In some embodiments, the precursor(s) of $Zr_sO_t$ comprises zirconium n-butoxide, zirconium acetylacetonate, zirconium propoxide, zirconium oxychloride, zirconium hydroxide, zirconium oxide, zirconium oxide nanofiber, zirconium ethoxide, zirconium acetate, zirconium hydroxide, zirconium trifluoroacetylacetonate, zirconium hydride, zirconium acetylacetonate, zirconium chloride, zirconium sulfate hydrate, zirconium butoxide, zirconium carboxyethyl acrylate, zirconium oxynitrate hydrate, zirconium propoxide, or zirconium fluoride.

In some embodiments, the target temperature ranges from about 600° C. to about 1200° C. In some embodiments, the target temperature ranges from about 700° C. to about 1000° C. In some embodiments, the target temperature is at least about 700° C., at least about 800° C., or at least about 900° C. In some embodiments, the precursor of the one or more active metals comprise a Ru precursor, a Ni precursor, a Rh precursor, a Ir precursor, a Co precursor, a Fe precursor, a Pt precursor, a Cr precursor, a Mo precursor, a Pd precursor, or a Cu precursor. In some embodiments, the support comprises one or more promoters that are configured to modify a basicity of the support. In some embodiments, the one or more promoters comprise one or more members selected from the group consisting of alkali metals and alkaline rare earth metals. In some embodiments, the (a) further comprises drying the support in a vacuum prior to depositing the one or more promoters or dopant precursors. In some embodiments, drying the support comprises using a vacuum oven. In some embodiments, the Ru precursor comprises ruthenium iodide, ruthenium acetylacetonate, ruthenium chloride hydrate, ruthenium oxide hydrate, ruthenium chloride, bis(cyclopentadienyl)ruthenium, ruthenium nitrosyl nitrate, ruthenium iodide hydrate, triruthenium dodecacarbonyl, or any combination thereof. In some embodiments, the catalyst comprises about 0.2 wt % to about 20 wt % of ruthenium. In some embodiments, the catalyst comprises about 0.5 wt % to about 5 wt % of ruthenium.

In some embodiments, the (a) further comprises using (iii) a promotor or a promotor precursor to produce a target molar ratio of the promotor and Ce in the support. In some embodiments, the promotor precursor comprises a K precursor, an alkali metal precursor, or an alkaline rare earth metal precursor. In some embodiments, an alkali metal of the alkali metal precursor comprises Li, Na, K, Rb, Cs, or Fr. In some embodiments, an alkaline rare earth metal of the alkaline rare earth metal comprises Mg, Ca, Sr, Ba, or Ra. In some embodiments, the promotor precursor comprises potassium methylate, potassium tetrafluoroborate, potassium hydrogen fluoride, potassium thiocyanate, potassium disulfite, potassium bisulfate, potassium sulfide, potassium methoxide, potassium trifluoroacetate, potassium dioxide, potassium persulfate, potassium formate, potassium bicarbonate, potassium sorbate, potassium hydroxide, potassium borohydride, potassium dichloroacetate, potassium iodate, potassium chlorate, potassium fluoride, potassium chloride, potassium nitrate, potassium perchlorate, potassium cyanate, or potassium hexachloroiridate. In some embodiments, the promotor precursor is processed in an aqueous solution. In some embodiments, the promotor precursor is processed in an organic solution. In some embodiments, the target molar ratio of the promotor and Ce ranges from about 0.1:1 to about 3:1. In some embodiments, the target molar ratio of the promotor and Ce is about 1:1.

In some embodiments, the method further comprises drying the support in a vacuum or in an inert environment, heating the support to a first target temperature, and reducing the promotor precursors, the $Ce_xO_y$, the $Zr_sO_t$, and the mixed oxide thereof on the support under hydrogen at a second target temperature. In some cases, the second target temperature is different than the first target temperature. In some embodiments, the drying the support comprises using a vacuum oven. In some embodiments, the heating comprises heat treatments under inert gas. In some embodiments, the heating comprises heat treatment under air. In some embodiments, the first target temperature ranges from about 600° C. to about 1200° C. In some embodiments, the first target temperature ranges from about 700° C. to about 1000° C. In some embodiments, the first target temperature is at least about 700° C., at least about 800° C., or at least about 900° C. In some embodiments, the second target temperature ranges from about 250° C. to about 600° C. In some embodiments, the second target temperature ranges from about 250° C. to about 450° C. In some embodiments, the second target temperature is at least about 200° C., at least about 300° C., or at least about 400° C. In some embodiments, one or more XRD peaks of the catalyst, when the catalyst comprises a K promotor and is processed by the heating under an inert gas, comprise a lower angle of diffraction compared to one or more corresponding XRD peaks of the catalyst without the promotor. In some embodiments, one or more XRD peaks of the catalyst, when the catalyst comprises a K promotor and is processed by the heating under air, comprise a higher angle of diffraction compared to corresponding XRD peak of the catalyst without the promotor and a lower angle of diffraction compared to corresponding XRD peak of zirconia without doping of a ceria. In some embodiments, the catalyst is configured to produce a XRD peak of $CeO_2$, wherein the promotor is K.

In some embodiments, the method further comprises using one or more promotor precursors subsequent to the (b) to produce a target molar ratio of the promotor and Ce in the support, wherein the promotor is reduced under hydrogen at a target temperature. In some embodiments, the one or more promotor precursors comprises a K precursor, an alkali metal precursor, and/or an alkaline rare earth metal precursor. In some embodiments, an alkali metal of the alkali metal precursor comprises Li, Na, K, Rb, Cs, or Fr. In some embodiments, an alkaline rare earth metal of the alkaline rare earth metal comprises Mg, Ca, Sr, Ba, or Ra. In some embodiments, the one or more promotor precursor comprises potassium methylate, potassium tetrafluoroborate, potassium hydrogen fluoride, potassium thiocyanate, potassium disulfite, potassium bisulfate, potassium sulfide, potassium methoxide, potassium trifluoroacetate, potassium dioxide, potassium persulfate, potassium formate, potassium bicarbonate, potassium sorbate, potassium hydroxide, potassium borohydride, potassium dichloroacetate, potassium iodate, potassium chlorate, potassium fluoride, potassium chloride, potassium nitrate, potassium perchlorate, potassium cyanate, or potassium hexachloroiridate. In some embodiments, the one or more promotor precursors is processed in an aqueous solution. In some embodiments, the one or more promotor precursor is processed in an organic solution. In some embodiments, the target molar ratio of the promotor and Ce ranges from about 0.1:1 to about 3:1. In some embodiments, the target molar ratio of the promotor and Ce is about 1:1. In some embodiments, the target temperature ranges from about 250° C. to about 600° C. In some embodiments, the target temperature ranges from about 250° C. to about 450° C. In some embodiments, the target temperature is at least about 200° C., at least about 300° C., or at least about 400° C. In some embodiments, the promoter is configured to modify the basicity of the composite oxide support. In some embodiments, the promoter is configured to increase the electron density of active metal to facilitate the recombinative nitrogen desorption and/or N—H bond cleavage. In some embodiments, the support comprises one or more nanorods comprising ceria. In some embodiments, the ceria is $CeO_2$. In some embodiments, the catalyst is powderless.

In another aspect, the present disclosure provides an ammonia decomposition method comprising: decomposing ammonia using the catalyst disclosed herein to generate at least hydrogen. In some aspect, the present disclosure provides an ammonia decomposition method comprising: decomposing ammonia using the catalyst produced according to the method disclosed herein to generate at least hydrogen. In some embodiments, the active metal is Ru, the promoter is K, a molar ratio of Ru to K is 1:1, and decomposing the ammonia converts about 98% of the ammonia at a temperature of about 500° C.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 19 shows a table of element composition of various catalysts doped with rare earth metals, in accordance with some embodiments.

FIG. 21B shows a table describing the conditions at which the catalysts shown in FIG. 21A were tested, in accordance with some embodiments.

DETAILED DESCRIPTION

Figure 1:
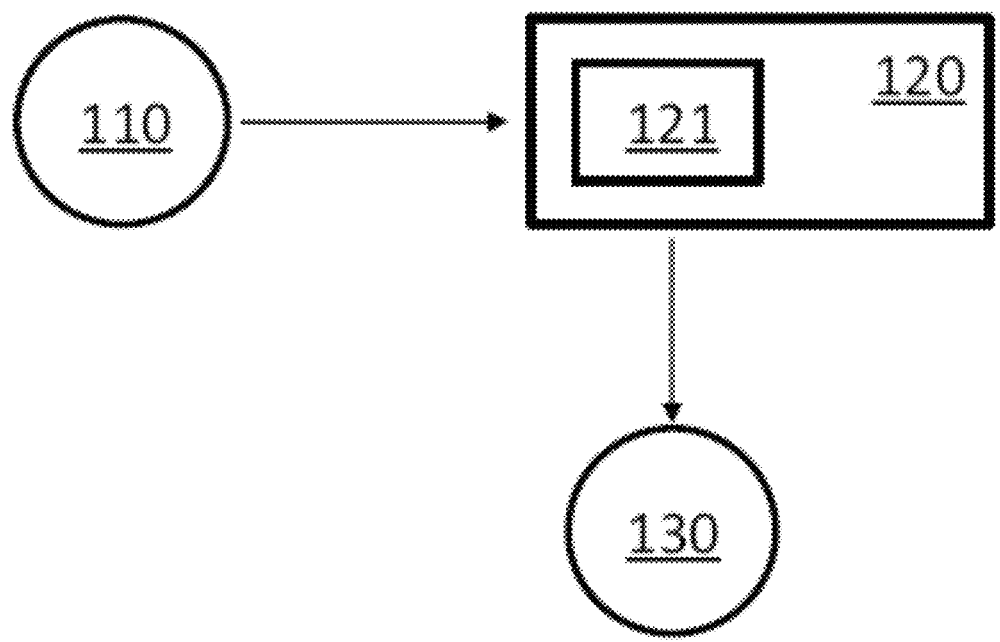
FIG. 1 schematically illustrates an exemplary system for processing ammonia to generate hydrogen fuel, in accordance with some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

The term "at least one of A and B" and "at least one of A or B" may be understood to mean only A, only B, or both A and B. The term "A and/or B" may be understood to mean only A, only B, or both A and B.

The terms "decompose," "dissociate," "reform," "crack," and "break down," and their grammatical variations, may be construed interchangeably. For example, the expression "decomposition of ammonia" may be interchangeable with "dissociation of ammonia," "reforming of ammonia," "cracking of ammonia," "conversion of ammonia," etc.

The terms "ammonia conversion" and "ammonia conversion efficiency," and their grammatical variations, may be construed as a fraction of ammonia that is converted to hydrogen and nitrogen, and may be construed interchangeably. For example, "ammonia conversion" or "ammonia conversion efficiency" of 90% may represent 90% of ammonia being converted to hydrogen and nitrogen.

The term "turnover frequency" may be construed as the forward reaction rate of ammonia decomposition, measured either as ammonia consumption or hydrogen production normalized per unit catalyst per unit time ($\text{Amount}_{ammonia\ or\ hydrogen}\ \text{Amount}_{cat}^{-1}\ \text{time}^{-1}$). $\text{Amount}_{ammonia\ or\ hydrogen}$ may be measured as $\text{mmol}_{ammonia\ or\ hydrogen}$, $\text{mol}_{ammonia\ or\ hydrogen}$, $g_{ammonia\ or\ hydrogen}$, or $\text{mL}_{ammonia\ or\ hydrogen}$. $\text{Amount}_{cat}$ may be measured as $g_{cat}$, $g_{active\ metal}$, $g_{surface\ active\ metal}$, $g_{active\ sites}$, $\text{mol}_{cat}$, $\text{mol}_{active\ metal}$, $\text{mol}_{surface\ active\ metal}$, or $\text{mol}_{active\ sites}$. Time may be measured as seconds, minutes, hours or days.

In some cases, the term "turnover frequency" may be construed as the net reaction rate of ammonia decomposition (i.e., forward reaction minus reverse reaction), measured either as ammonia consumption or hydrogen production normalized per unit catalyst per unit time ($\text{Amount}_{ammonia\ or\ hydrogen}\ \text{Amount}_{cat}^{-1}\ \text{time}^{-1}$). $\text{Amount}_{ammonia\ or\ hydrogen}$ may be measured as $\text{mmol}_{ammonia\ or\ hydrogen}$, $\text{mol}_{ammonia\ or\ hydrogen}$, $g_{ammonia\ or\ hydrogen}$, or $\text{mL}_{ammonia\ or\ hydrogen}$. $\text{Amount}_{cat}$ may be measured as $g_{cat}$, $g_{active\ metal}$, $g_{surface\ active\ metal}$, $g_{active\ sites}$, $\text{mol}_{cat}$, $\text{mol}_{active\ metal}$, $\text{mol}_{surface\ active\ metal}$, or $\text{mol}_{active\ sites}$. Time may be measured as seconds, minutes, hours or days.

The terms "production rate" and "consumption rate" may be construed as the production or consumption of a compound involved in the reaction, measured as a net rate=forward reaction−reverse reaction. The unit for "production rate" and "consumption rate" may be $\text{Amount}_{ammonia\ or\ hydrogen}\ \text{Amount}_{cat}^{-1}\ \text{time}^{-1}$. $\text{Amount}_{ammonia\ or\ hydrogen}$ may be measured as $\text{mmol}_{ammonia\ or\ hydrogen}$, $\text{mol}_{ammonia\ or\ hydrogen}$, $g_{ammonia\ or\ hydrogen}$, or $\text{mL}_{ammonia\ or\ hydrogen}$. $\text{Amount}_{cat}$ may be measured as $g_{cat}$, $g_{active\ metal}$, $g_{surface\ active\ metal}$, $g_{active\ sites}$, $\text{mol}_{cat}$, $\text{mol}_{active\ metal}$, $\text{mol}_{surface\ active\ metal}$, or $\text{mol}_{active\ sites}$. Time may be measured as seconds, minutes, hours or days.

Reactor

In an aspect, the present disclosure provides a system for processing a source material. The system may comprise a reactor or a reformer. The reactor or reformer may comprise one or more catalysts. The one or more catalysts may be used to process a source material. The one or more catalysts may be optimized to enhance the processing of the source material. The source material may comprise, for example, ammonia ($NH_3$). The source material may be processed to generate a fuel source. The fuel source may comprise, for example, hydrogen and/or nitrogen. The fuel source may be provided to one or more hydrogen fuel cells, which may be configured to use the fuel source to generate electrical energy. Such electrical energy may be used to power various systems, vehicles, and/or devices.

FIG. 1 schematically illustrates a block diagram of an exemplary method for processing a source material to produce electrical energy. A source material 110 may be provided to a reactor 120. The source material 110 may comprise a compound comprising one or more hydrogen molecules. The compound may be, for example, ammonia or $NH_3$. In some cases, the compound may comprise a hydrocarbon $C_xH_y$. The source material 110 may be provided to a reactor 120. The source material 110 may be in a gaseous state and/or a liquid state. The reactor 120 may be designed or configured to process the source material 110 using one or more catalysts 121 to extract, produce, or release a fuel source 130 from the source material 110. In some cases, processing the source material 110 may comprise heating the one or more catalysts 121 to extract, produce, or release the fuel source 130 from the source material 110. The fuel source 130 may comprise, but may not be limited to, hydrogen and/or nitrogen. The fuel source 130 may be provided to one or more fuel cells or one or more combustion engines for the generation of electrical energy or mechanical work. Such electrical energy may be used to power various system, vehicles, and/or devices, including, for example, terrestrial, aerial, or aquatic vehicles.

As described above, one or more fuel cells may be used to generate electrical energy from the fuel source 130, which may comprise, but may not be limited to, hydrogen and/or nitrogen. In some cases, the one or more fuel cells may generate electricity through an electrochemical reaction between fuels. The fuels may comprise the hydrogen and/or the nitrogen in the fuel source 130. The electricity generated by the fuel cells may be used to power one or more systems, vehicles, or devices. In some embodiments, excess electricity generated by the fuel cells may be stored in one or more energy storage units (e.g., batteries) for future use. In some optional embodiments, the fuel cells may be provided as part of a larger fuel cell system. The fuel cell system may comprise an electrolysis module. Electrolysis of a byproduct of the one or more fuel cells (e.g., water) may allow the byproduct to be removed, through decomposition of the byproduct into one or more constituent elements (e.g., oxygen and/or hydrogen). Electrolysis of the byproduct can also generate additional fuel (e.g., hydrogen) for the fuel cell.

As described above, one or more combustion engines may be used to generate electrical energy or mechanical work from the fuel source 130, which may comprise, but may not be limited to, hydrogen and/or nitrogen. In some cases, the one or more combustion engines may generate mechanical work through combustion of one or more fuels. The mechanical work can be converted to electrical energy by one or more electrical generators. The fuels may comprise the hydrogen and/or the nitrogen in the fuel source 130. The electricity or mechanical work generated by the combustion engines may be used to power one or more systems, vehicles, or devices. In some embodiments, excess electricity or mechanical work generated by the combustion engines may be stored in one or more energy storage units (e.g., batteries) for future use. In some optional embodiments, the combustion engine may be provided as part of a larger engine or power generation system. The combustion engine system may comprise a combustion chamber. Electrolysis of a byproduct of the one or more combustion engines (e.g., water) may allow the byproduct to be removed, for example, through decomposition of the byproduct into one or more constituent elements (e.g., oxygen and/or hydrogen). Electrolysis of the byproduct can also generate additional fuel (e.g., hydrogen) for the combustion engine.

Figure 2:
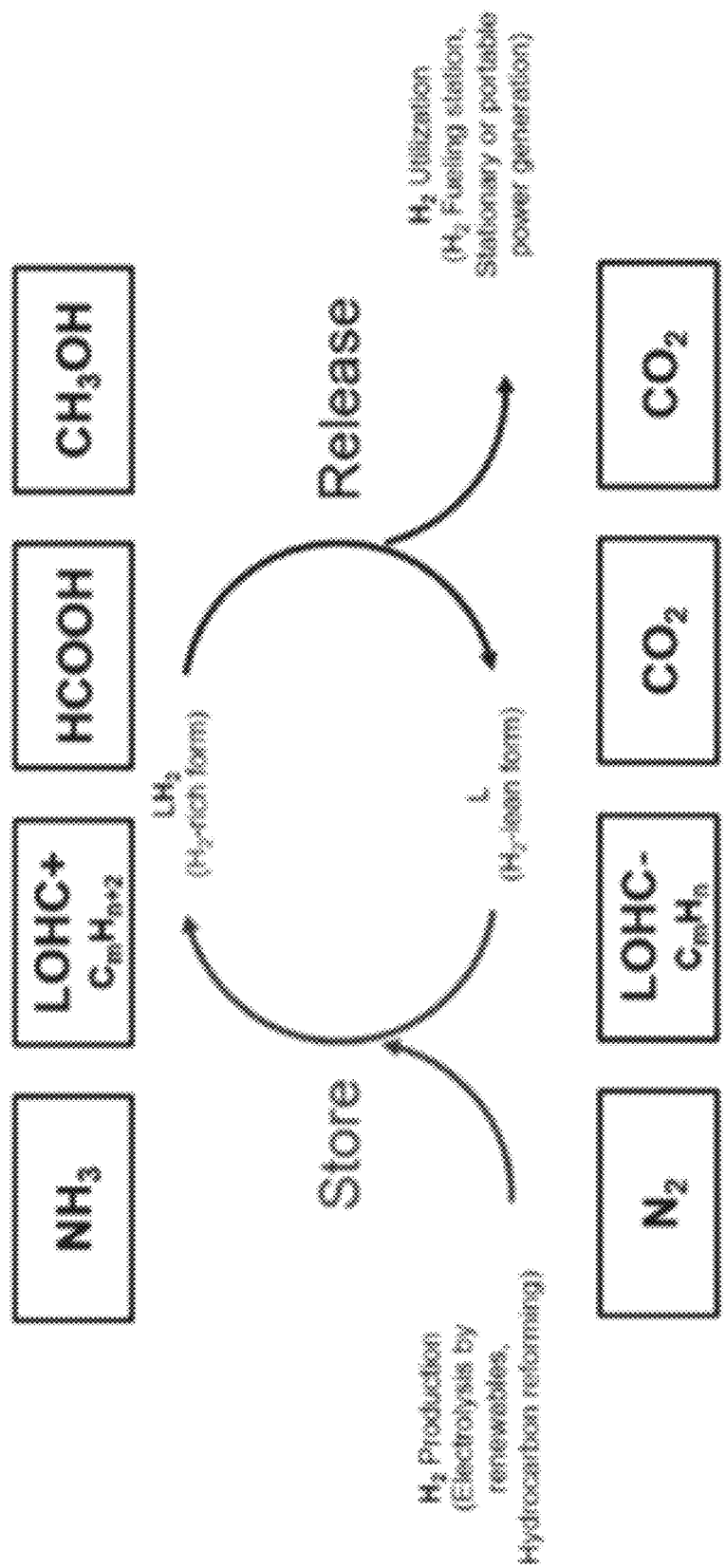
FIG. 2 schematically illustrates an exemplary method of hydrogen storage using liquid chemicals, in accordance with some embodiments.

FIG. 2 schematically illustrates an exemplary method of hydrogen storage using liquid chemicals, in accordance with some embodiments. Hydrogen, whether produced by electrolysis of renewables or through hydrocarbon reforming, may be stored using one or more liquid chemicals. In some non-limiting embodiments, the one or more liquid chemicals may comprise, for example, ammonia, a liquid organic hydrogen carrier (LOHC), formic acid (HCOOH), or methanol ($CH_3OH$). The hydrogen may be stored in a hydrogen-rich form or a hydrogen-lean form. The one or more liquid chemicals comprising the hydrogen may be processed as described elsewhere herein to release the hydrogen stored in the liquid chemicals. Once released, the hydrogen may be used for power generation (e.g., stationary or portable power generation), or may be provided to a hydrogen fueling station or hydrogen fueling site.

In some cases, ammonia may be used as a hydrogen carrier. A hydrogen carrier may comprise a fluid or liquid chemical that can be used to store hydrogen. The use of ammonia as an energy carrier provides the benefits of hydrogen fuel (e.g., environmentally safe and high gravimetric energy density) once the ammonia is broken down into hydrogen, while taking advantage of (a) ammonia's greater volumetric density compared to both gaseous and liquid hydrogen and (b) the ability to transport ammonia at standard temperatures and pressures without requiring complex and highly pressurized storage vessels like those typically used for storing and transporting hydrogen.

In some cases, hydrogenation may be used to store the hydrogen in one or more fluids or liquid chemicals (e.g., ammonia). Hydrogenation may refer to the treatment of materials or substances with molecular hydrogen ($H_2$) to add one or more pairs of hydrogen atoms to various constituent compounds (e.g., one or more unsaturated compounds) making up the materials or substances. Hydrogenation may be performed using a catalyst, which can allow the reaction to occur under normal conditions of temperature and/or pressure. In some cases, the Haber-Bosch process (an artificial nitrogen fixation process) may be used to produce ammonia. The process may be used to convert atmospheric nitrogen ($N_2$) to ammonia ($NH_3$) by a reaction with hydrogen (e.g., $H_2$ produced or obtained by electrolysis) using a metal catalyst under various reaction temperatures and pressures:

$$2NH_3 \leftrightarrow N_2 + 3H_2$$

As described above, the Haber-Bosch process may be used to produce ammonia, which can be used as a hydrogen carrier. Using ammonia as a hydrogen carrier may provide several benefits, including easy storage at relatively standard conditions (0.8 MPa, 20° C. in liquid form), and convenient transportation. Ammonia also has a relatively high hydrogen content (17.7 wt %, 120 grams of $H_2$ per liter of liquid ammonia). Further, the production of ammonia using the Haber-Bosch process can be powered by renewable energy sources (e.g., solar photovoltaic or solar-thermal), which makes the production process environmentally safe and friendly, as $N_2$ is the only byproduct and there is no further emission of $CO_2$. Once the ammonia is produced, it may be processed (e.g., decomposed using a catalyst) to release the hydrogen through a dehydrogenation process. The released hydrogen may then be provided to one or more fuel cells, such as a proton-exchange membrane fuel cell (PEMFC) having a proton-conducting polymer electrolyte membrane, a polymer electrolyte membrane (PEM) fuel cell, a solid-oxide fuel cell (SOFC), or one or more combustion engines having one or more combustion chambers. PEMFCs may have relatively low operating temperatures and/or pressure ranges (e.g., from about 50 to 100° C.). A proton exchange membrane fuel cell can be used to transform the chemical energy liberated during the electrochemical reaction of hydrogen and oxygen into electrical energy, as opposed to the direct combustion of hydrogen and oxygen gases to produce thermal energy. PEMFCs can generate electricity and operate on the opposite principle to PEM electrolysis, which consumes electricity. Combustion engines can generate mechanical work or electricity via combustion of (i) hydrogen and oxygen gases or (ii) hydrogen, ammonia, and oxygen gases. The methods and systems disclosed herein may be implemented to achieve thermally efficient hydrogen production, and may be scaled for application to high energy density power systems.

Figure 3:
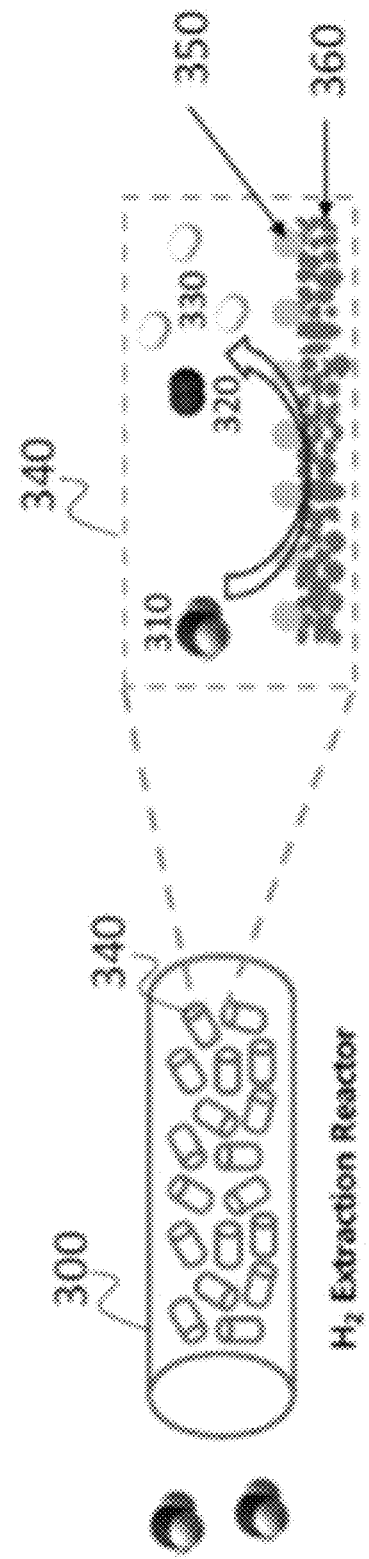
FIG. 3 schematically illustrates an exemplary hydrogen extraction reactor comprising a heterogeneous catalyst, in accordance with some embodiments.

FIG. 3 schematically illustrates a hydrogen extraction reactor 300 for extracting hydrogen from ammonia. The extraction of hydrogen from ammonia may be accomplished using one or more catalysts 340. The one or more catalysts 340 may comprise a heterogenous catalyst. A heterogenous catalyst may comprise a catalyst having a different phase than that of the reactants 310 (e.g., $NH_3$) or products 320 and/or 330 ($N_2$ and/or $H_2$). The one or more catalysts 340 may comprise a plurality of metal nanoparticles 350 embedded in, on, or within a support material 360 (e.g., a composite support and/or a catalyst support as described elsewhere herein). The impregnation of the metal nanoparticles 350 into, onto, or within the support materials 360 may lower an activation energy barrier of the ammonia decomposition reaction, thereby allowing the one or more catalysts 340 to efficiently crack or decompose ammonia at lower reaction temperatures.

Figure 4:
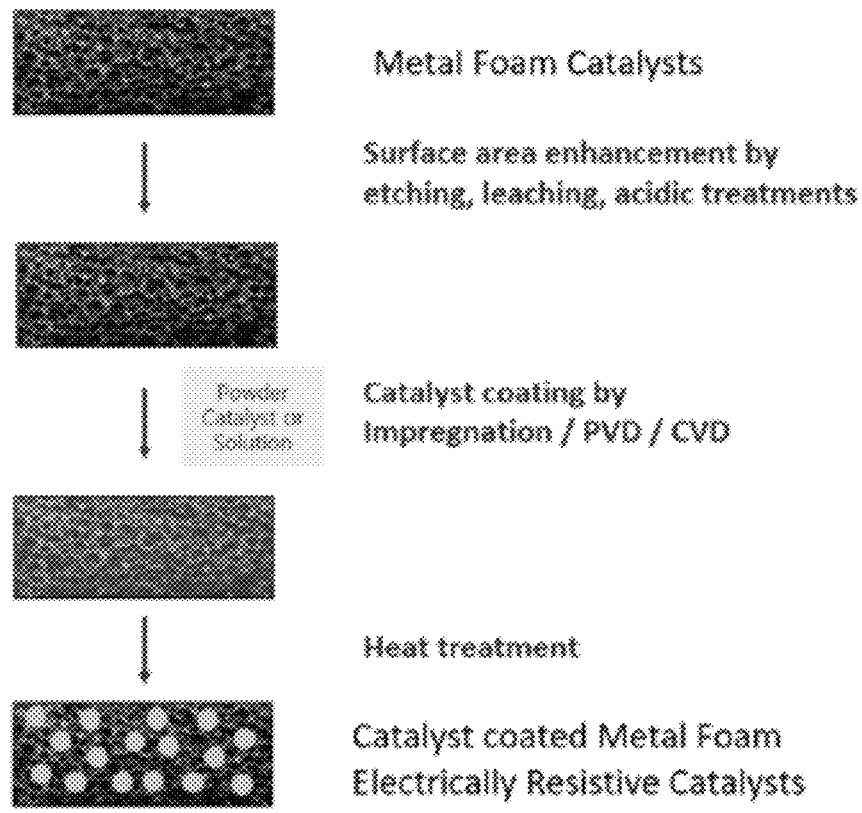
FIG. 4 schematically illustrates various types of enhancements and treatments for optimizing catalyst materials, in accordance with some embodiments.

FIG. 4 schematically illustrates various types of enhancements and/or treatments for optimizing catalyst materials that may be used to crack ammonia. The catalysts may comprise, for example, any metal alloy comprising nickel, chromium, iron, and/or aluminum, i.e., Ni/Cr—X, Ni/Cr—X/Al—Y, and/or Ni/Fe—X/Cr—Y/Al—Z, where X, Y, and/or Z ranges from 0 to 100. A surface of the catalysts may be processed (e.g., by etching, alloying, leaching, and/or using one or more acidic treatments) to enhance the surface area and surface characteristics of the catalyst material. The catalysts may also undergo a catalyst coating operation (e.g., by impregnation, physical vapor deposition (PVD), or chemical vapor deposition (CVD)) and/or one or more heat treatment operations. In some cases, the processed catalyst material may comprise a catalyst coated material comprising one or more electrically resistive catalysts.

In some embodiments, the catalysts may comprise one or more metal foam catalysts. The one or more catalysts may comprise, for example, a modified metal foam catalyst. The catalyst materials may be subjected to or may undergo one or more enhancements and/or treatments as shown and described elsewhere herein. In some cases, the catalyst may comprise a nickel chromium aluminum (NiCrAl) foam.

In some cases, at least one of the first catalyst and the second catalyst may comprise a metal foam catalyst. The metal foam catalyst may comprise nickel, iron, chromium, and/or aluminum. In some cases, the metal foam catalyst may comprise one or more alloys comprising nickel, iron, chromium, and/or aluminum.

In some embodiments, the metal foam catalysts may comprise a catalytic coating of one or more powder or pellet catalysts. The catalytic coating may comprise a metal material, a promoter material, and/or a support material. The metal material may comprise, for example, ruthenium, nickel, rhodium, iridium, cobalt, molybdenum, iron, platinum, chromium, palladium, and/or copper. The promoter material may comprise, for example, sodium, potassium, rubidium, and/or cesium. In some cases, the support material may comprise, for example, at least one of $Al_2O_3$, MgO, $CeO_2$, $SiO_2$, $TiO_2$, $Y_2O_3$, $ZrO_2$, SiC, silicon nitride (SiN), $MgAl_2O_4$, $CaAl_2O_4$, $CoAl_2O_4$, hexagonal boron nitride, one or more boron nitride nanotubes, and/or one or more carbon nanotubes. In some cases, the support material may comprise at least one of $Al_xO_y$, $Mg_xO_y$, $Ce_xO_y$, $Si_xO_y$, $Ti_xO_y$, $Y_xO_y$, $Zr_xO_y$, $B_xN_y$, $Si_xC_y$, $Si_xN_y$, and/or C. In some embodiments, the catalytic coating may comprise one or more ruthenium-based precursors. The one or more ruthenium-based precursors may comprise, for example, $RuCl_3$, $Ru(NO)(NO_3)_3$, or $Ru_3(CO)_{12}$. In any of the embodiments described herein, the metal foam catalyst may have an apparent electrical resistivity of at least about 8 micro ohm-meters ($\mu\Omega m$).

In some cases, the metal foam catalyst may be processed using one or more etching, alloying, leaching, or acidic treatments to enhance a surface area of the metal foam catalyst. In some cases, the metal foam catalyst may be heat treated. In some cases, the metal foam catalyst may be coated using a physical vapor deposition (PVD) treatment and/or a chemical vapor deposition (CVD) treatment.

In some embodiments, the one or more ammonia decomposition catalysts may comprise a metal material, a promoter material, and/or a support material. In some cases, the metal material may comprise, for example, at least one of ruthenium, nickel, rhodium, iridium, cobalt, molybdenum, iron, platinum, chromium, palladium, and/or copper. In some cases, the promoter material may comprise, for example, at least one of sodium, potassium, rubidium, cesium, magnesium, calcium, strontium, and/or barium. In some cases, the support material may comprise at least one of $Al_xO_y$, $Mg_xO_y$, $Ce_xO_y$, $Si_xO_y$, $Ti_xO_y$, $Y_xO_y$, $Zr_xO_y$, $B_xN_y$, $Si_xC_y$, $Si_xN_y$, and/or C. In some cases, the support material may comprise, for example, at least one of $Al_2O_3$, MgO, $CeO_2$, $SiO_2$, SiC, $TiO_2$, $Y_2O_3$, $ZrO_2$, SiN, $MgAl_2O_4$, $CaAl_2O_4$, $CoAl_2O_4$, hexagonal boron nitride, one or more boron nitride nanotubes, and/or one or more carbon nanotubes.

Active Metal Nanoparticles

One or more nanoparticles may be used to decompose the ammonia. The one or more nanoparticles may comprise an active metal configured to decompose or facilitate the decomposition of the ammonia. In some cases, the active metal nanoparticles may comprise, for example, ruthenium (Ru). The nanoparticles may comprise one or more binding sites (also referred to herein as active sites) for ammonia to attach to. The binding sites may be determined based on a shape, a morphology, and/or a surface chemistry or property of the active metal nanoparticles. As described elsewhere herein, the morphology of the active metal nanoparticles may correspond to a size, shape, pore structure, pore size, pore shape, pore volume, pore density, pore size distribution, grain structure, grain size, grain shape, crystal structure, flake size, or layered structure of the one or more active metal nanoparticles. As described elsewhere herein, the physical or chemical property of the active metal nanoparticles may comprise an Arrhenius acidity or basicity, a Lewis acidity or basicity, an electron density, an electronic state, or a hydrophilicity or hydrophobicity of the one or more active metal nanoparticles. One or more ammonia particles may attach to the binding sites of the active metal nanoparticles. The active metal nanoparticles may be configured to break the nitrogen-hydrogen (N—H) bonds of ammonia. The morphology and/or surface chemistry or property of the active metal nanoparticles may enhance ammonia adsorption, the breakdown (or scission) of N—H bonds, and hydrogen and/or nitrogen desorption.

Morphology

The morphology of the nanoparticles may be optimized. The morphology may comprise a structure, a size, an aspect ratio, a facet distribution, and/or a shape of the nanoparticles. In some cases, the morphology may comprise a grain structure, grain sizes, and/or grain boundaries. In some cases, the morphology may correspond to a size, shape, pore structure, pore size, pore shape, pore volume, pore density, pore size distribution, grain structure, grain size, grain shape, crystal structure, flake size, or layered structure of the one or more active metal nanoparticles. The morphology of the nanoparticles may be customized or changed to optimize the locations and/or the availability of the active sites on a molecular level. The binding sites or the active sites of the nanoparticles may be defined or determined in part based on the morphology of the nanoparticles.

Surface Chemistry

The chemical and/or physical properties of the nanoparticles may be optimized. The chemical and/or physical properties may comprise, for example, a surface chemistry or property of the one or more active metal nanoparticles. The physical and/or chemical property of the active metal nanoparticles may comprise, for example, an Arrhenius acidity or basicity, a Lewis acidity or basicity, an electron density, an electronic state, or a hydrophilicity or hydrophobicity of the one or more active metal nanoparticles. The surface chemistry or property of the nanoparticles may be customized or changed to optimize the locations and/or the availability of the active sites on a molecular level. The binding sites or the active sites of the nanoparticles may be defined or determined in part based on the surface chemistry or properties of the nanoparticles.

Form Factor

In some embodiments, the catalyst support material may comprise a porous material. In some embodiments, the catalyst support material may comprise a two-dimensional material. In some embodiments, the catalyst may be provided as a coating on a bead or a pellet. This may solve the issue of compressing powdered catalysts into a bead or a pellet form but not being able to use all of the catalyst material in the body of the bead or pellet. In some embodiments, the catalyst may be provided as a coating on a powder. In some cases, the catalyst may be provided as a coating on a porous monolith or a solid foam material. The coating may be optimized with a predetermined amount of catalyst material to ensure that at least a threshold amount of the catalyst material is used. The threshold amount may be, for example, at least about 90% by weight or volume. A plurality of beads or pellets comprising a catalyst material coating may be used in combination with a reactor or a reformer to decompose or crack ammonia in order to generate hydrogen.

Figure 5:
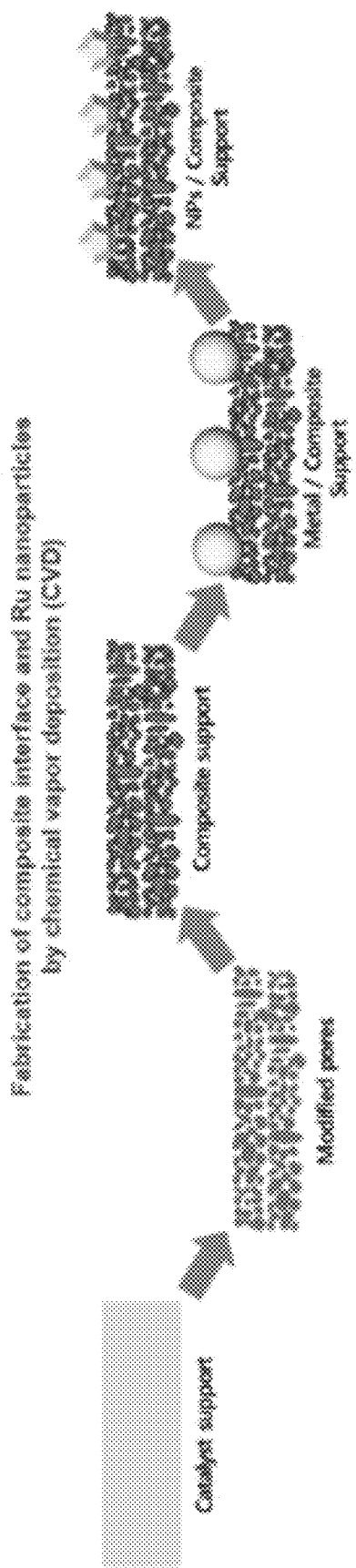
FIG. 5 and FIG. 6 schematically illustrate an exemplary process for modifying and enhancing a catalyst support, in accordance with some embodiments.
Figure 6:
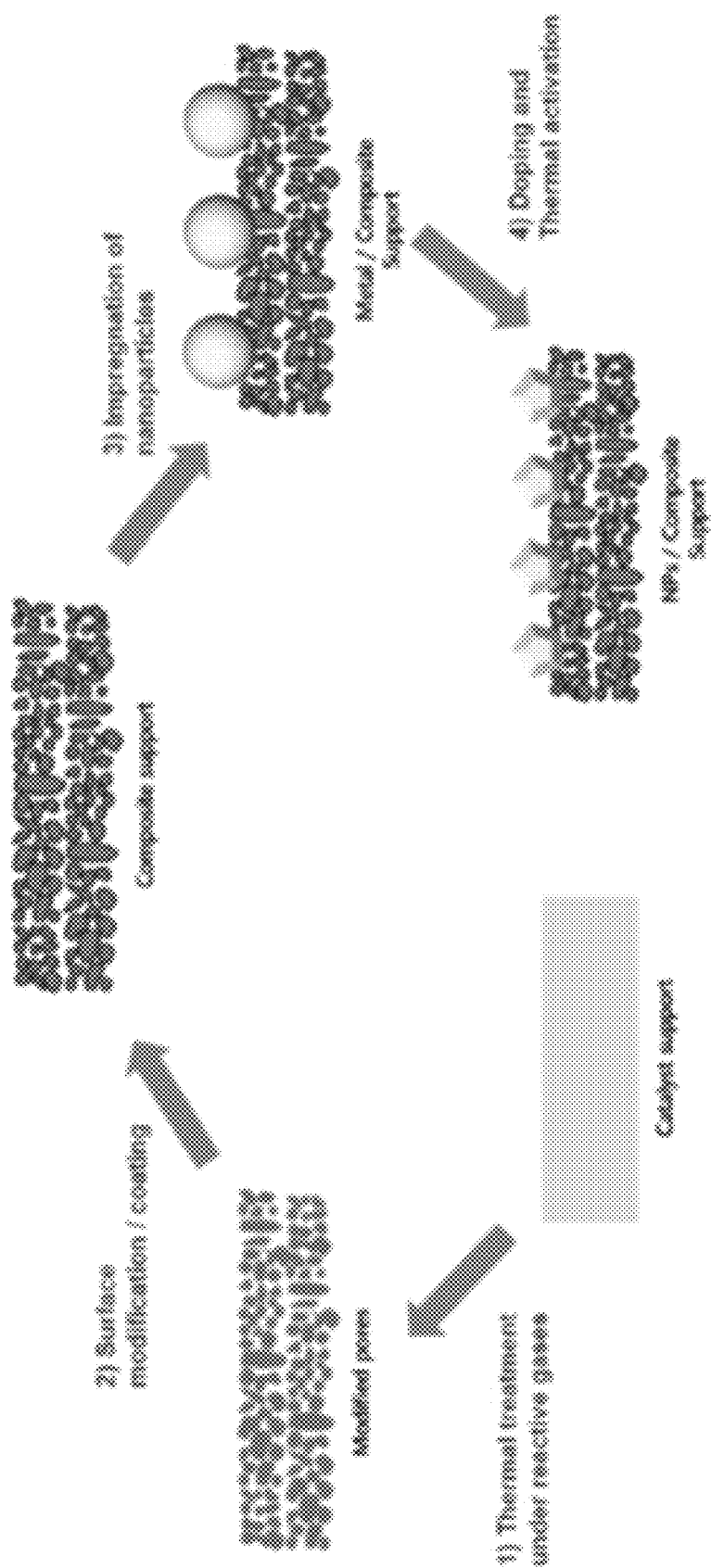

FIG. 5 and FIG. 6 schematically illustrate an exemplary process for modifying and enhancing a catalyst support. A catalyst support may be provided. The catalyst support may comprise any one or more metals (e.g., aluminum), nonmetals, and/or metalloids. In some cases, the pores of the catalyst support material may be optimized. Optimizing the pores may comprise, for example, optimizing a pore size, a pore density, a pore volume, or a location or distribution of the pores through an area or a volume of the catalyst support material. The pores may be modified chemically (e.g., using corrosive gases or liquid chemicals to selectively etch out pores) or physically (e.g., using one or more thermal treatments under various gases). In some cases, the thermal treatments may change a phase or a state of the catalyst support material, which may also change the pore size of the catalyst support material. In some cases, the pore sizes may be optimized differently for different types of reactions or for different types of performance characteristics. In some cases, the thermal treatments may be accompanied by an exposure of the catalyst support material to one or more reactive gases. In some cases, the reactive gases may comprise gases containing one or more of nitrogen (e.g. NO, $NO_2$, $NH_3$, HCN), sulfur ($H_2S$, $SO_2$), chlorine ($Cl_2$, HCl), carbon (CO, $CO_2$), fluorine, or gases generated from plasma such as ozone.

In some embodiments, the surface of the catalyst support may be modified or coated. In some cases, the catalyst support material comprising the optimized pore characteristics may be coated with an intermediate layer that can act as a platform for one or more active metals or active metal particles to grow. The intermediate layer can be used to change or influence a morphology of the active metal nanoparticles once the active metal nanoparticles are provided on the intermediate layer. In some cases, the intermediate layer may comprise a composite support material. The composite support material may be deposited on the catalyst support material using vapor deposition (e.g., chemical vapor deposition or physical vapor deposition). In some cases, the composite support material may be deposited on the catalyst support material by sputtering.

The composite support material may comprise a morphology and a physical or chemical property (e.g., a surface chemistry). The morphology and/or the physical or chemical properties of the composite support material layer may be used to change or influence the morphology and the physical or chemical properties of the active metal nanoparticles deposited on top of the composite support material. In some cases, the active metal nanoparticles may grow while conforming to the morphology and the physical or chemical properties of the composite support material layer.

In some cases, the catalyst support material may comprise a morphology and a physical or chemical property (e.g., a surface chemistry). The morphology and/or the physical or chemical properties of the catalyst support material layer may be used to change or influence the morphology and the physical or chemical properties of the active metal nanoparticles deposited on top of the catalyst support material or the composite support material. In some cases, the active metal nanoparticles may grow while conforming to the morphology and the physical or chemical properties of the catalyst support material and/or the composite support material layer.

In some cases, the catalyst support may comprise one or more properties or characteristics that are optimizable using one or more physical or chemical processes. The one or more properties or characteristics may comprise, for example, a morphology or a surface chemistry or property of the catalyst support. The morphology may comprise a pore structure, a pore size, a pore shape, a pore volume, a pore density, a pore size distribution, a grain structure, a grain size, a grain shape, a crystal structure, a flake size, or a layered structure. The surface chemistry or property may comprise an Arrhenius acidity or basicity, a Lewis acidity or basicity, a surface hydroxyl group density, or a hydrophilicity or hydrophobicity. In some cases, the morphology or the surface chemistry or property of the composite support material may conform to a morphology or a surface chemistry or property of the catalyst support. In some cases, the morphology or the surface chemistry or property of the active metal nanoparticles may conform to the morphology or the surface chemistry or property of the catalyst support material and/or the composite support material. In some cases, the morphology or the surface chemistry or property of the composite support material may conform to the morphology or the surface chemistry or property of the catalyst support material.

In some cases, CVD may be used to deposit a composite support material comprising boron nitride on the catalyst support. A thin layer of the composite support material may be deposited on a surface layer of the catalyst support. CVD may be used to create a network of the composite support material on the existing catalyst support and/or within one or more pores of the catalyst support material. In some cases, the composite support material may comprise various metal oxides (e.g., titanium oxide or one or more other two-dimensional (2D) or three-dimensional (3D) materials).

Depositing the composite support material as an additional layer on top of the catalyst support may be advantageous over the use of a powder form of the composite support material, since a powder form may be difficult to use in a reactor due to the resulting pressure drop. Although compressing the powder into a pellet form can solve pressure drop issues, the composite support materials within the body of the pellet may not be fully utilized, which is wasteful and inefficient. In some cases, a powder may refer to a granular substance comprising a significant portion of particles that comprise sizes less than 1 mm in a dimension. In some cases, the significant portion may be at least about 5, 10, 20, 30, 40, 50, 60, 70, 80, 90, 95, 99 by wt %, vol %, or % by count.

After the composite support material is deposited on the catalyst support material, the one or more active metals may be deposited on the catalyst support material and/or the composite support material. The active metals may be deposited using CVD. The active metals may be deposited on top of the composite support and also within the one or more modified pores of the catalyst support material as active metal nanoparticles. This may facilitate decomposition of any ammonia molecules that penetrate through the pores of the catalyst support. The deposition of the active metal nanoparticles on the composite support may also be referred to herein as an impregnation of the composite support with one or more active metal nanoparticles.

Once deposited on or within the catalyst support material and/or the composite support material, the active metal nanoparticles may grow according to a morphology and/or a physical or chemical property of the composite support material. In some cases, the composite support material may comprise a hexagonal shaped grain. The active metal nanoparticles may grow while maintaining a grain shape corresponding to the grain shape of the composite support material. In some cases, the active metal nanoparticles may grow while maintaining a hexagonal grain shape. The composite support material may provide a 2D structure or platform for ruthenium growth. The ruthenium may grow while conforming to a structure of the composite support material. In some instances, the composite support material may comprise boron nitride. The Ruthenium may grow while maintaining the hexagonal morphology of the composite support material. In some cases, the catalyst may undergo one or more thermal treatments in a vacuum state and/or in the presence of various gases such as hydrogen gas or ambient air. Such thermal treatments may be used to thermally activate the active metal nanoparticles embedded in the composite support structure to facilitate the change in the morphology and/or the physical or chemical properties of the active metal nanoparticles to conform to the morphology and/or the physical or chemical properties of the materials or particles (e.g., atoms or molecules) constituting the composite support.

In some cases, the composite material and/or the one or more active metal nanoparticles embedded in the composite material may be promoted (e.g., with cesium) to change an electron state or an electron density of the active metal nanoparticles. As described above, the active metal nanoparticles may comprise, for example, ruthenium. In some cases, the modified electron state or electron density may facilitate recombinative nitrogen desorption and/or N—H bond cleavage during an ammonia decomposition reaction The methods and processes disclosed herein for fabricating composite catalysts may be implemented to produce catalysts with one or more desirable properties or performance characteristics (e.g., efficient hydrogen production). The catalysts may lower the activation energy barrier for the ammonia decomposition reactions, and can facilitate reactions at lower temperatures while increasing throughput and enhancing the efficient utilization of precious metals. The presently disclosed methods and processes may be adapted and scaled for economical mass fabrication of high performance, highly efficient catalysts.

Figure 7:
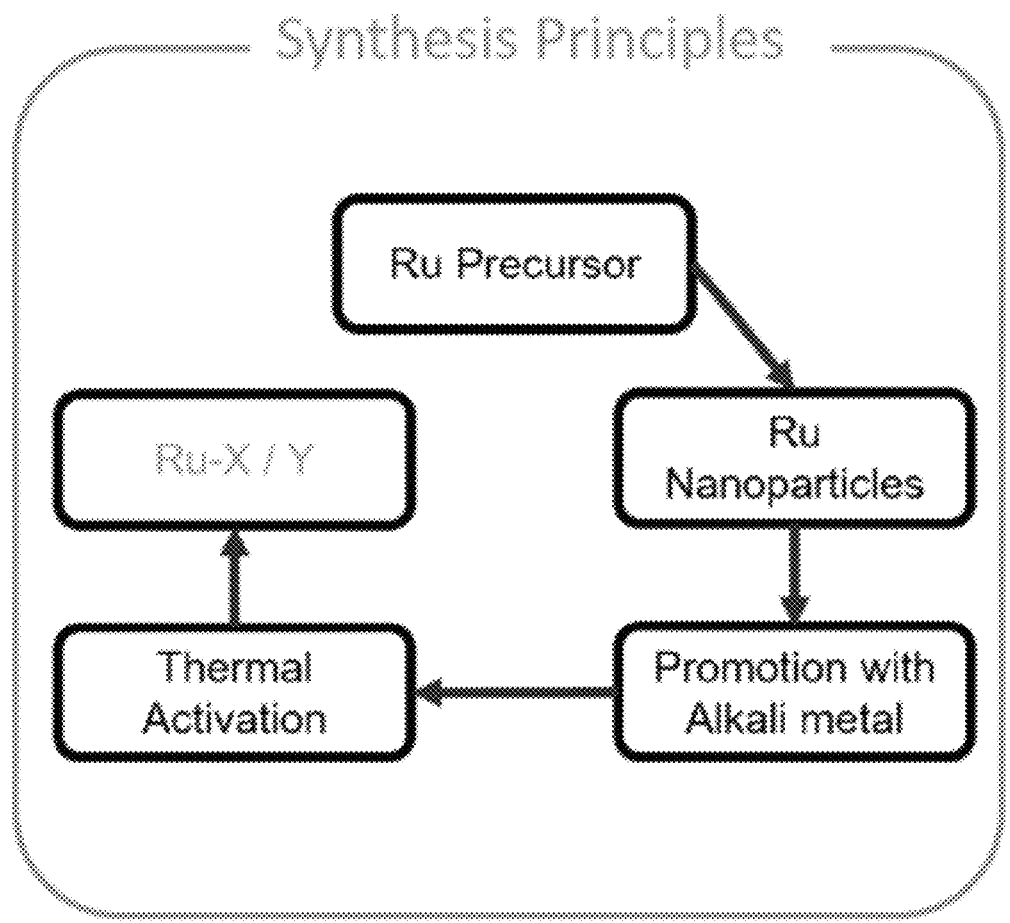
FIG. 7 schematically illustrates an exemplary process for processing a precursor material, in accordance with some embodiments.

FIG. 7 shows an exemplary method for synthesizing the one or more active metal nanoparticles. In some cases, the active metal nanoparticles may be fabricated from a precursor material (e.g., a precursor material comprising ruthenium). The active metal nanoparticles may be promoted with one or more alkali metals. The promoters may comprise one or more substances (e.g., co-catalysts) that can be added to increase ammonia conversion efficiency or selectivity. The one or more active metal nanoparticles may undergo one or more thermal treatments that thermally activate the active metal nanoparticles so that the active metal nanoparticles undergo growth and a change in morphology or physical/chemical property to mirror the morphology and/or the physical or chemical properties of the composite support material in which or on which the active metal nanoparticles are deposited. The methods described herein may be used to control the morphology, surface chemistry, and/or the dispersion of the active metal nanoparticles, and to control interactions between the active metal nanoparticles and the composite support or catalyst support. The methods of the present disclosure may also be used to optimize one or more active sites on the active metal nanoparticles for breaking down and decomposing or cracking one or more ammonia molecules.

The optimized catalysts described herein may exhibit enhanced ammonia decomposition performance and increased ammonia ammonia conversion efficiencies. The ammonia conversion efficiency for the optimized catalysts may be a function of reaction temperature. In some cases, the ammonia conversion efficiency may reach up to at least about 90% at reaction temperatures of about 500 degrees Celsius. In some cases, the ammonia conversion efficiency may range from about 70% to about 99% at reaction temperature ranging from about 300 degrees Celsius to about 600 degrees Celsius or more.

In some embodiments, the catalyst fabrication methods may comprise a thermal treatment under reactive gases. Such thermal treatment may be used to modify the porosity of the support for optimized mass transfer. Such thermal treatment may also be used to modify one or more properties of the support (e.g., the basicity or acidity of the support) for better surface modification results.

In some embodiments, the catalyst fabrication methods may comprise a surface modification and coating step. The surface modification and coating step may comprise an intermediate layer deposition by PVD or CVD. PVD or CVD may be used to coat a support geometry with a thin, uniform layer of functional materials. The coating layer may have a thickness that ranges from about at least about 1 nanometer to about 20 nanometers or more. The functional materials may serve as a platform for nanoparticle growth. In some cases, the morphology and/or the physical or chemical properties of the functional materials may influence a growth and/or a morphology or a surface chemistry of the nanoparticles.

In some embodiments, the catalyst fabrication methods may comprise impregnation of active metal nanoparticles. The impregnation may comprise precursor impregnation with vacuum vapor deposition or incipient wet impregnation. This can allow for control of the precursor anchoring on the functional materials.

In some embodiments, the catalyst fabrication methods may comprise promoting and thermal, physical, chemical or electrochemical activation. Promoting may comprise impregnation of promoter materials (e.g., alkali metals and or alkaline-earth metals) into the active metal and/or composite support material to facilitate electron density modification and modification or optimization of a morphology or an active site of the catalyst. Thermal and/or chemical activation may also be used to modify the morphology of the active metal nanoparticles under a reducing environment (e.g., an environment comprising hydrogen gas) or in the presence of one or more noble gases.

Figure 8A:
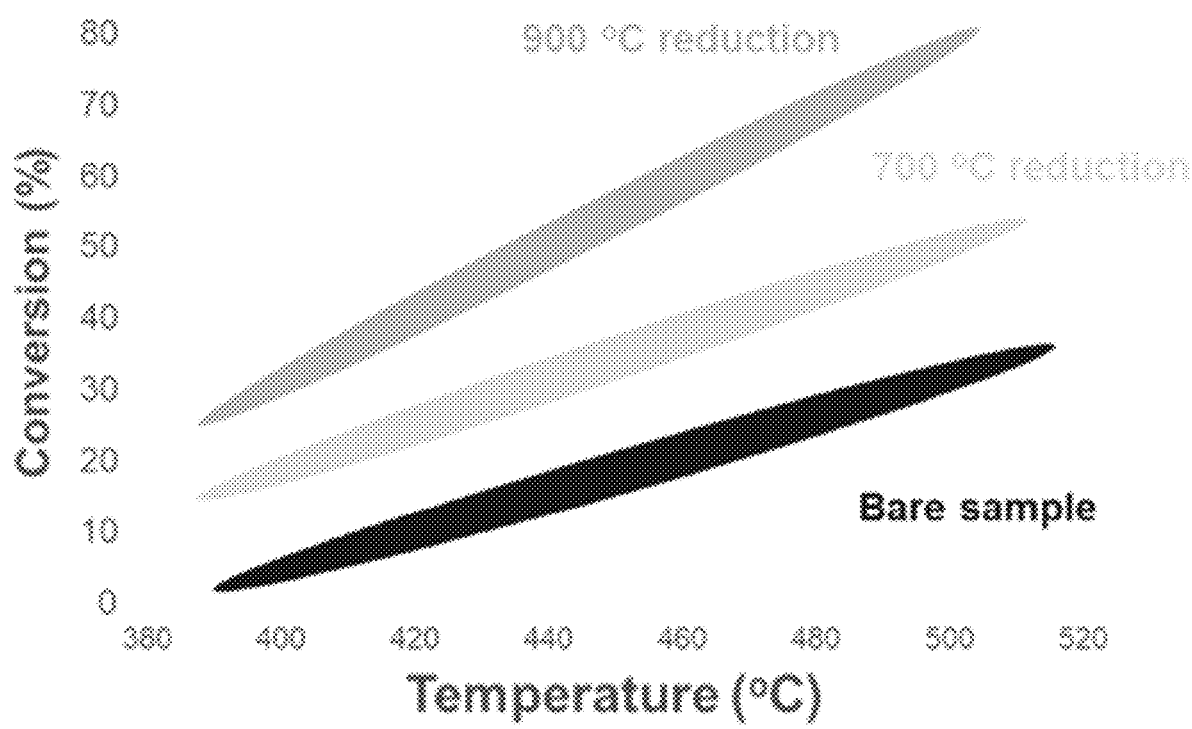
FIG. 8A schematically illustrates the effects of reducing a catalyst on ammonia conversion efficiency, in accordance with some embodiments.

FIG. 8A schematically illustrates the effects of reducing a catalyst on ammonia conversion efficiency, in accordance with some embodiments of the present disclosure. The catalysts of the present disclosure may be doped, promoted and/or thermally treated in an appropriate manner to optimize catalyst performance and ammonia conversion efficiency. Compared to a bare sample catalyst (i.e., a catalyst that has not undergone doping, promotion and/or thermal treatment), a catalyst that has been doped, promoted and thermally treated may exhibit a higher ammonia conversion efficiency. A higher temperature or treatment time may result in better performance of the catalyst. For example, a bare sample catalyst may exhibit up to about a 30% ammonia conversion efficiency at temperatures of about 500° C., whereas a catalyst that has been doped, promoted and thermally treated at 700° C. may exhibit at least about a 60% ammonia conversion efficiency or more at temperatures of about 500° C. Further, a catalyst that has been doped, promoted and thermally treated at 900° C. may exhibit at least about an 80% ammonia conversion efficiency or more at temperatures of about 500° C.

Figure 8B:
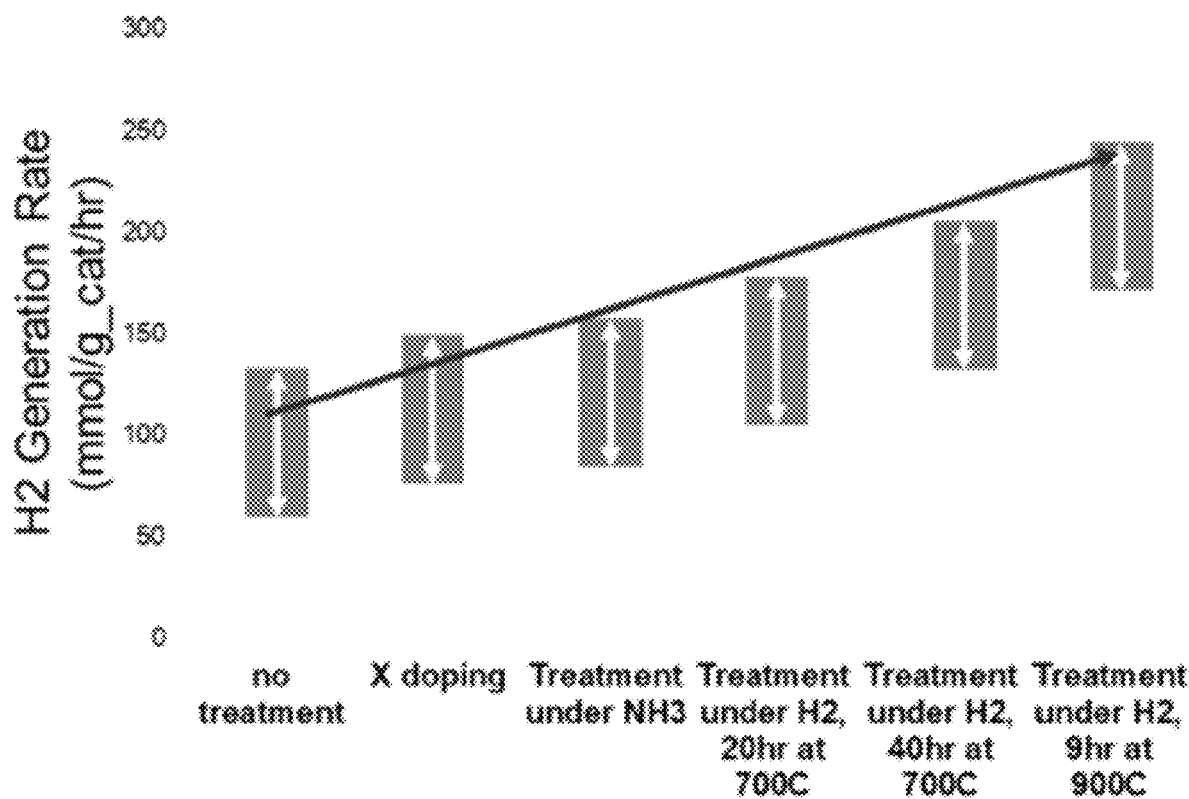
FIG. 8B schematically illustrates the effects of thermally treating a catalyst on hydrogen generation or production rates, in accordance with some embodiments.

FIG. 8B schematically illustrates the effects of thermally treating a catalyst on hydrogen generation or production rates, in accordance with some embodiments, in accordance with some embodiments. In some cases, the hydrogen generation rate for catalysts may increase by at least about 2 times or more with appropriate thermal treatments. For example, a bare catalyst with no treatment may have a hydrogen generation rate that is less than about 125 mmol of hydrogen per gram of catalyst material per hour. A catalyst that has been doped may have a hydrogen generation rate that is about 150 mmol of hydrogen per gram of catalyst material per hour. A catalyst that has undergone thermal treatment under ammonia may have a hydrogen generation rate that is greater than about 150 mmol of hydrogen per gram of catalyst material per hour. A catalyst that has undergone thermal treatment under hydrogen for about 20 hours at about 700° C. may have a hydrogen generation rate that is at least about 175 mmol of hydrogen per gram of catalyst material per hour. A catalyst that has undergone thermal treatment under hydrogen for about 40 hours at about 700° C. may have a hydrogen generation rate that is at least about 200 mmol of hydrogen per gram of catalyst material per hour. A catalyst that has undergone thermal treatment under hydrogen for about 9 hours at about 900° C. may have a hydrogen generation rate that is at least about 250 mmol of hydrogen per gram of catalyst material per hour.

Figure 8C:
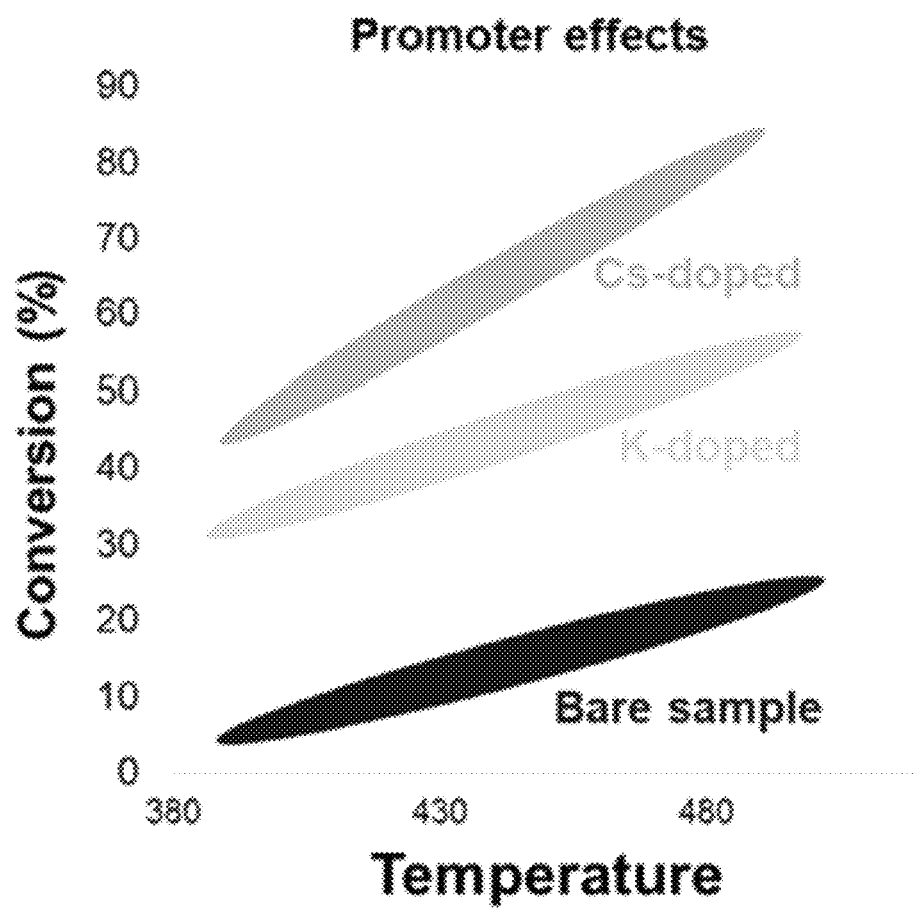
FIG. 8C schematically illustrates the effects of active metal promotion of a catalyst on ammonia conversion efficiency, in accordance with some embodiments.

FIG. 8C schematically illustrates the effects of active metal promotion of catalysts on ammonia conversion efficiency, in accordance with some embodiments of the present disclosure. The catalysts of the present disclosure may be promoted with one or more alkaline metals. In some cases, cesium may be one of the most effective promoters for X—$Al_2O_3$ catalysts. However, in some cases, excessive promotor incorporation may deteriorate catalyst performance and hydrogen generation or production rates. As such, an optimum promoter amount exists for catalyst materials. The catalysts of the present disclosure may be doped, promoted and/or thermally treated in an appropriate manner to optimize catalyst performance and hydrogen generation or production rates.

In some cases, a bare sample catalyst may exhibit an ammonia conversion efficiency of at most about 20% at temperatures of about 500° C. A catalyst that has been promoted with potassium may exhibit an ammonia conversion efficiency that is at least about 60% or more at temperatures of about 500° C. A catalyst that has been promoted with cesium may exhibit an ammonia conversion efficiency that is at least about 85% or more at temperatures of about 500° C.

Figure 8D:
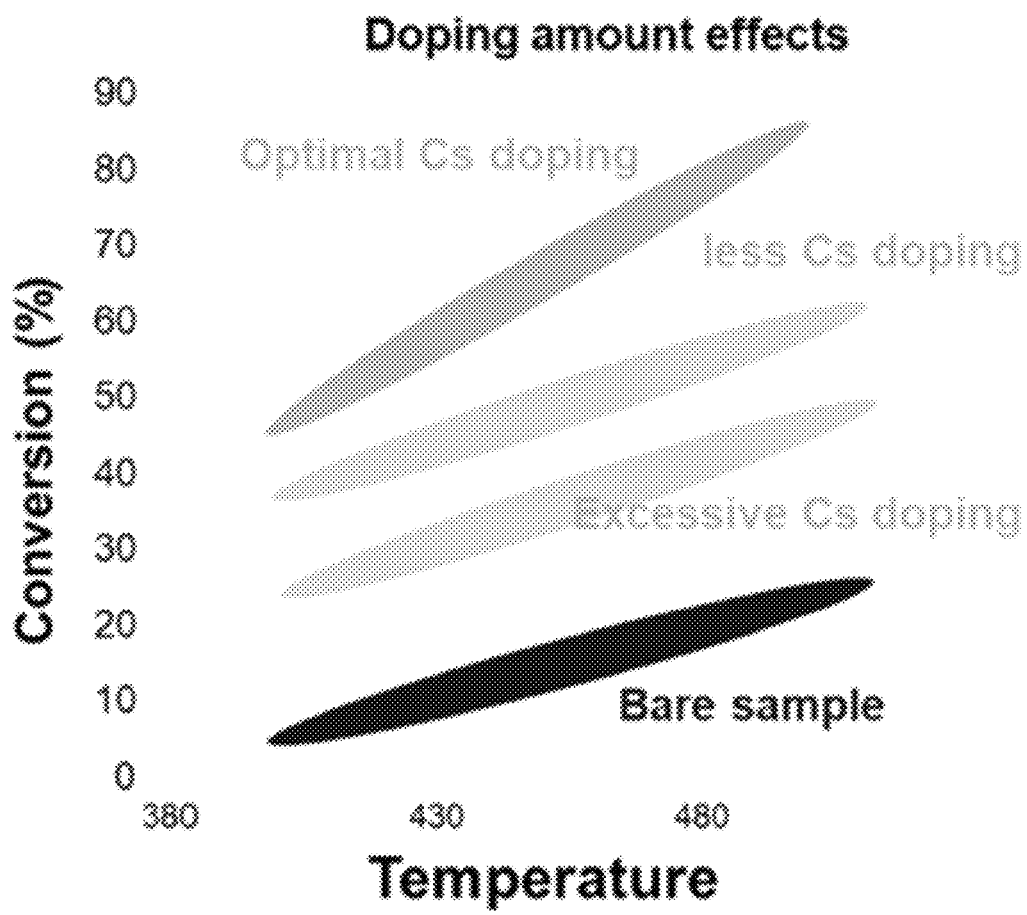
FIG. 8D schematically illustrates the effects of doping catalysts on ammonia conversion efficiency, in accordance with some embodiments.
Figure 8E:
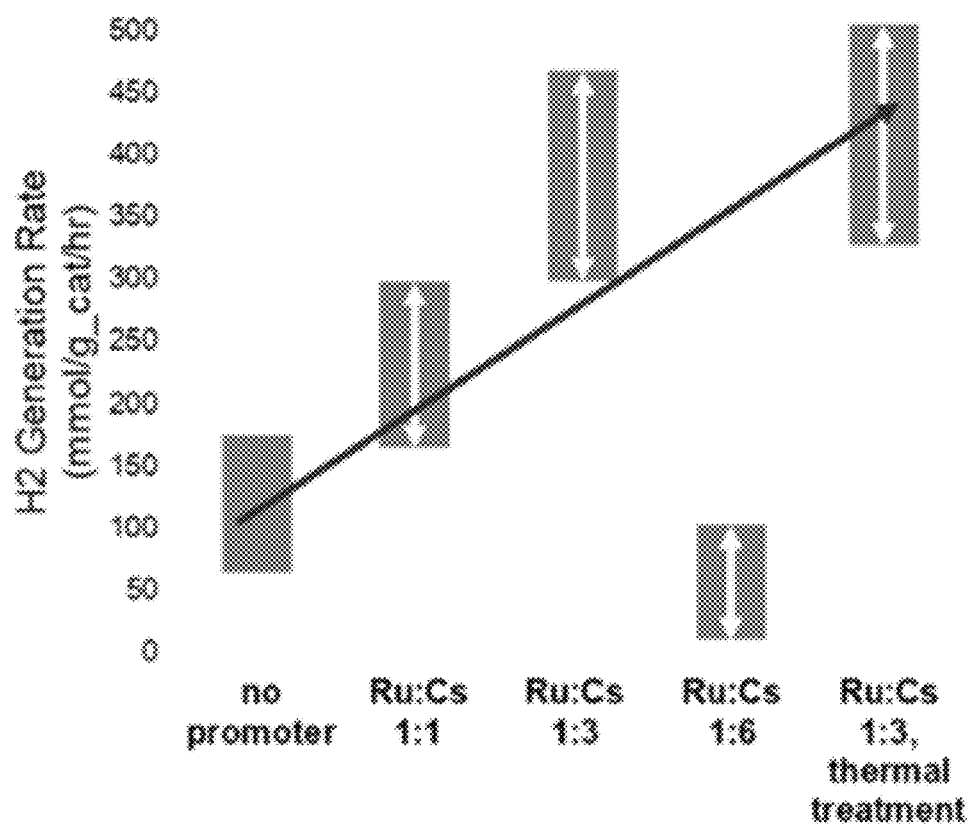
FIG. 8E schematically illustrates the effects of doping catalysts on ammonia conversion efficiency, in accordance with some embodiments.

FIG. 8D and FIG. 8E schematically illustrate the effects of doping catalysts on ammonia conversion efficiency and hydrogen generation or production rate, respectively, in accordance with some embodiments. In some cases, a catalyst with optimal levels of promoter may exhibit an ammonia conversion efficiency that is at least about 85% or more at temperatures of about 500° C. On the other hand, catalysts with less than optimal promoter levels or excessive promoter levels may have a lower ammonia conversion efficiency (e.g., between about 20% to about 60% or less).

As shown in FIG. 8E, the promoter amount may also affect hydrogen generation or production rates. For example, a catalyst with no promoters may have a hydrogen generation rate that is at most about 175 mmol of hydrogen per gram of catalyst material per hour. If the molar ratio of active metals to promoter materials is about 1:1 (e.g., 1:1 for ruthenium to cesium), the hydrogen generation rate may be up to at least about 300 mmol of hydrogen per gram of catalyst material per hour. If the molar ratio of active metals to promoter materials is about 1:3 (e.g., 1:3 for ruthenium to cesium), the hydrogen generation rate may be up to at least about 450 mmol of hydrogen per gram of catalyst material per hour. A catalyst with a molar ratio of active metals to promoter materials of about 1:3 (e.g., 1:3 for ruthenium to cesium) may exhibit even higher hydrogen generation or production rates (e.g., at least about 500 mmol of hydrogen per gram of catalyst material per hour) if subjected to one or more thermal treatments as discussed elsewhere herein. However, if the molar ratio of active metals to promoter materials is excessively increased to about 1:6 (e.g., 1:6 for ruthenium to cesium), the hydrogen generation rate may drop to less than about 100 mmol of hydrogen per gram of catalyst material per hour.

Materials

In any of the embodiments described herein, the catalyst support materials may comprise, for example, a metal oxide based support having one or more micropores or mesopores. In some cases, the support materials may comprise, for example, aluminum oxide ($Al_2O_3$) or nickel (Ni) based metal foams. In some embodiments, the catalyst support material may comprise one or more of aluminum oxide ($Al_2O_3$), magnesium oxide (MgO), cerium dioxide ($CeO_2$), silicon dioxide ($SiO_2$), silicon carbide (SiC), yttrium oxide ($Y_2O_3$), one or more zeolites (e.g., MFI zeolite, MCM-41 zeolite, Y type zeolite, X type zeolite), titanium dioxide ($TiO_2$), zirconium dioxide ($ZrO_2$), lanthanum oxide ($La_2O_3$), or chromium oxide ($Cr_2O_3$). In some embodiments, the catalyst support material may comprise one or more of $Al_xO_y$, $Mg_xO_y$, $Ce_xO_y$, $Si_xO_y$, $Y_xO_y$, $Ti_xO_y$, $Zr_xO_y$, $La_xO_y$, or $Cr_xO_y$.

In any of the embodiments described herein, the composite coating materials may comprise a carbon-based material, a boron-based material, or a metal oxide. The carbon-based material may comprise, for example, activated carbon (AC), one or more carbon nanotubes (CNT), carbon nanofibers (CNF), graphene oxide (GO), graphite, one or more carbon nanoribbons, or reduced graphene oxide (rGO). The boron-based material may comprise, for example, hexagonal boron nitride (hBN), boron nitride nanotubes (BNNT), or boron nitride nanosheets (BNNS). The metal oxide may comprise, for example, $TiO_2$, MgO, $La_2O_3$, $CeO_2$, $Y_2O_3$, one or more $CeO_2$ nanotubes, nanorods or nanocubes, mesoporous silica (e.g., KIT-6), or $ZrO_2$.

In any of the embodiments described herein, the active metals or the active metal nanoparticles may comprise, for example, ruthenium (Ru), nickel (Ni), cobalt (Co), iron (Fe), copper (Cu), molybdenum (Mo), iridium (Ir), rhenium (Re), platinum (Pt), or palladium (Pd). The one or more active metals may be fabricated from one or more precursor materials. The precursor materials may comprise, for example, Ruthenium Chloride ($RuCl_3$), Ruthenium Nitrosylnitrate ($Ru(NO)(NO_3)_3$), Triruthenium dodecacarbonyl ($Ru_3(CO)_{12}$), Ruthenium acetylacetonate ($Ru(acac)_3$), Ruthenium nitrate ($Ru(NO_3)_3$), Ruthenium hexaammine chloride ($Ru(NH_3)_6Cl_3$), Cyclohexadiene ruthenium tricarbonyl ($(CHD)Ru(CO)_3$), Butadiene ruthenium tricarbonyl ($(BD)Ru(CO)_3$), or Dimethyl butadiene ruthenium tricarbonyl ($(DMBD)Ru(CO)_3$).

As described above, in some cases one or more promoter(s) or promoting materials may be used to modify or enhance an electron density of the active metal nanoparticles and/or the composite support material. In any of the embodiments described herein, the one or more promoters or promoting materials may comprise, for example, cesium (Cs), rubidium (Rb), potassium (K), sodium (Na), barium (Ba), strontium (Sr), calcium (Ca), or magnesium (Mg). In some cases, excessive concentrations of promoter materials may deteriorate the catalyst performance and ammonia conversion efficiency (i.e., optimum amount of doping material exists). As discussed above, the catalysts of the present disclosure may have one or more promoters added therein in appropriate amounts or relative concentrations to optimize catalyst performance and ammonia conversion efficiency.

In some embodiments, one or more layers of a composite material may be coated on the catalyst support material. The composite material may comprise one or more layers of boron nitride. The one or more layers may have a thickness of at most about 10 nanometers.

In some embodiments, the catalyst support with the layer of composite material deposited on the catalyst support may be impregnated with one or more active metal nanoparticles. In some cases, the active metal nanoparticles may be deposited on the composite layer, and the morphology of the active metal nanoparticles may be modified by subjecting the nanoparticles to one or more thermal treatment methods. In some cases, the nanoparticles may have a size ranging from about 1 nanometer to about 50 nanometers. In some cases, the dispersion of the nanoparticles may range from about 10% to about 60%. As used herein, dispersion may refer to the number of active metal atoms that are exposed on a surface of the active metal nanoparticles relative to the total number of atoms constituting the catalyst or a surface area or volume of the catalyst. The active metal atoms that are exposed on a surface of the catalyst may be capable of binding with one or more ammonia molecules using one or more active sites (also referred to herein as binding sites) of the active metal nanoparticles. As described elsewhere herein, the active sites or binding sites of the active metal nanoparticles may be optimized by subjecting the active metal nanoparticles to one or more thermal treatments that allow the active metal nanoparticles to adopt a morphology of the particles constituting the composite material layer.

In some embodiments, the optimized catalysts disclosed herein may have a hydrogen production rate that is greater than that of conventional ruthenium catalysts. The hydrogen production rate based on the active metal content of the optimized catalysts may be greater than that of conventional catalysts by a factor of at least about 1, 2, 3, 4, 5, 6, 7, 8, 9, 10, or more. In some cases, the optimized catalysts may exhibit at least about a 90% conversion efficiency of ammonia to hydrogen at 450° C. and a gas hourly space velocity (GHSV) of under 10 liters per hour per gram of catalyst. In some cases, the optimized catalysts may exhibit a nitrogen desorption activation energy that is less than that of conventional ruthenium catalysts.

Figure 9:
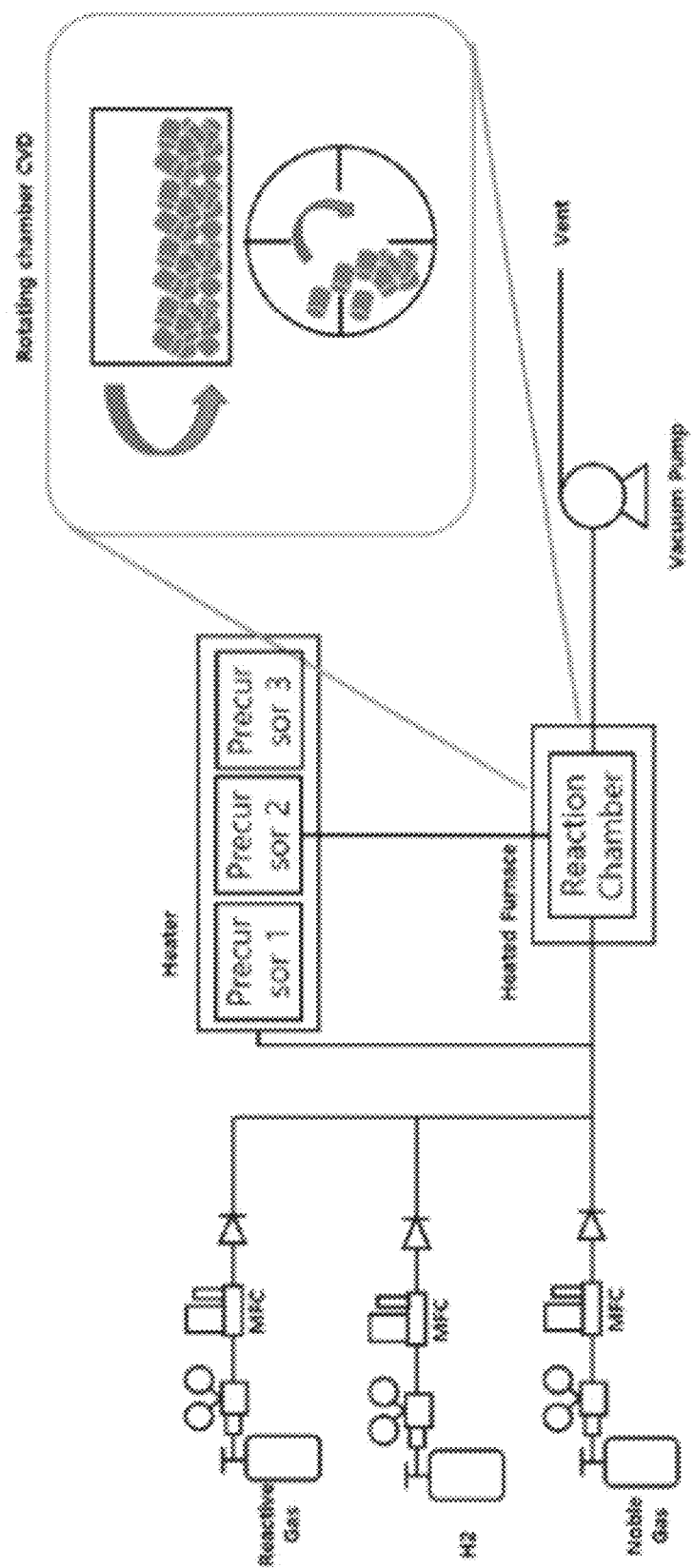
FIG. 9 schematically illustrates an exemplary system for fabricating various catalyst materials, in accordance with some embodiments.

FIG. 9 schematically illustrates a system for mass fabrication of optimized catalysts. The system may comprise a reaction chamber comprising a heated furnace and a rotatable chamber for housing one or more catalyst supports. The rotatable chamber may be configured for CVD (e.g., CVD of a composite material on the catalyst supports and/or CVD of one or more active metals on the composite material layer and/or the catalyst supports). The one or more catalyst supports may be processed in the reaction chamber to produce the optimized or modified catalysts described elsewhere herein. CVD may occur as the rotatable chamber rotates, which allows deposition of the composite materials or the active metals on different sides, portions, or surface regions of the catalyst supports. The heated furnace may comprise one or more heating units configured to heat the one or more catalyst supports to optimize one or more pore characteristics, a morphology, and/or one or more physical or chemical properties of the one or more catalyst supports. In some cases, the one or more physical or chemical properties may comprise a surface chemistry or property of the one or more catalyst supports. The morphology may comprise, for example, a pore structure, a pore shape, a pore size distribution, a grain structure, a grain size, a grain shape, a crystal structure, a flake size, or a layered structure. The surface chemistry or property may comprise, for example, an Arrhenius acidity or basicity, a Lewis acidity or basicity, a surface hydroxyl group density, or a hydrophilicity or hydrophobicity. In some cases, the one or more heating units may be configured to heat the catalyst supports comprising (i) the layer of the first precursor material and (ii) the layer of the second precursor material to thermally, physically, electrochemically and/or chemically activate the one or more active metal nanoparticles to facilitate a growth and a change in a morphology and/or surface chemistry or property of the nanoparticles.

The reaction chamber may be in fluid communication with a vacuum pump. The vacuum pump may be used to create a vacuum environment in the reaction chamber. The catalysts of the present disclosure may be fabricated in the vacuum environment created using the vacuum pump.

In some cases, the reaction chamber may be in fluid communication with a reactive gas source. The reactive gas may be provided to the reaction chamber during one or more thermal treatments of the catalyst. In some cases, the reaction chamber may be in fluid communication with a source of hydrogen gas. The hydrogen gas may be provided to the reaction chamber during one or more thermal treatments of the catalyst. In some cases, the reaction chamber may be in fluid communication with a source of noble gas. The noble gas may be provided to the reaction chamber during one or more thermal treatments of the catalyst. The reactive gas, the hydrogen gas, and/or the noble gas may be provided to the reaction chamber at a same time, or at distinct time periods or time windows. In some cases, the reactive gas may be provided at a first point in time, the hydrogen gas may be provided at a second point in time, and the noble gas may be provided at a third point in time. The first, second, and third points in time may correspond to different stages or phases of catalyst production or fabrication. In some cases, the first, second, and third points in time may correspond to different stages or phases of one or more thermal treatments for the catalyst. The flow of the reactive gas, the hydrogen gas, and/or the noble gas to the reaction chamber may be controlled using one or more mass flow controllers (MFCs). In some cases, the reactive gas may be provided to the reaction chamber at a first mass flow rate, the hydrogen gas may be provided to the reaction chamber at a second mass flow rate, and the noble gas may be provided to the reaction chamber at a third mass flow rate. The first, second, and third mass flow rates may be the same. Alternatively, the first, second, and third mass flow rates may be different.

In some embodiments, the reaction chamber may be in fluid communication with one or more sources of precursor materials. The one or more sources of precursor materials may comprise a first source of precursor material, a second source of precursor material, and a third source of precursor material. The first source of precursor material may comprise one or more materials for surface modification of a catalyst support. The first source of precursor material may comprise, for example, one or more composite support materials as described elsewhere herein. The second source of precursor material may comprise one or more materials for metal deposition on a catalyst support. The second source of precursor material may comprise, for example, one or more active metals or active metal nanoparticles as described elsewhere herein. In some cases, the one or more active metal nanoparticles may be configured to grow according to a morphology and/or surface chemistry or property of the first precursor material when thermally and/or chemically activated. The third source of precursor material may comprise one or more materials for doping or promotion. The third source of precursor material may comprise, for example, one or more dopants or promoter materials (e.g., alkali metals) to facilitate electron density modification, as described elsewhere herein. Doping or promotion may comprise impregnation of one or more dopants or promoters, respectively, in the layer of the first precursor material, the layer of the second precursor material, or the one or more active metal nanoparticles for morphology modification, active site modification, electron density modification, and/or electron state modification.

In some cases, the morphologies and/or surface chemistry or property of the first precursor material may conform to the morphologies and/or surface chemistry or property of the one or more catalyst supports. In some cases, the morphologies and/or surface chemistry or property of the second precursor material may conform to the morphologies and/or surface chemistry or property of the one or more catalyst supports and/or the first precursor material.

In some embodiments, the system may comprise a heater for heating the one or more sources of precursor material. The heater may or may not be in thermal communication with the reaction chamber. The heater may or may not be in thermal communication with the heated furnace of the reaction chamber. In some embodiments, the heater and/or the heated furnace may comprise, for example, an electrical heater and/or a combustion heater.

In some cases, the system may be configured for mass production of various optimized or modified catalysts materials that are usable to perform efficient decomposition or cracking of ammonia. The system may allow all processes (e.g., thermal or chemical treatment of the catalyst support for pore modification, deposition of one or more layers of a composite support material on the catalyst support, active metal nanoparticle impregnation, thermal treatment of the catalyst to optimize the morphology of the active metal nanoparticles, doping of the catalyst to optimize electron density, etc.) to occur simultaneously or near simultaneously. In some embodiments, the system may be configured for in-situ thermal treatment of the catalyst or precursor materials.

In some cases, the rotatable reaction chamber may be configured to provide a reducing environment for thermal and/or chemical activation of the one or more active metal nanoparticles. The reducing environment may comprise, for example, hydrogen or ammonia gas or one or more noble gases. In some cases, the hydrogen gas and the one or more noble gases may provide a reducing environment during a thermal and/or chemical activation of the one or more active metal nanoparticles.

Reactors or Reformers with Optimized Catalysts

The catalysts of the present disclosure may be used compatibly with various power systems (e.g., reactors or reformers) for decomposing or cracking ammonia to generate hydrogen. The power systems may comprise, for example, a reactor or a reformer that can perform a catalytic decomposition or cracking of ammonia to extract and/or produce hydrogen. Such reactor or reformer may be operated using heat energy. In some cases, the power system may comprise a combustor that generates heat energy to drive the operation of the reactor or reformer. In some cases, the heat energy may be generated from the combustion of a chemical compound (e.g., hydrogen or a hydrocarbon).

In some cases, the reactor or reformer may comprise an outlet configured to direct one or more fluids (e.g., ammonia, nitrogen, and/or hydrogen) to another system or subsystem. In some cases, the outlet may be configured to direct hydrogen gas produced by the reactor or reformer to one or more fuel cells and/or to one or more combustion engines. In some cases, the outlet may be configured to direct hydrogen gas produced by the reactor or reformer to one or more combustors to generate heat energy that can be used to power or heat the reactor or reformer (e.g., for autothermal heating or self-heating). In some cases, the outlet may be configured to direct hydrogen, nitrogen, and/or ammonia to at least one other reactor or reformer (e.g., for combustion of the hydrogen to heat the at least one other reactor or reformer).

The hydrogen generated using the optimized catalysts of the present disclosure may be provided to one or more fuel cells or proton-exchange membrane fuel cells (PEMFC) to generate electrical energy. The hydrogen generated using the optimized catalysts of the present disclosure may also be provided to one or more combustion engines to generate mechanical work or mechanical energy. The hydrogen that is generated and/or extracted using the reactor or reformer may be provided to one or more fuel cells or to one or more combustion engines, which may produce electrical energy or mechanical work to power one or more systems, subsystems, or devices requiring electrical or mechanical energy to operate. In some cases, partially generated and/or extracted hydrogen and nitrogen from a reactor or reformer and at least a portion of the remaining ammonia mixture may be provided to one or more other reactors or reformers to enable a continuous reforming process. The partially generated and/or extracted hydrogen and nitrogen and the remaining ammonia may be part of a partially cracked stream of ammonia. The partially cracked stream of ammonia may be generated using a reactor or a reformer having less than a 100% ammonia conversion efficiency. The partially cracked stream may be passed to one or more downstream reactors or reformers to minimize material waste and maximize an amount of ammonia that can be decomposed or cracked. In some cases, the hydrogen generated and/or extracted using the reactor or reformer may be provided to one or more other reactors or reformers. In such cases, the one or more other reactors or reformers may be configured to combust the hydrogen to generate additional thermal energy. Such additional thermal energy may be used to heat the one or more other reactors or reformers to facilitate a further catalytic decomposition or cracking of ammonia to extract and/or produce additional hydrogen.

In some cases, the reactors or reformers may be configured to heat up the optimized catalysts directly using resistance heating (e.g., by passing a current through the catalyst itself or through the catalyst support). In such cases, the reactors or reformers may comprise one or more electrodes for passing a current through the catalyst to heat the catalyst (e.g., by resistive heating or Joule heating). The one or more electrodes may comprise, for example, one or more copper electrodes. In other cases, the reactors or reformers may be configured to heat up the optimized catalysts by combusting hydrogen. The optimized catalysts may be configured to decompose ammonia into hydrogen and/or nitrogen when heated by combustion or resistance heating.

In some cases, the reactors or reformers may comprise one or more electrically conductive springs. The one or more electrically conductive springs may be provided adjacent to the optimized catalysts disclosed herein. In some cases, the one or more electrically conductive springs may be provided on opposite ends of the catalyst. The one or more electrically conductive springs may be in physical, electrical, and/or thermal communication with the catalyst, the catalyst bed, and/or the one or more electrodes used to perform direct resistive heating of the catalyst. The one or more electrically conductive springs may be configured to reduce thermal stresses on the catalyst when the catalyst is subjected to thermal cycling. The one or more electrically conductive springs may be configured to accommodate thermal expansions during heating of the catalyst and thermal contractions during cooling of the catalyst. The one or more electrically conductive springs may lighten and/or redistribute the mechanical load on the catalyst bed so that the catalyst bed can withstand multiple thermal cycles without breaking or fracturing. In some cases, the one or more springs may be configured to alleviate thermal stresses on the catalyst due to a thermal expansion or a thermal contraction of the catalyst during one or more thermal cycling procedures. The one or more springs may comprise, for example, copper springs. The use of the one or more electrically conductive springs may allow the reactor or reformer to provide fast startup capabilities with reduced or minimal thermal stresses on the catalyst bed during rapid temperature changes.

Hybrid Heating

In some cases, the optimized catalysts may undergo hybrid heating within a reactor or reformer. Such hybrid heating can improve heat transfer while minimizing reactor heat loss and increasing startup time. A hybrid heating design can also reduce a weight and a volume of the reactor or reformer and improve thermal management characteristics of the system while providing an optimized heat source for ammonia conversion.

In some cases, the optimized catalysts may be heated using one or more heat sources. In some cases, the one or more heat sources may comprise two or more heat sources or heating units. In some cases, the two or more heat sources may be the same or similar. In other cases, the two or more heat sources may be different. For example, a first heat source may be configured for joule heating, and a second heat source may be configured for combustion.

In some embodiments, the optimized catalysts may be heated using a plurality of heating units. The plurality of heating units may comprise a first heating unit configured to heat at least a first portion of a catalyst by combusting hydrogen and a second heating unit configured to heat at least a second portion of the catalyst using electrical heating. The term "electrical heating," as used herein, generally refers to heating performed at least in part by flowing electrons through a material (e.g., an electrical conduit). The electrical conduit may be a resistive load. In some examples, electrical heating may comprise Joule heating (i.e., heating that follows Ohm's law). Joule heating, also known as resistive, resistance, or Ohmic heating, may comprise passing an electric current through a material (e.g., the electrical resistor, the catalyst, the catalyst material, or the catalyst bed) to produce heat or thermal energy. In some cases, the catalyst may be used to generate hydrogen from a source material comprising the ammonia when the catalyst is heated using the plurality of heating units. In some embodiments, the first portion and the second portion may be the same portion of the catalyst. In other embodiments, the first portion and the second portion may be different portions of the catalyst. In some cases, the first portion and the second portion may overlap or partially overlap.

In some cases, a first heating unit of a reactor or reformer may be configured to heat a first portion of the catalyst based on a combustion of hydrogen gas generated using a secondary reactor or reformer. In some cases, the first heating unit may be configured to heat the first portion of the catalyst based on a combustion of leftover hydrogen gas from (i) one or more fuel cells in fluid communication with the reactor or (ii) a secondary reactor. In some cases, the second heating unit may be configured to heat a second portion of the catalyst by passing an electrical current through the second portion of the catalyst. In some cases, the first portion of the catalyst and the second portion of the catalyst may be contiguous (i.e., physical connected). In other cases, the first portion of the catalyst and the second portion of the catalyst may be separated by a third portion of the catalyst. The third portion of the catalyst may be positioned between the first and second portions of the catalyst. In some cases, the first and second portions of the catalyst may be in thermal communication with each other (e.g., either directly or indirectly via the third portion of the catalyst). In other cases, the first and second portions of the catalyst may not or need not be in thermal communication with each other.

In some embodiments, a heat load distribution between the first heating unit and the second heating unit may be adjustable to increase an ammonia conversion efficiency and/or to enhance a thermal efficiency of the reactor or reformer. The heat load distribution may comprise a heating power ratio corresponding to a ratio between a heating power of the first heating unit and a heating power of the second heating unit. The heating power of the first heating unit and the second heating unit may be adjusted in order to achieve a desired ammonia conversion efficiency and thermal efficiency. In some cases, the system may further comprise a controller or processor configured to control an operation of the first heating unit and the second heating unit to adjust the heat load distribution within the reactor module. In some cases, such adjustments in the heat load distribution may be implemented in real-time based on one or more sensor measurements (e.g., temperature measurements) or based on a performance of the reactor or reformer (e.g., ammonia conversion efficiency and/or thermal efficiency of the reactor or reformer). In some cases, heaters with two or more heating zones may be used to control power and heat distribution within the heater. In some cases, the system may comprise a plurality of heating units. The plurality of heating units may comprise at least two or more heating units. In some cases, a heat load distribution between the at least two or more heating units may be adjustable to increase an ammonia conversion efficiency and to enhance a thermal reforming efficiency of the reactor or reformer. In some cases, each of the at least two or more heating units may have one or more heating zones in the reactor or reformer to allow for a continuous heat distribution within one or more regions in the reactor module. In some cases, the at least two or more heating units may be configured to heat different zones in the reactor or reformer. In some cases, the at least two or more heating units may be configured to heat one or more same zones in the reactor or reformer.

Methods

In another aspect, the present disclosure provides a method for fabricating one or more catalysts for processing ammonia to generate hydrogen. The method may comprise subjecting a catalyst support to one or more physical or chemical processes to optimize one or more pores of the catalyst support. In some cases, the one or more physical or chemical processes for optimizing the one or more pores of the catalyst support may comprise a thermal treatment (i.e., controlled heating) of the catalyst support. In some cases, optimizing the one or more pores may comprise adjusting a size of the one or more pores, a pore density, and/or a pore volume of the catalyst support. In some cases, the method may further comprise thermally or chemically treating a surface of the catalyst support material to optimize the one or more pores and/or one or more surface morphologies. In some cases, the catalyst support comprises a bead, a pellet, a powder, a thin film, a monolith, a foam, reactor wall, heating element, wires, mesh, or a porous solid material form factor. In some cases, the catalyst is powderless, for example, majority of the catalyst may be greater than 1 mm dimension.

In some embodiments, the method may further comprise depositing a composite support material on the catalyst support, wherein the composite support material comprises a morphology, and (c) depositing one or more active metals on at least one of the composite support material and the catalyst support, wherein the one or more active metals comprise one or more nanoparticles configured to conform to the morphology of the composite support material, thereby optimizing one or more active sites on the nanoparticles for ammonia processing. In some cases, the composite support material may be deposited using chemical vapor deposition. In some cases, the one or more active metals may be deposited using chemical vapor deposition. The active metals may comprise one or more nanoparticles with one or more active sites to which one or more ammonia molecules are attachable. The one or more ammonia molecules may be configured to bind or attach to the one or more active sites of the one or more active metal nanoparticles. The positions, orientations, and/or density of the one or more active sites may be determined based at least in part on a morphology and/or surface chemistry or property of the composite support material. In some embodiments, the morphology may comprise a grain structure, a grain size, or a grain shape. In some cases, the catalyst support may comprise, for example, at least one of $Al_2O_3$, MgO, $CeO_2$, $SiO_2$, SiC, $Y_2O_3$, $TiO_2$, or $ZrO_2$. In some cases, the catalyst support may comprise, for example, at least one of $Al_xO_y$, $Mg_xO_y$, $Ce_xO_y$, $Si_xO_y$, $Y_xO_y$, $Ti_xO_y$, or $Zr_xO_y$. In some cases, the one or more active metals comprise, for example, at least one of ruthenium (Ru), nickel (Ni), rhodium (Rh), iridium (Ir), cobalt (Co), molybdenum (Mo), iron (Fe), platinum (Pt), chromium (Cr), palladium (Pd), or copper (Cu). In some cases, the composite support may comprise a carbon-based material, a boron-based material, or a metal oxide. The carbon-based material may comprise, for example, activated carbon (AC), one or more carbon nanotubes (CNT), one or more carbon nanofibers (CNF), graphene oxide (GO), graphite, or reduced graphene oxide (rGO). The boron-based material may comprise, for example, hexagonal boron nitride (hBN), boron nitride nanotubes (BNNT), or boron nitride nanosheets (BNNS). The metal oxide may comprise, for example, $TiO_2$, MgO, $La_2O_3$, $CeO_2$, $Y_2O_3$, one or more $CeO_2$ nanotubes, nanorods or nanocubes, mesoporous silica (e.g., KIT-6), $ZrO_2$, chromium oxide ($Cr_2O_3$), or calcium oxide (CaO). The metal oxide may comprise, for example, $Ti_xO_y$, $Mg_xO_y$, $La_xO_y$, $Ce_xO_y$, $Y_xO_y$, $Ce_xO_y$, $Zr_xO_y$, $Cr_xO_y$, or CaxOy. In some cases, the composite support may comprise YSZ, Hydrotalcite ($Mg_2$Al-LDO), MOF (MIL-101, ZIFs), Alkaline amide ($NaNH_2$, $Ca(NH_2)_2$, $Mg(NH_2)_2$), Inorganic electride (C12A7:e−), Halloysite nanotubes (HNT), $ABO_3$ Perovskite, $AB_2O_4$ Spinel, MCM-41.

In some embodiments, the method may further comprise thermally activating the one or more active metals. Thermally activating the one or more active metals may induce a growth of one or more nanoparticles of the active metals. In some cases, the one or more nanoparticles may be configured to grow while conforming to the morphology of the composite support material. In some cases, the method may further comprise promoting the catalyst, the active metal nanoparticles, and/or the composite support material of the catalyst with one or more promoters. The one or more promoters may comprise, for example, sodium (Na), potassium (K), rubidium (Rb), cesium (Cs), magnesium (Mg), calcium (Ca), strontium (Sr), or barium (Ba).

Computer Systems

Figure 10:
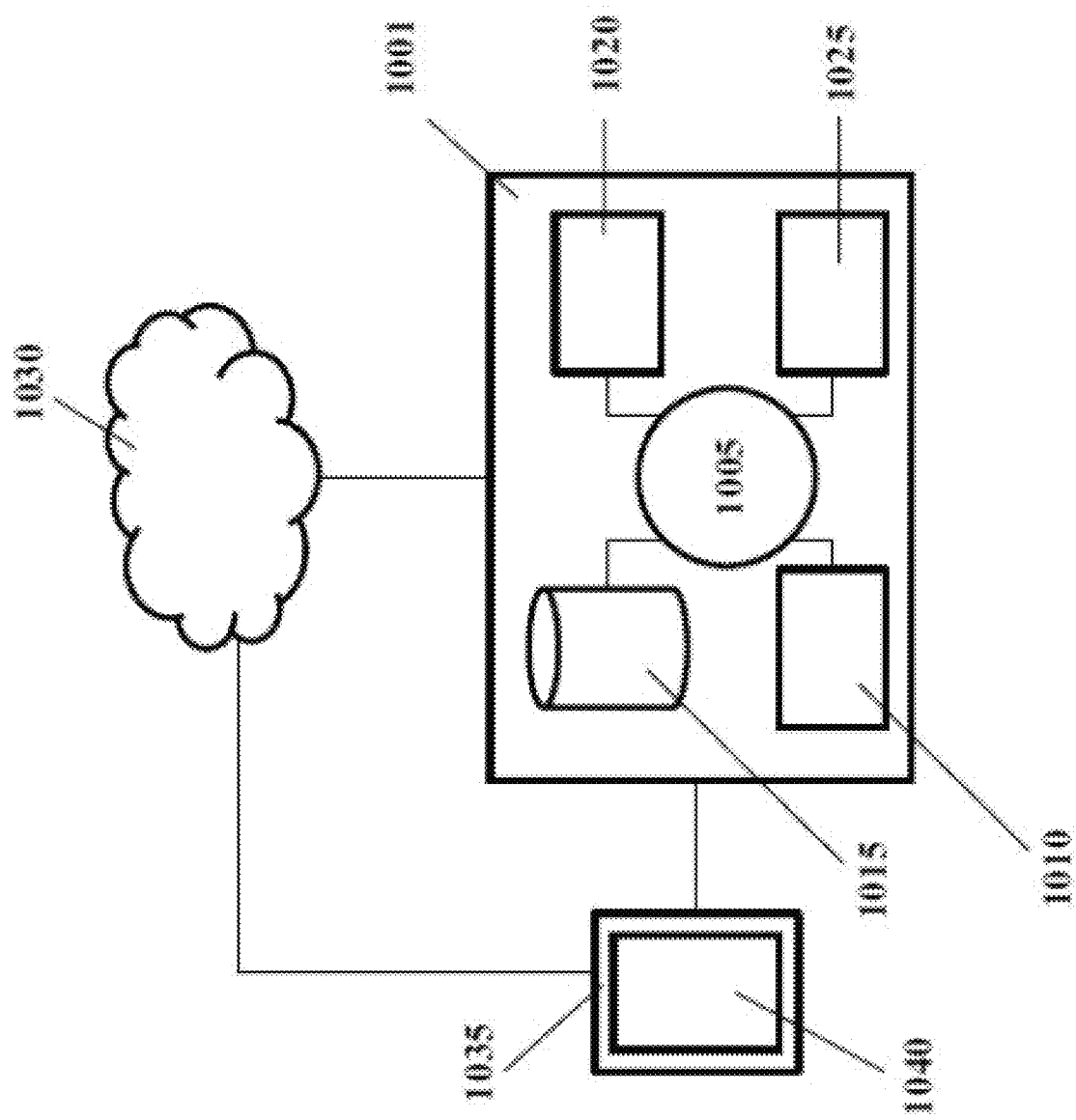
FIG. 10 schematically illustrates a computer system that is programmed or otherwise configured to implement methods provided herein.

In an aspect, the present disclosure provides computer systems that are programmed or otherwise configured to implement methods of the disclosure. FIG. 10 shows a computer system 1001 that is programmed or otherwise configured to implement a method for fabricating one or more catalysts. The computer system 1001 may be configured to, for example, control and/or monitor a flow of one or more precursor materials to a reaction chamber for fabricating one or more optimized catalysts, a flow of one or more additional fluids to the reaction chamber, wherein the one or more additional fluids comprise a reactive gas, hydrogen, or a noble gas, a rotation of a rotatable chamber of the reaction chamber, a deposition of various materials onto one or more catalyst supports provided within the rotatable chamber, wherein the various materials comprise a composite support material and/or one or more active metal nanoparticles as described elsewhere herein, a heating of the reaction chamber or the one or more catalyst supports to facilitate growth of the active metal nanoparticles and/or to a change in the morphology of the active metal nanoparticles, a heating of the one or more optimized catalysts to facilitate decomposition of ammonia into hydrogen, and/or a flow of hydrogen from a reactor or a reformer to one or more fuel cells to generate electricity. The computer system 1001 can be, for example, an electronic device of a user or a computer system that is remotely located with respect to the electronic device. The electronic device can be a mobile electronic device.

The computer system 1001 may include a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The storage unit 1015 can store files, such as drivers, libraries and saved programs. The storage unit 1015 can store user data, e.g., user preferences and user programs. The computer system 1001 in some cases can include one or more additional data storage units that are located external to the computer system 1001 (e.g., on a remote server that is in communication with the computer system 1001 through an intranet or the Internet).

The computer system 1001 can communicate with one or more remote computer systems through the network 1030. For instance, the computer system 1001 can communicate with a remote computer system of a user (e.g., an individual operating a reaction chamber for fabricating one or more optimized catalysts, an entity monitoring the operation of a reactor or a reformer comprising the one or more optimized catalysts, or an end user operating a device or a vehicle that can be powered using electrical energy derived or produced from the hydrogen generated using the reactor). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, a portal for a user to monitor or track an operation or a performance of one or more reaction chamber used to fabricate various optimized catalysts. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1005. For example, the algorithm may be configured to control an operation of one or more reaction chambers usable for fabricating optimized catalysts, based on one or more sensor readings (e.g., temperature measurements, flow rates, etc.). In some cases, the algorithm may be configured to control a flow of one or more precursor materials to a reaction chamber for fabricating one or more optimized catalysts, a flow of one or more additional fluids to the reaction chamber, wherein the one or more additional fluids comprise a reactive gas, hydrogen, or a noble gas, a rotation of a rotatable chamber of the reaction chamber, a deposition of various materials onto one or more catalyst supports provided within the rotatable chamber, wherein the various materials comprise a composite support material and/or one or more active metal nanoparticles as described elsewhere herein, a heating of the reaction chamber or the one or more catalyst supports to facilitate growth of the active metal nanoparticles and/or to a change in the morphology of the active metal nanoparticles, a heating of the one or more optimized catalysts to facilitate decomposition of ammonia into hydrogen, and/or a flow of hydrogen from a reactor or a reformer to one or more fuel cells to generate electricity.

Selection of Catalyst Precursors

In some cases, the ammonia decomposition reaction may be driven using a catalyst. The catalyst may comprise, for example, a ruthenium nanoparticle catalyst. The ruthenium nanoparticle catalyst may comprise one or more ruthenium nanoparticles. The ruthenium nanoparticle catalyst may be utilized to facilitate an ammonia decomposition reaction as described elsewhere herein, and may be fabricated by loading a given precursor onto an alumina carrier, or a modified alumina carrier, and performing a reduction at a high temperature.

In some embodiments, a metal salt or a metal salt hydrate, such as $MNO_3$, may be initially deposited on a surface of the alumina carrier, followed by high-temperature calcination to generate an M-Al oxide support. As used herein, M may refer to any type of metal. In some cases, the M-Al oxide may form an alumina supported perovskite phase, $MAlO_3/Al_2O_3$. In some cases, two or more types of metal salts or metal salt hydrates may be added to generate a mixed $M_1$-$M_2$-Al oxide support. Onto this support, a ruthenium precursor may be deposited, and the support and/or the ruthenium precursor may be reduced at an elevated temperature (e.g., an elevated temperature ranging from about 500° C. to about 1200° C.) to generate an optimized nanoparticle catalyst. In some cases, a promoter may be added to the catalyst in the form of electron donors, e.g., Cs or K, which can further improve ammonia conversion efficiency.

Figure 11:
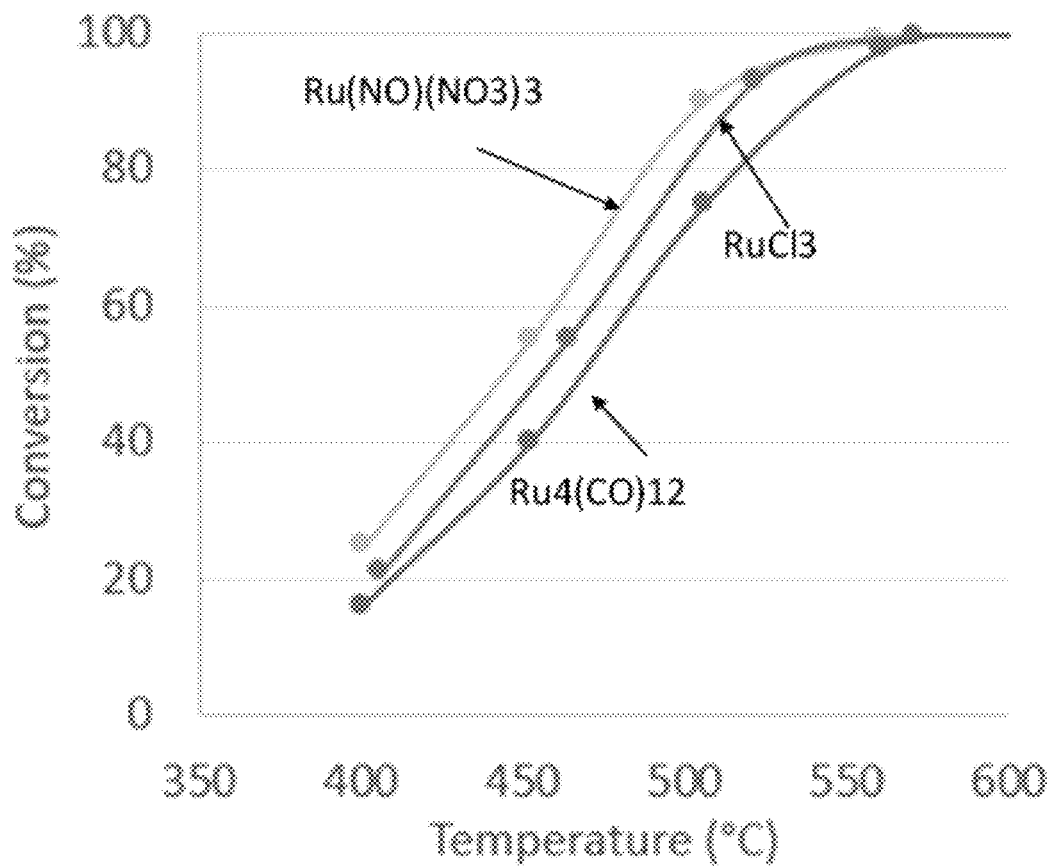
FIG. 11 illustrates a comparison of ammonia conversion efficiencies for various catalysts synthesized using different ruthenium precursors, in accordance with some embodiments.

In some cases, the ruthenium nanoparticle catalysts of the present disclosure may be synthesized using various ruthenium precursors comprising, for example, $Ru(NO)(NO_3)_3$, $RuCl_3$ and $Ru_3(CO)_{12}$. FIG. 11 shows the effect of ruthenium precursors on ammonia conversion efficiency for various catalysts synthesized using different precursors comprising $Ru(NO)(NO_3)_3$, $RuCl_3$ or $Ru_3(CO)_{12}$. In some cases, the ruthenium nitrosyl nitrate precursor may lead to a more active catalyst, as evidenced by the increased ammonia conversion efficiency for catalysts fabricated using a ruthenium nitrosyl nitrate precursor.

Catalyst Support Size

Figure 12:
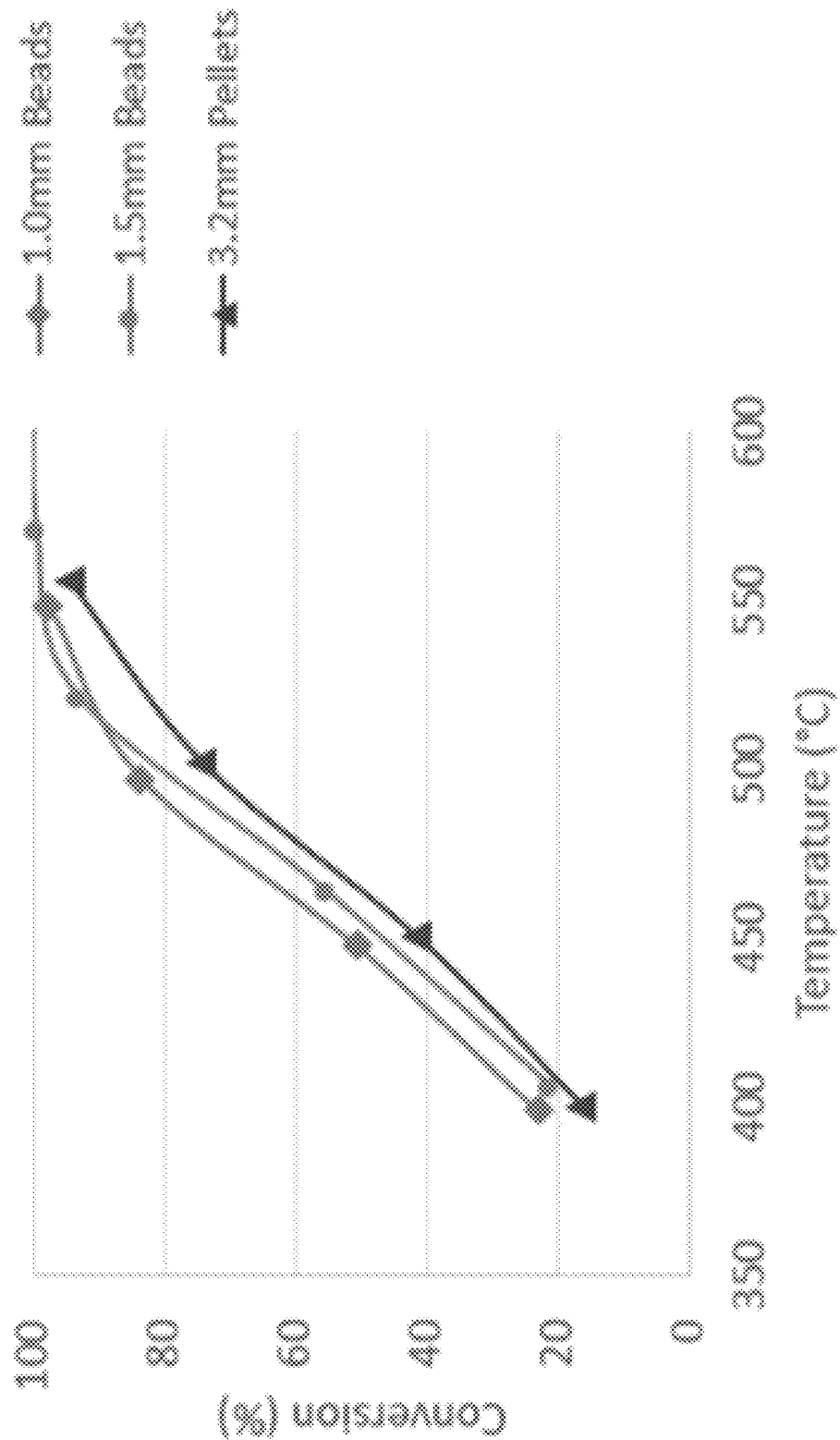
FIG. 12 illustrates a comparison of ammonia conversion efficiencies using various catalysts synthesized using different size alumina carriers, in accordance with some embodiments.

In some cases, the catalysts of the present disclosure may be synthesized using various alumina carriers. The alumina carriers may be in the form of a bead or a cylindrical pellet or a combination of both. In some cases, the alumina carrier may comprise any type of a porous solid material. In other cases, the alumina carrier may comprise a bead, a pellet, a powder, a monolith, a foam, or any combination thereof. FIG. 12 shows the effect of the physical properties and material composition of the alumina carrier or support on ammonia conversion efficiency for various catalysts synthesized using alumina carriers or support having different bead or pellet sizes. In FIG. 12, the legend denotes whether the carrier or support is in the form of a bead or a pellet (e.g., a cylindrical pellet), as well as the diameter of the bead in mm (or height and diameter in the case of the cylindrical pellet). For example, 1.0 beads denote a support that is composed of beads that are 1.0 mm in diameter. In this set of data, $RuCl_3$ was used as the precursor in all cases, and the precursor was reduced at about 500° C. In some cases, a smaller particle size may lead to a more active catalyst. In some non-limiting embodiments, the bead or the pellet may have a diameter ranging from about 0.1 millimeters (mm) to about 10 mm. In some non-limiting embodiments, the bead or the pellet may have a surface area per unit mass ranging from about 50 m²/g to about 500 m²/g.

Reduction Temperature

Figure 13:
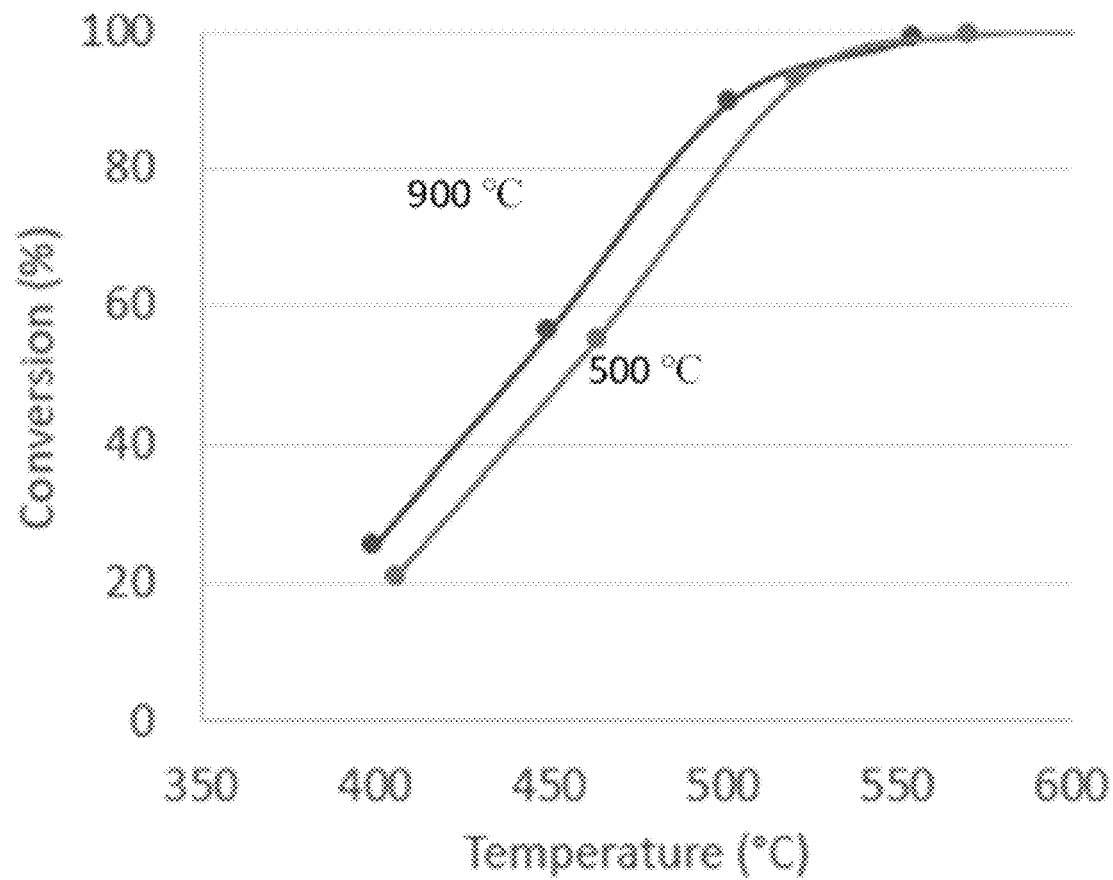
FIG. 13 illustrates a comparison of ammonia conversion efficiencies for various catalysts synthesized via reduction at different temperatures, in accordance with some embodiments.

As discussed above, once the ruthenium precursor is deposited on the alumina carrier or support, reduction of the precursor may lead to an optimized ruthenium nanoparticle catalyst that can be used to facilitate ammonia decomposition. The conditions of such reduction may strongly influence the physical or chemical properties or characteristics of the ruthenium on the surface of the support, and thus the activity and/or ammonia conversion efficiency of the catalyst. Alternatively or in addition, the conditions of reduction may strongly influence properties of the ruthenium nanoparticles on the surface, including, for example, size, dispersion and dominant crystal facets. FIG. 13 shows the effect of reduction temperature on ammonia conversion efficiency for Ru/La-gamma-Al$_2$O$_3$ catalysts synthesized via reduction at different temperatures, e.g., reduction temperatures ranging from about 500° C. to about 900° C. In some cases, as illustrated in FIG. 13, a higher temperature of reduction may lead to a significantly more active catalyst.

Alumina Support Phase

Figure 14:
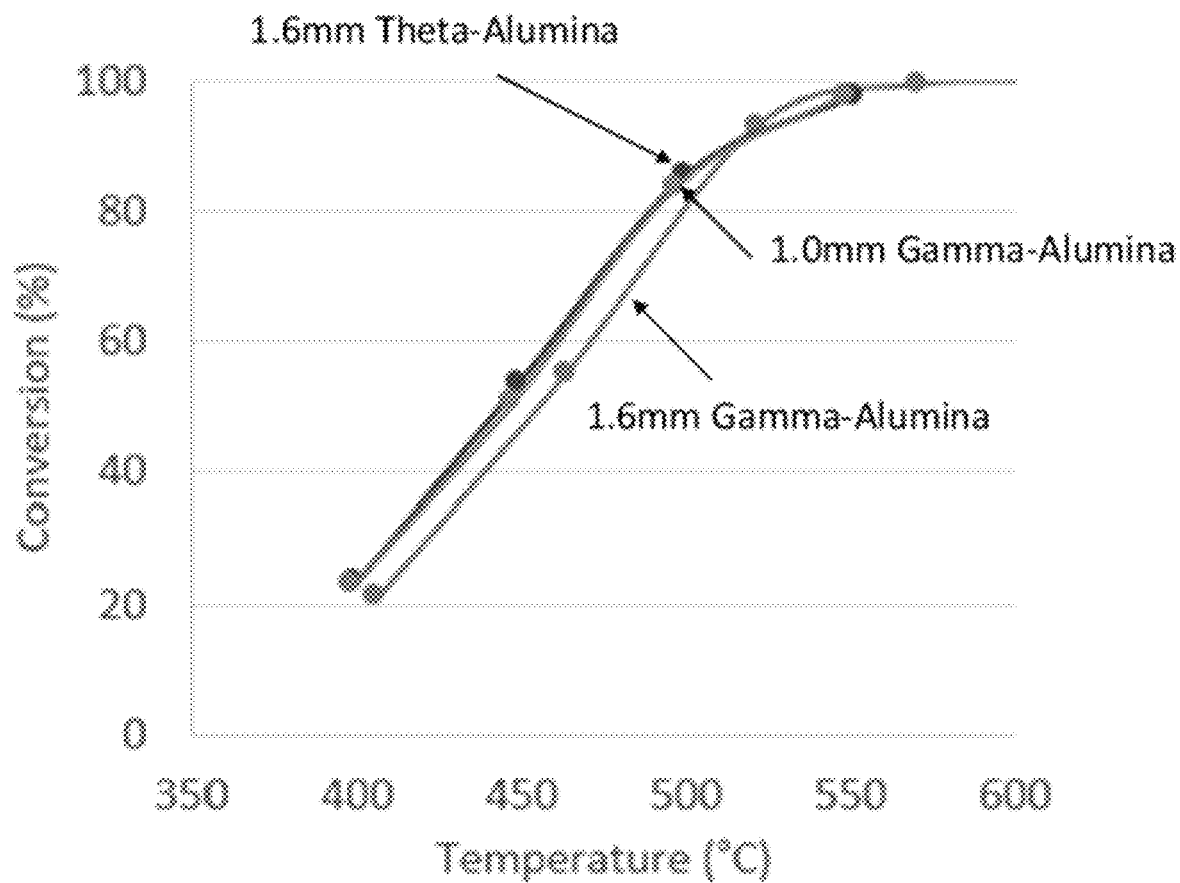
FIG. 14 illustrates a comparison of ammonia conversion efficiencies for various catalysts synthesized using different gamma- and theta-alumina supports, in accordance with some embodiments.

While gamma-alumina is an alumina phase that is commonly used as a catalyst support, other phases of alumina exist, including alpha, theta, delta and eta. Alpha alumina (α-Al$_2$O$_3$) can be provided in a highly sintered form of the support with a very low surface area, which can lead to poor catalyst dispersion. In contrast, theta alumina (θ-Al$_2$O$_3$) can be a phase that is generated between the transition from gamma to alpha at very high temperatures and can retain a relatively high surface area, which can make theta alumina one example of an optimal support material. FIG. 14 shows a comparison of ammonia conversion efficiency for Ru/La-Al$_2$O$_3$ catalysts synthesized using various catalyst supports comprising theta-alumina or gamma-alumina (γ-Al$_2$O$_3$). In some cases, the ammonia conversion efficiency of ruthenium on 1.6 mm theta-alumina beads may be higher than that of a catalyst synthesized over 1.6 mm gamma-alumina beads. In some cases, the 1.6 mm theta-alumina beads may lead to ammonia conversion efficiency that is comparable or higher to that of 1.0 mm gamma-alumina beads. In some cases, in a full-scale reactor, pressure drops may be significant and may be a function of the size of the support used, and as the particles get smaller, the pressure drop may increase. In some cases, switching the phase of the support from gamma-alumina to theta-alumina may allow the catalyst to perform comparably to smaller catalysts, while still minimizing pressure drop with a larger catalyst size.

Mixed La—Ce—Al Oxide Support

In some cases, the alumina support may be initially modified by incorporation of lanthanum via high-temperature calcination to generate a La—Al oxide support that can serve as an optimized catalyst support. In some cases, the La—Al oxide support may comprise an alumina supported perovskite structure. In some embodiments, the incorporation of lanthanum may comprise at least about 5 mol % lanthanum, about 6 mol % lanthanum, about 7 mol % lanthanum, about 8 mol % lanthanum, about 9 mol % lanthanum, about 10 mol % lanthanum, about 11 mol % lanthanum, about 12 mol % lanthanum, about 13 mol % lanthanum, about 14 mol % lanthanum, about 15 mol % lanthanum, about 16 mol % lanthanum, about 17 mol % lanthanum, about 18 mol % lanthanum, about 19 mol % lanthanum, about 20 mol % lanthanum, about 21 mol % lanthanum, about 22 mol % lanthanum, about 23 mol % lanthanum, about 24 mol % lanthanum, or about 25 mol % lanthanum. In some embodiments, the incorporation of lanthanum may comprise at most about 25 mol % lanthanum, at most about 24 mol % lanthanum, at most about 23 mol % lanthanum, at most about 22 mol % lanthanum, at most about 21 mol % lanthanum, at most about 20 mol % lanthanum, at most about 19 mol % lanthanum, at most about 18 mol % lanthanum, at most about 17 mol % lanthanum, at most about 16 mol % lanthanum, at most about 15 mol % lanthanum, at most about 14 mol % lanthanum, at most about 13 mol % lanthanum, at most about 12 mol % lanthanum, at most about 11 mol % lanthanum, at most about 10 mol % lanthanum, at most about 9 mol % lanthanum, at most about 8 mol % lanthanum, at most about 7 mol % lanthanum, n at most about 6 mol % lanthanum, at most about 5 mol % lanthanum, or less. In some embodiments, the incorporation of lanthanum may comprise a mol % lanthanum that ranges between about 5 mol % to about 25 mol %, between about 6 mol % to about 24 mol %, between about 7 mol % to about 23 mol %, between about 8 mol % to about 22 mol %, between about 9 mol % to about 21 mol %, between about 10 mol % to about 20 mol %, between about 11 mol % to about 19 mol %, between about 12 mol % to about 18 mol %, between about 13 mol % to about 17 mol %, or between about 14 mol % to about 16 mol %.

Figure 15:
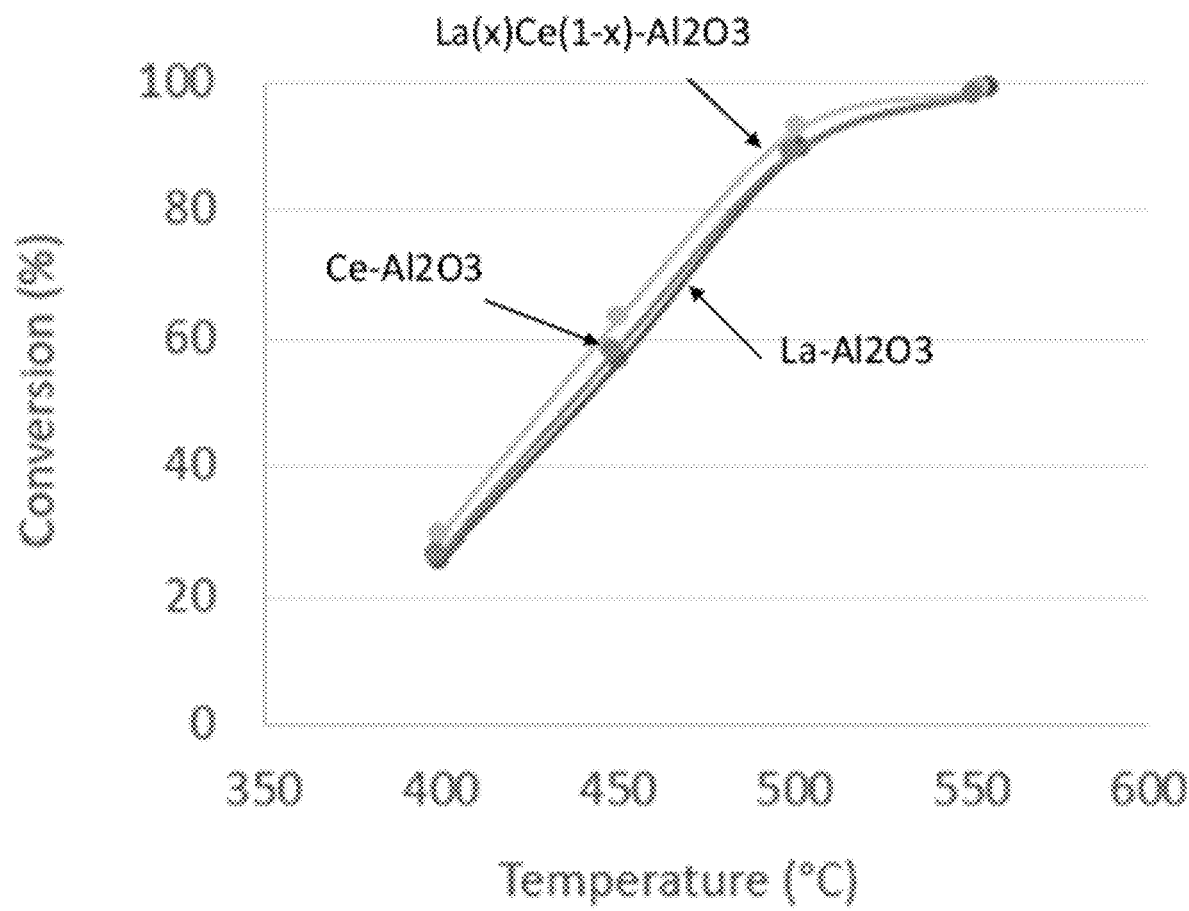
FIG. 15 illustrates a comparison of ammonia conversion efficiencies for various catalysts synthesized with different La and Ce ratios, in accordance with some embodiments.

In some cases, doping of the La—Al oxide support with an electron-donating metal such as cerium may be utilized to generate La—Ce—Al oxide supports of the general formula La$_{1-x}$Ce$_x$AlO$_3$/Al$_2$O$_3$, which may lead to a more active catalyst. This La$_{1-x}$Ce$_x$AlO$_3$/Al$_2$O$_3$ composition may comprise, for example, a mixed La—Ce oxide structure. FIG. 15 compares the ammonia conversion efficiency of a La—Al oxide support, a Ce—Al oxide support and a mixed La—Ce—Al oxide support. In some cases, as shown in FIG. 15, the catalyst synthesized on mixed La—Ce—Al oxide support may show a superior ammonia conversion efficiency compared to the samples on La—Al oxide or Ce—Al oxide supports. In some cases, the catalyst or a portion thereof may comprise a mixed oxide structure. The mixed oxide structure may comprise, for example, La, Ce, and/or oxygen.

Figure 16:
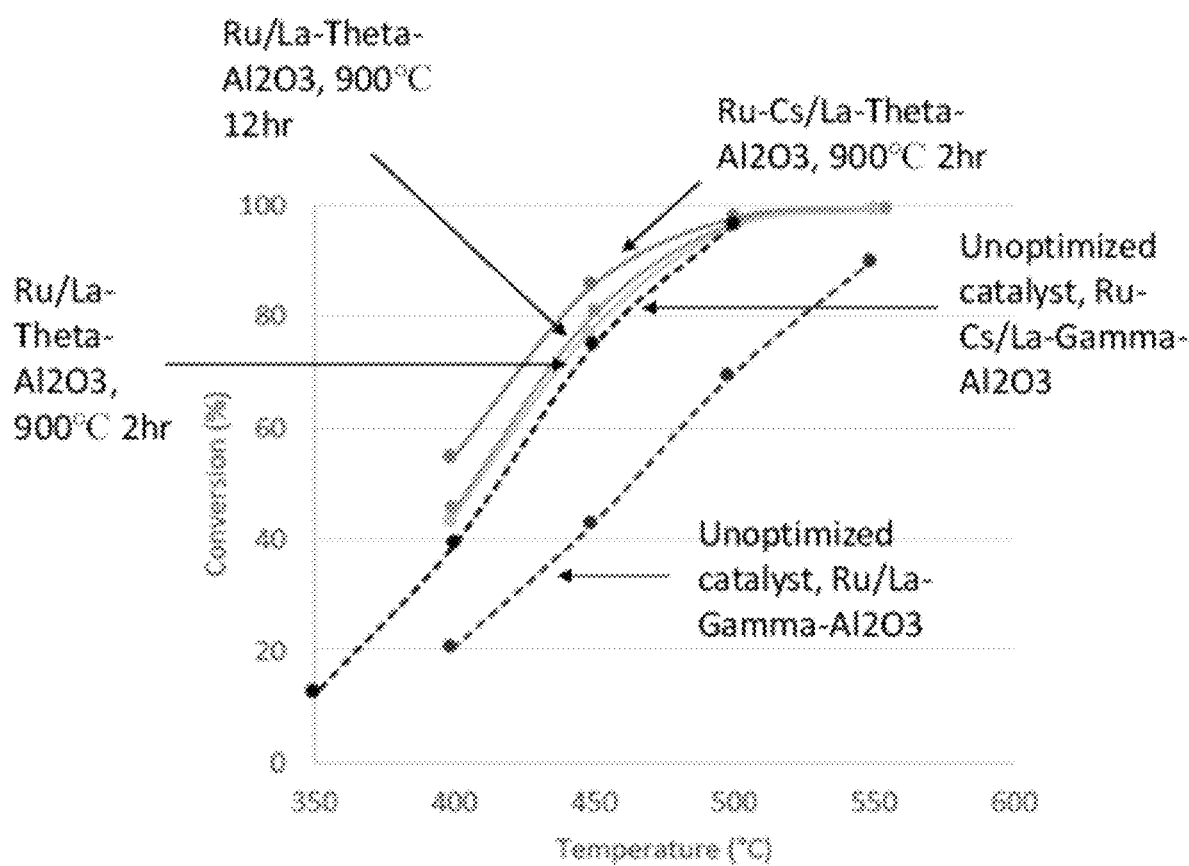
FIG. 16 illustrates a comparison of ammonia conversion efficiencies for various exemplary catalysts fabricated using different combinations of materials and production methods, in accordance with some embodiments.

FIG. 16 provides a comparison of catalysts prepared using various combinations of optimized parameters presented in the preceding figures (FIG. 11-FIG. 14). The catalysts prepared using such combinations of optimized parameters may exhibit better performance characteristics (e.g., ammonia conversion or ammonia conversion efficiency) than both "unoptimized" catalysts which were not chemically or physically treated and various other high-performing catalysts previously reported. In some cases, further improvement to ammonia conversion efficiency may be realized by (i) increasing the reduction time from about 2 hrs to about 12 hrs at a temperature ranging from between about 700 degrees Celsius and about 1200 degrees Celsius, and/or (ii) by adding a promoter (e.g., Cs) with ruthenium. In some embodiments, a molar ratio of promoter Cs to ruthenium may be at least about 10 to 1, about 9 to 1, about 8 to 1, about 7 to 1, about 6 to 1, about 5 to 1, about 4 to 1, about 3 to 1, about 2 to 1, or about 1 to 1. In some embodiments, the molar ratio of promoter Cs to ruthenium may be not more than about 1 to 1, not more than about 2 to 1, not more than about 3 to 1, not more than about 4 to 1, not more than about 5 to 1, not more than about 6 to 1, not more than about 7 to 1, not more than about 8 to 1, not more than about 9 to 1, or not more than 10 to 1. In some embodiments, the molar ratio of promoter Cs to ruthenium may range from about 1 to 1 to about 10 to 1, from about 2 to 1 to about 9 to 1, from about 3 to 1 to about 8 to 1, from about 4 to 1 to about 7 to 1, or from about 5 to 1 to about 6 to 1.

Mixed La—Ce—Al Oxide Support and Cs Promotion for Theta Alumina

Figure 17A:
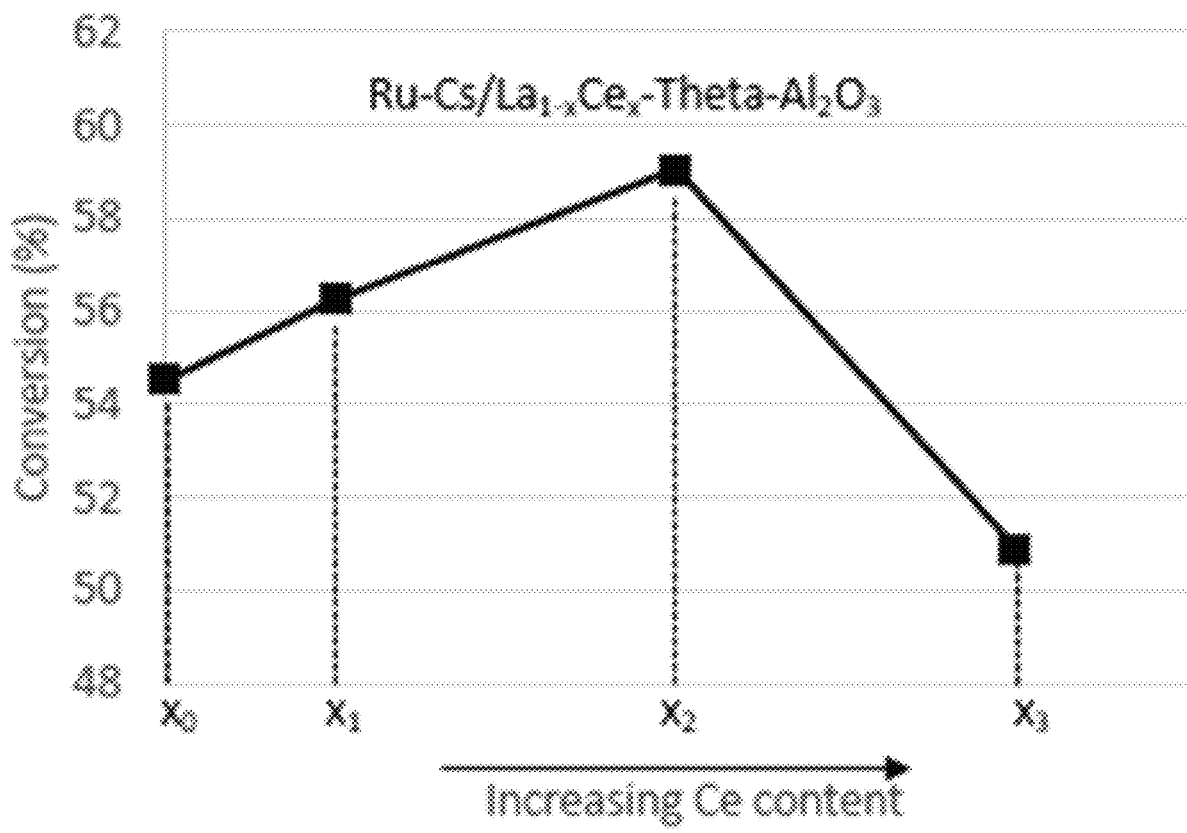
FIG. 17A illustrates a comparison of ammonia conversion efficiencies for various catalysts having different La:Ce molar ratios and variations in ammonia conversion efficiencies based on changes in Ce content, in accordance with some embodiments.
Figure 17B:
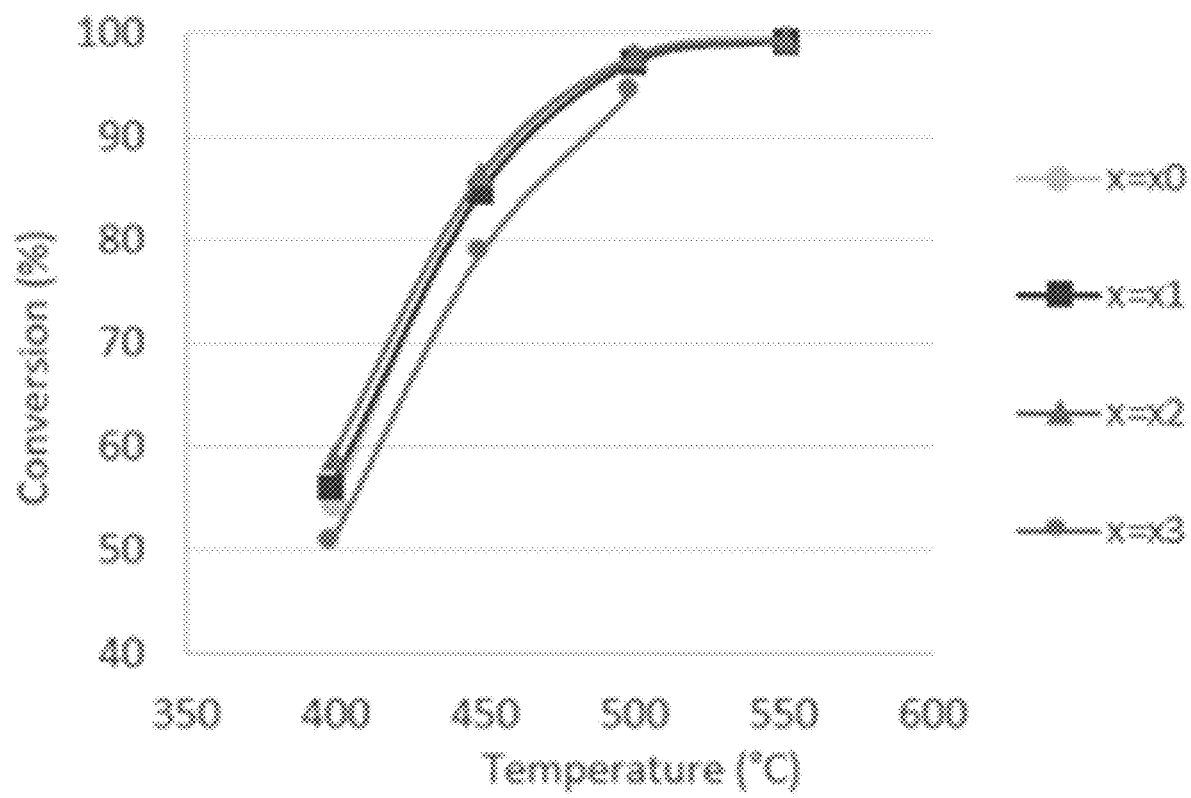
FIG. 17B illustrates a comparison of ammonia conversion efficiencies for various catalysts having different La:Ce molar ratios and variations in ammonia conversion efficiencies based on different operating temperatures, in accordance with some embodiments.
Figure 18:
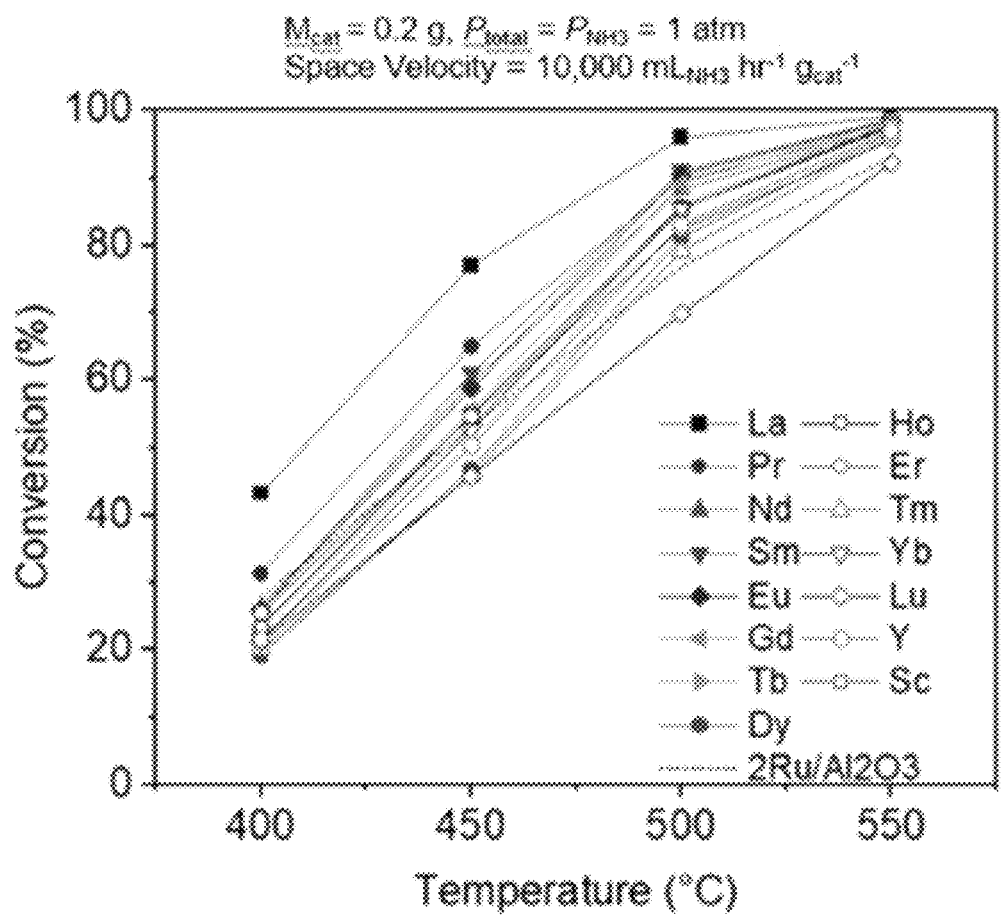
FIG. 18 illustrates a comparison of ammonia conversion efficiencies for various catalysts doped with rare earth metals, in accordance with some embodiments.

Referring to FIG. 17, in some cases, the catalysts of the present disclosure may be further optimized by adjusting the La:Ce ratio. Such further optimizations may yield a catalyst that exhibits enhanced performance characteristics compared to other catalysts fabricated using various baseline conditions. In some non-limiting examples, the baseline conditions may correspond to an incorporation amount of Ru, a molar ratio of Cs promoter to Ru, a type of Ru precursor, a catalyst reduction temperature, a catalyst reduction period and alumina support phase. In some embodiments, the incorporation amount of Ru comprises at least about 0.5 wt %, about 1.0 wt %, about 1.5 wt %, about 2.0 wt %, about 2.5 wt %, about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, about 8.0 wt %, about 8.5 wt %, about 9.0 wt %, about 9.5 wt %, about 10.0 wt %, about 10.5 wt %, about 11.0 wt %, about 11.5 wt %, about 12 wt %, about 12.5 wt %, about 13 wt %, about 13.5 wt %, about 14 wt %, about 14.5 wt %, or about 15.0 wt %. In some embodiments, the incorporation amount of Ru comprises not more than about 15.0 wt %, about 14.5 wt %, about 14.0 wt %, not more than about 13.5 wt %, not more than about 13.0 wt %, not more than about 12.5 wt %, not more than about 12.0 wt %, not more than about 11.5 wt %, not more than about 11.0 wt %, not more than about 10.5 wt %, not more than about 10.0 wt %, not more than about 9.5 wt %, not more than about 9.0 wt %, not more than about 8.5 wt %, not more than about 8.0 wt %, not more than about 7.5 wt %, not more than about 7.0 wt %, not more than about 6.5 wt %, not more than about 6.0 wt %, not more than about 5.5 wt %, not more than about 5.0 wt %, not more than about 4.5 wt %, not more than about 4.0 wt %, not more than about 3.5 wt %, not more than about 3.0 wt %, not more than about 2.5 wt %, not more than about 2.0 wt %, not more than about 1.5 wt %, not more than about 1.0 wt %, or not more than about 0.5 wt %. In some embodiments, the incorporation amount of Ru comprises a wt % Ru between about 0.5 wt % to about 15.0 wt %, between about 1.0 wt % to about 14.5 wt %, between about 1.5 wt % to about 14.0 wt %, between about 2.0 wt % to about 13.5 wt %, between about 2.5 wt % to about 13.0 wt %, between about 3.0 wt % to about 12.5 wt %, between about 3.5 wt % to about 12.0 wt %, between about 4.0 wt % to about 11.5 wt %, between about 4.5 wt % to about 11.0 wt %, between about 5.0 wt % to about 10.5 wt %, between about 5.5 wt % to about 10.0 wt %, between about 6.0 wt % to about 9.5 wt %, between about 6.5 wt % to about 9.0 wt %, between about 7.0 wt % to about 8.5 wt %, or between about 7.5 wt % to about 8.0 wt %.

In some embodiments, the molar ratio of promoter (e.g., Cs) to active metal (e.g., Ru) comprises at least about 10 to 1, about 9 to 1, about 8 to 1, about 7 to 1, about 6 to 1, about 5 to 1, about 4 to 1, about 3 to 1, about 2 to 1, or about 1 to 1. In some embodiments, the molar ratio of promoter (e.g., Cs) to active metal (e.g., Ru) comprises not more than about 1 to 1, not more than about 2 to 1, not more than about 3 to 1, not more than about 4 to 1, not more than about 5 to 1, not more than about 6 to 1, not more than about 7 to 1, not more than about 8 to 1, not more than about 9 to 1, or not more than about 10 to 1. In some embodiments, the molar ratio of promoter (e.g., Cs) to active metal (e.g., Ru) ranges from about 1 to 1 to about 10 to 1, from about 2 to 1 to about 9 to 1, from about 3 to 1 to about 8 to 1, from about 4 to 1 to about 7 to 1, or from about 5 to 1 to about 6 to 1.

In some embodiments, the Ru precursor may comprise $Ru(NO)(NO_3)_3$, $RuCl_3$ and/or $Ru_3(CO)_{12}$. In some embodiments, the catalyst reduction temperature may be at least about 500° C., about 550° C., about 600° C., about 650° C., at least about 700° C., about 750° C., about 800° C., about 850° C., about 900° C., about 950° C., about 1000° C., about 1050° C., about 1100° C., or more. In some embodiments, the catalyst reduction temperature comprises not more than about 1100° C., not more than about 1050° C., not more than about 1000° C., not more than about 950° C., not more than about 900° C., not more than about 850° C., not more than about 800° C., not more than about 750° C., not more than about 700° C., not more than about 650° C., not more than about 600° C., not more than about 550° C., not more than about 500° C., or less. In some embodiments, the catalyst reduction temperature may range between about 500° C. to about 1100° C., between about 550° C. to about 1050° C., between about 600° C. to about 1000° C., between about 650° C. to about 950° C., between about 700° C. to about 900° C., between about 750° C. to about 850° C., between about 800° C. to about 850° C. In some embodiments, the catalyst reduction period may be at least about 0.5 hr, about 1 hr, about 5 hrs, about 10 hrs, about 15 hrs, about 20 hrs, about 25 hrs, about 30 hrs, about 35 hrs, about 40 hrs, about 45 hrs, about 50 hrs, about 55 hrs, about 60 hrs, about 65 hrs, about 70 hrs, about 75 hrs, about 80 hrs, 85 hrs, about 90 hrs, about 95 hrs, about 100 hrs, about 110 hrs, about 120 hrs, about 130 hrs, about 140 hrs, about 150 hrs, about 160 hrs, about 170 hrs, about 180 hrs, about 190 hrs, or about 200 hrs. In some embodiments, the catalyst reduction period may be not more than about 200 hrs, not more than about 190 hrs, not more than about 180 hrs, not more than about 170 hrs, not more than about 160 hrs, not more than about 150 hrs, not more than about 140 hrs, not more than about 130 hrs, not more than about 120 hrs, not more than about 110 hrs, not more than about 100 hrs, not more than about 95 hrs, not more than about 90 hrs, not more than about 85 hrs, not more than about 80 hrs, not more than about 75 hrs, not more than about 70 hrs, not more than about 65 hrs, not more than about 60 hrs, not more than about 55 hrs, not more than about 50 hrs, not more than about 45 hrs, not more than about 40 hrs, not more than about 35 hrs, not more than about 30 hrs, not more than about 25 hrs, not more than about 20 hrs, not more than about 15 hrs, not more than about 10 hrs, not more than about 5 hrs, not more than about 1 hr, or not more than about 0.5 hr. In some embodiments, the catalyst reduction period may range between about 0.5 hr to about 200 hrs, between about 1 hr to about 190 hrs, between about 5 hrs to about 180 hrs, or between about 10 hrs to about 170 hrs, between about 15 hrs to about 160 hrs, between about 20 hrs to about 150 hrs, between about 25 hrs to about 140 hrs, or between about 30 hrs to about 130 hrs, between about 35 hrs to about 120 hrs, between about 40 hrs to about 110 hrs, between about 45 hrs to about 100 hrs, or between about 50 hrs to about 95 hrs, between about 55 hrs to about 90 hrs, between about 60 hrs to about 85 hrs, between about 65 hrs to about 80 hrs, or between about 70 hrs to about 75 hrs.

In any of the embodiments described herein, the alumina support phase may be theta-alumina, gamma-alumina, or a combination of both. In some embodiments, a mixed La—Ce—Al oxide structure may be introduced on or to a support comprising theta alumina by varying a molar ratio of La to Ce, as shown in FIG. 17. In some embodiments, the molar ratio of La to Ce may be at least about 100 to 0, about 90 to 10, about 80 to 20, about 70 to 30, about 60 to 40, about 50 to 50, about 40 to 60, about 30 to 70, about 20 to 80, about 10 to 90, or about 0 to 100. In some cases, there may be an upward trend in activity or ammonia conversion efficiency as a function of cerium content in the support.

Mixed $ZrO_2$—$CeO_2$ Support

In some aspects, the present disclosure provides a catalyst for cracking ammonia. In some cases, a conversion efficiency during ammonia decomposition may correlate with a binding energy between a catalyzing metal (e.g., ruthenium) and nitrogen (i.e., M-N binding energy). Without being bound to a particular theory, the ammonia conversion efficiency of a catalyst for decomposing ammonia may depend on a balance of (i) energetics/kinetics for binding of nitrogen to the metal and (ii) energetics/kinetics for releasing nitrogen from the metal. Under some sets of measurement conditions, ruthenium (Ru) is an example of a metal catalyst that can provide a high turnover frequency (TOF) for ammonia decomposition compared to some of the other monometallic catalysts selected from the periodic table. As illustrated in Nature Chemistry, 2.6 (2010), pp. 484-489, a plot of TOF versus nitrogen binding energy can show a "volcano" shaped curve, where Ru lies closest to, although not coincident with, the peak of the volcano among monometallic catalysts. Under other sets of measurement conditions, other binding energetic/kinetic parameters (e.g., those associated with other elementary reaction steps involved in ammonia cracking) may be more strongly associated with the ammonia conversion efficiency of a catalyst for decomposing ammonia. In some aspects, contemplated herein are strategies for making catalysts that comprise Ru to improve the ammonia conversion efficiency of Ru comprising catalysts.

Figure 20:
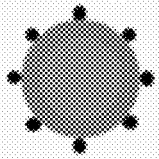
FIG. 20 provides examples of some strategies contemplated herein to improve the ammonia conversion efficiency of Ru, in accordance with some embodiments.

FIG. 20 provides examples of some strategies contemplated herein for improving the ammonia conversion efficiency of Ru, in accordance with some embodiments. In some cases, a catalyst may comprise a support (e.g., ruthenium may be provided on the support). As used herein, a backslash ("/") may indicate that a substance preceding the backslash is supported by the substance following the backslash. For example, $Ru/CeO_2$—$ZrO_2$ may indicate a catalyst comprising ruthenium supported by a $CeO_2$—$ZrO_2$ support. In some cases, 'x' and 'y', 'a' and 'b', or any other alphabet or symbol may be used to indicate a stoichiometric coefficient in a substance. For example, $Ce_xO_y$ may refer to a material comprise Ce atoms and O atoms at a ratio of 'x' to 'y'. When the alphabet or symbol is used to denote the stoichiometric coefficient of one material, the alphabet or symbol may not necessarily imply the same stoichiometric coefficient in another material. For example, if $Ru/Zr_xO_y$ and $Ru/Zr_xO_y$—$Ce_aO_b$ were referred to in the same sentence or the same paragraph, it is not necessarily implied that the stoichiometric coefficient 'x' and 'y' are the same between $Ru/Zr_xO_y$ and $Ru/Zr_xO_y$—$Ce_aO_b$. However, when the alphabet or symbol is used to denote the stoichiometric coefficient multiple instances in one material, the alphabet or symbol may imply the same stoichiometric coefficient in the one material. For example, if $Ru/Zr_xO_y$—$Ce_xO_y$ is referred to, then it may be implied that the two instances of 'x' share the same value, and that the two instances of 'y' share the same value.

In some cases, the support may be configured to provide a strong metal-support interaction. In some cases, the strong metal-support interaction may alter or increase an ammonia conversion efficiency of the metal when the metal is provided on the support. In some cases, the support may be configured to change an electronic structure of a metal on the support. In some cases, changes in the electronic structure of the metal may increase ammonia conversion efficiency. In some cases, the support may shift a D-band center of the metal when the metal is provided on the support. In some cases, during an ammonia cracking reaction, a nitrogen atom may bind with a metal of the catalyst.

In some cases, the support may increase an electron occupancy of a metal-nitrogen antibonding orbital when the metal is provided on the support. In some cases, the support may be configured to provide the increased electron occupancy in the metal-nitrogen antibonding orbital during an ammonia conversion reaction. In some cases, this increased M-N antibonding orbital occupancy may facilitate nitrogen recombination and desorption.

In some cases, the support may comprise oxygen vacancies. In some cases, the support may comprise oxygen vacancies on the support surface. In some cases, the increased density of surface oxygen vacancies may reduce loss of active sites, e.g., during synthesis of the catalyst using the support and/or when the catalyst is in use. In some cases, the increased density of surface oxygen vacancies may increase an interaction between the metal and support, which can may increase ammonia decomposition efficiency. In some cases, the oxygen vacancies may interact with a metal provided on the surface of the support. In some cases, the oxygen vacancies may contribute electrons to occupy a metal-nitrogen antibonding orbital. In some cases, the oxygen vacancies may comprise electropositive vacancies in the support. In some cases, the electropositive vacancies may contribute electron occupancy in the metal-nitrogen antibonding orbital. In some cases, the electropositive vacancies may increase the electron occupancy of the metal-nitrogen antibonding orbital when the nitrogen atom is bound to the metal. In some cases, the increased electron occupancy of the metal-nitrogen antibonding orbital may reduce a dissociation energy between the metal and the nitrogen atom. In some cases, the reduced dissociation energy between the metal and the nitrogen atom increases rates of nitrogen dissociation from the metal. In some cases, the reduced dissociation energy between the metal and the nitrogen atom increases the turnover frequency of the catalyst. In some cases, the reduced dissociation energy between the metal and the nitrogen atom increases the ammonia conversion efficiency of the catalyst. In some cases, the oxygen vacancies may reduce the activation energy of nitrogen desorption. In some case, the reduced activation energy of nitrogen desorption may increase the rates of ammonia decomposition reaction. In some case the reduced activation energy of nitrogen desorption increases the turnover frequency of the catalyst. In some case the reduced activation energy of nitrogen desorption increases the ammonia conversion efficiency. In some cases, the catalyst comprises oxygen vacancies at a concentration of about 0.1 mmol/g to about 10 mmol/g. In some cases, the catalyst comprises oxygen vacancies at a concentration of about 2 mmol/g to about 6 mmol/g. In some cases, the catalyst comprises oxygen vacancies at a concentration of at least about 0.01, 0.1, 1, 10, or 100 mmol/g. In some cases, the catalyst comprises oxygen vacancies at a concentration of at most about 0.01, 0.1, 1, 10, or 100 mmol/g.

In some cases, the support may comprise a reducible phase on the surface of the support. In some cases, the support may comprise a reduced phase on the surface of the support. In some cases, the reducible phase may comprise a metal oxide (e.g., a reducible oxide). In some cases, the reducible phase may comprise ceria, iron oxide, titanium oxide, samarium oxide, molybdenum oxide, vanadia, chromia, or any combination thereof. In some cases, the reduced phase may partially comprise cerium, iron, vanadium, chromium, or any combination thereof. It is noted herein that the reduced phase may be partially reduced (for example, to a sub-stoichiometric $Ce_xO_y$ phase, where y<2).

Various processing conditions may be used (e.g., various temperatures, various calcinating conditions, various annealing conditions, and various loadings) to make the support. In some cases, a heat treatment under an anoxic atmosphere (e.g., annealing under inert gas such as $N_2$ or noble gas) may be used to reduce the reducible phase. In some cases, hydrogen gas may be used to reduce the reducible phase.

Figure 21A:
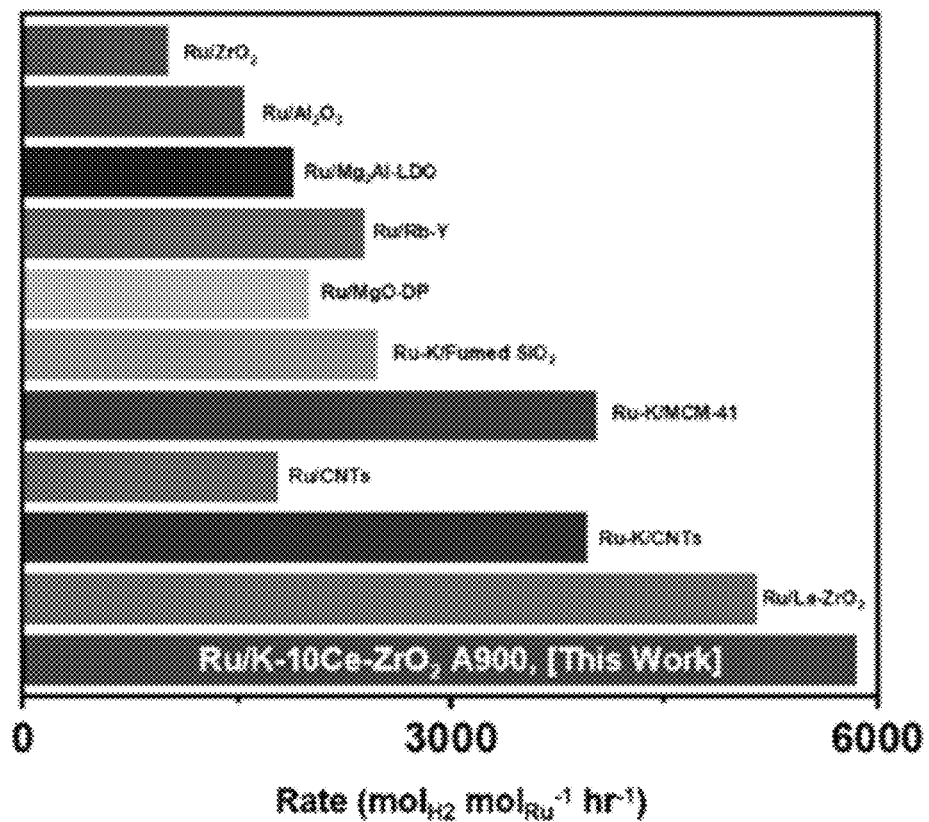
FIG. 21A shows a comparison of hydrogen production rates of a catalyst of the present disclosure to conventional catalyst of the present disclosure to conventional catalysts, in accordance with some embodiments.
Figure 22:
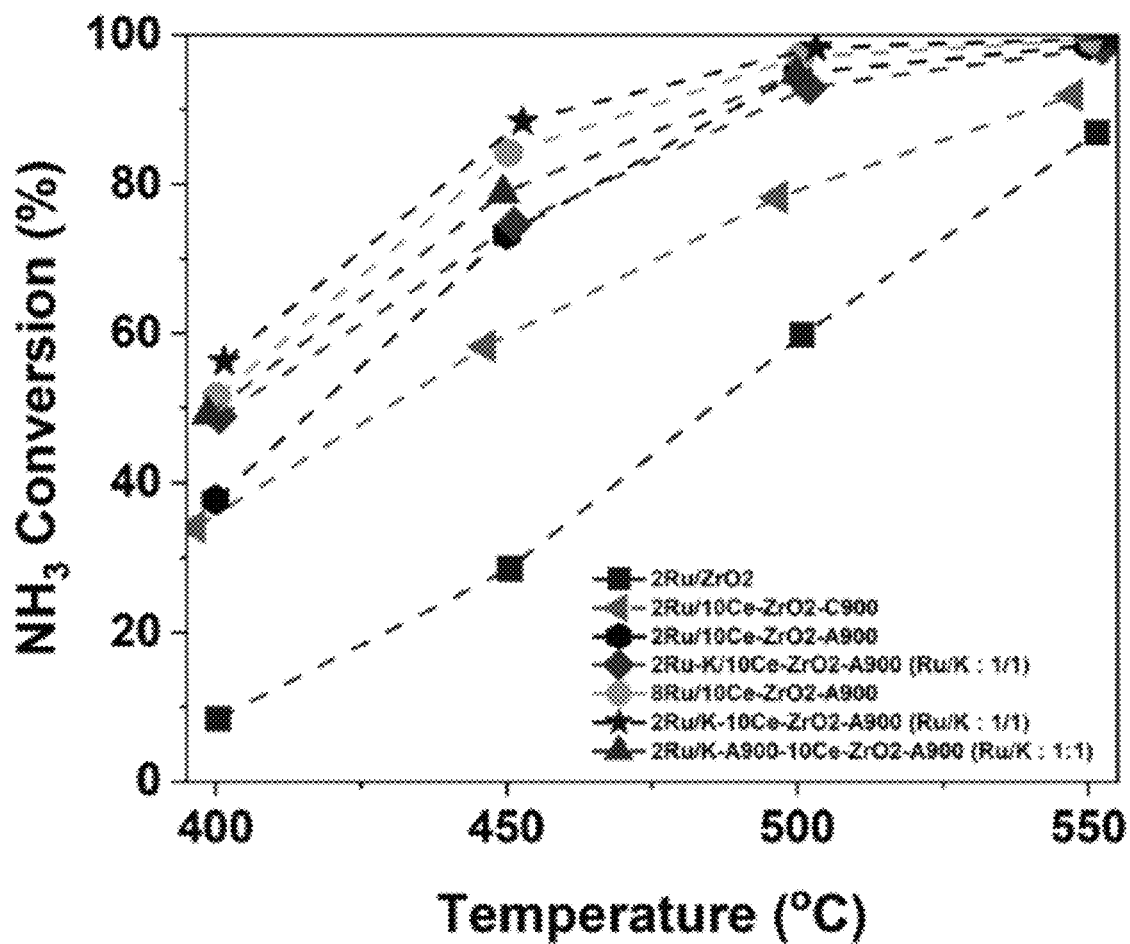
FIG. 22 shows ammonia conversion efficiencies of various catalysts as a function of temperature, in accordance with some embodiments.

In some cases, reducing the reducible phase may lead to a reduction of strong acid sites on the surface of the support via formation of the tetragonal $ZrO_2$ phase. In some cases, the reduction of strong acid sites on the surface of the support may increase ammonia conversion efficiency. FIG. 21A shows a comparison of hydrogen production rates of catalysts, in accordance with some embodiments. For example, under some measurement conditions, one of the catalyst embodiments disclosed herein (Ru/K-10Ce—$ZrO_2$ A900), exceeds the hydrogen production rates of some other catalysts disclosed herein. FIG. 21B shows a table describing the conditions at which the catalysts shown in FIG. 21A were tested, in accordance with some embodiments. FIG. 22 shows ammonia conversion efficiencies of various catalysts as a function of temperature, in accordance with some embodiments. Among the catalysts shown in FIGS. 21A-21B, Ru/K-10Ce-$ZrO_2$ A900 catalyst showed the highest hydrogen production rates ($mol_{H2}$ $mol_{Ru}^{-1}$ $hr^{-1}$), even though the Ru/K-10Ce—$ZrO_2$ A900 catalyst comprised 1-3 mm extrudates in this experiment. Meanwhile, some of the other catalysts were powders. In some cases, structured catalysts comprising foam, bead, and/or pellet form factors may be associated with lower activity or ammonia conversion efficiency than catalysts in powder-form, for example, when large form factors may incur mass transfer limitations and/or pore network change in the fabrication process. In some cases, a pore network change may entail a pore collapse that "traps" ruthenium nanoparticles in the interior of the bead and/or pellet, which may result in less active metal available for ammonia conversion (by reducing active metal surface area), and may result in a lower ammonia conversion efficiency per mass of deposited ruthenium metal (or per moles of deposited ruthenium metal). Even so, some catalysts of the present disclosure that comprise larger form factors (e.g., beads, pellets, etc.) may exhibit high ammonia catalytic activities that are comparable to, or capable of outperforming, some catalysts in powder-form.

In some cases, the support comprises Al, Si, Zr, Ce, C, or O. In some cases, the support may comprise an oxide such as $Al_xO_y$, $Si_xO_y$, $Zr_xO_y$ and a reducible oxide such as $Ce_xO_y$, $V_xO_y$, or $Cr_xO_y$ (e.g., a reducible oxide that forms oxygen vacancies under an annealing or reducing heat treatment), wherein x and y are numbers greater than zero. In some cases, the support may comprise at least one of $Al_2O_3$, $SiO_2$, $ZrO_2$, $CeO_2$, $V_2O_5$, $TiO_2$, $Sm_2O_3$, $MoO_3$, or $CrO_3$ or carbon. In some cases, the support may comprise at least one of $Ti_xO_y$, $Sm_xO_y$, or $Mo_xO_y$. In some cases, the support comprises $Zr_xO_y$ having an amorphous, monoclinic, and/or tetragonal phase. In some cases, the support comprises zirconia ($ZrO_2$). In some cases, $Zr_xO_y$ may comprise a high solubility with Ce or $Ce_xO_y$. In some cases, $Zr_xO_y$ and $Ce_xO_y$, when mixed, may form an incorporated network structure. In some cases, $Zr_xO_y$ and $Ce_xO_y$, when mixed, may form a solid solution. In some cases, a solid solution may comprise a uniform distribution of the cerium dopant. In some cases, the cerium dopant may be highly dispersed.

In some cases, the cerium dopant may form small nanoparticles. In some cases, the support may comprise an increased density of surface oxygen vacancies compared to a zirconia phase when doped with $Ce_xO_y$. In some cases, the solid solution may comprise a high number of oxygen vacancies.

Figure 25A:
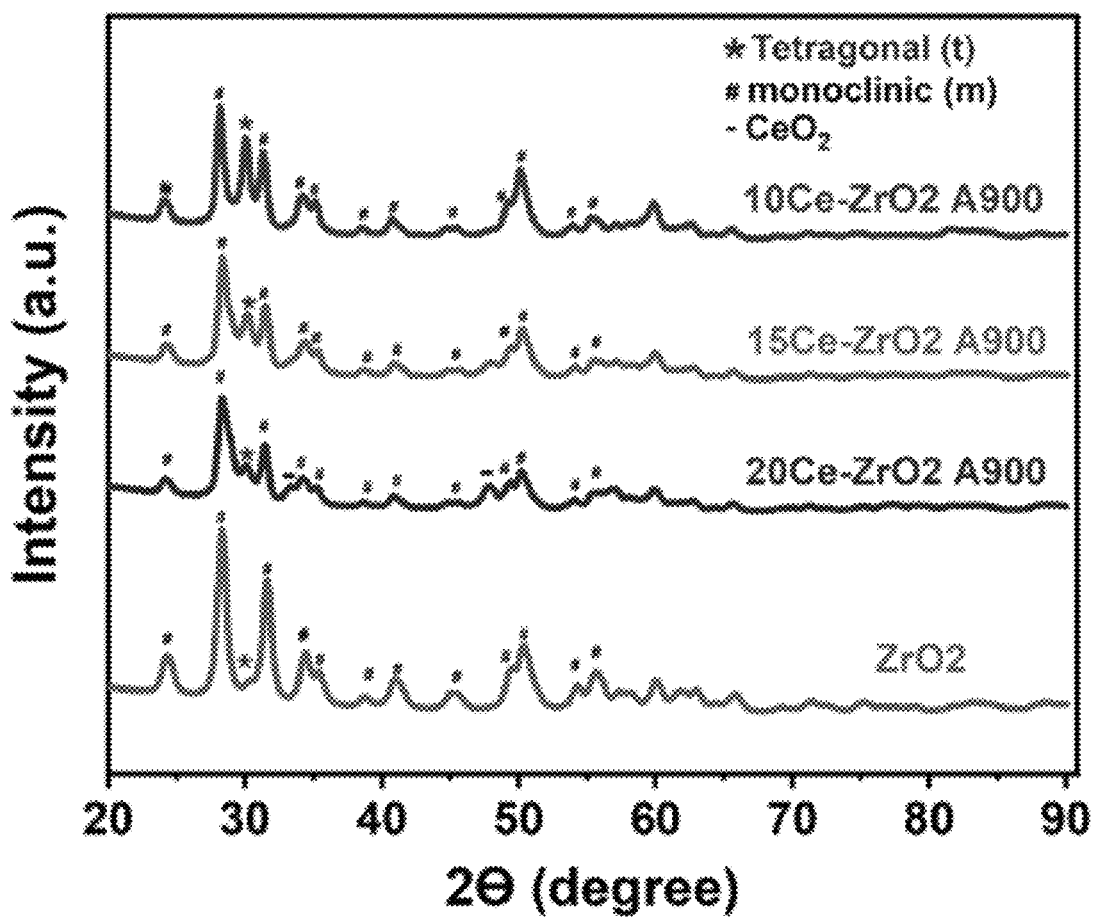
FIG. 25A shows pXRD spectra of supports comprising varying amounts of ceria with zirconia, in accordance with some embodiments.

FIG. 25A shows powder XRD (pXRD) spectra of supports comprising varying amounts of $Ce_xO_y$ with $Zr_xO_y$, in accordance with some embodiments. A series of supports comprising differing amounts of $Ce_xO_y$ were synthesized, and pXRD was performed to characterize the supports. The pXRD spectra did not display a prominent peak that would indicate a large presence of $Ce_xO_y$. The pXRD spectra may indicate that the cerium is distributed substantially uniformly in the supports. Alternatively, the pXRD spectra may indicate that if any $Ce_xO_y$ phases exist, that they comprise dimensions that are below the detectable limit of the pXRD instrumentation (e.g., less than 2 nm in a dimension) or that the density of particles over 2 nm may be low. In comparison, some other support materials (e.g., $CeO_2$—$Al_2O_3$) may be capable of displaying pXRD signals that indicate $Ce_xO_y$ phases. In the example of $CeO_2$—$Al_2O_3$, $CeO_2$ peaks may be able to be observed even when the supports are calcinated at low temperatures (e.g., below 600° C.). The results shown in FIG. 25A may indicate that $Ce_xO_y$ and $Zr_xO_y$ can form a solid solution (i.e., cerium incorporated into $Zr_xO_y$; denoted $(Zr_x:Ce_y)O_z$), which may allow stronger metal-support interactions (e.g., via the oxygen vacancies).

In some cases, the zirconia or $Zr_xO_y$ may comprise a high thermal stability. In some cases, the thermal stability may impart stability properties to the catalyst. In some cases, the thermal stability may reduce a rate of mechanical defects forming or developing in the catalyst. In some cases, the thermal stability may reduce a rate of mechanical defect propagation in the catalyst (e.g., crack propagation). In some cases, the thermal stability may reduce a rate of undesirable phase transformations or other thermally-induced structural changes in the catalyst (e.g., diffusion and/or restructuring of surface structure of the catalyst, which can impact ammonia conversion efficiency of the catalyst). In some cases, the zirconia or $Zr_xO_y$ may comprise a low thermal expansion coefficient. In some cases, the zirconia or $Zr_xO_y$ may comprise a thermal expansion coefficient of at most about 1 $e^{-6}$, 2 $e^{-6}$, 3 $e^{-6}$, 4 $e^{-6}$, 5 $e^{-6}$, 6 $e^{-6}$, 7 $e^{-6}$, 8 $e^{-6}$, 9 $e^{-6}$, 10 $e^{-6}$, 11 $e^{-6}$, 12 $e^{-6}$, 13 $e^{-6}$, 14 $e^{-6}$, or 15 $e^{-6}$/K. In some cases, the support may comprise a thermal expansion coefficient of at most about 1 $e^{-6}$, 2 $e^{-6}$, 3 $e^{-6}$, 4 $e^{-6}$, 5 $e^{-6}$, 6 $e^{-6}$, 7 $e^{-6}$, 8 $e^{-6}$, 9 $e^{-6}$, 10 $e^{-6}$, 11 $e^{-6}$, 12 $e^{-6}$, 13 $e^{-6}$, 14 $e^{-6}$, or 15 $e^{-6}$/K. In some cases, the zirconia or $Zr_xO_y$ may comprise a high melting point. In some cases, the support may comprise a melting point of at least about 2000, 2100, 2200, 2300, 2400, 2500, 2600, 2700, 2800, 2900, 3000, 3100, 3200, or 3300° C. In some cases, the support may comprise a melting point of at most about 2000, 2100, 2200, 2300, 2400, 2500, 2600, 2700, 2800, 2900, 3000, 3100, 3200, or 3300° C.

In some cases, the zirconia or $Zr_xO_y$ may comprise a density of about 5.68 g/cm³. In some cases, zirconia or $Zr_xO_y$ comprises 1.5 to about 3 times higher density than some other supports (e.g., $Al_2O_3$ can have a density of about 3.95 g/cm³, $SiO_2$ can have a density of about 2.65 g/cm³, and activated carbon can have a density of about 2 g/cm³). In some cases, high densities for catalysts may enable compact reactor designs, and increased ammonia conversion efficiencies. In a fixed volume such as a reactor, a denser catalyst may have an increased surface area and/or increased catalyst weight, which may increase the amount of catalyst available for ammonia conversion. In some cases, a reactor may comprise a catalyst at a density of about 0.7 g/mL to about 1.4 g/mL. In some cases, a reactor may comprise a catalyst at a density of about 0.85 g/mL to about 1.25 g/mL with respect to the packing volume inside the reactor. In some cases, a reactor may comprise a catalyst at a density of about 0.5 g/mL to about 1.5 g/mL with respect to the packing volume inside the reactor. In some cases, a reactor may comprise a catalyst at a density of less than about 0.7 g/mL with respect to the packing volume inside the reactor. In some cases, a reactor may comprise a catalyst at a density of at least about 0.5, 0.6, 0.7, 0.8, 0.9, 1.0, 1.1, 1.2, 1.3, 1.4, or 1.5 g/mL. In some cases, a reactor may comprise a catalyst at a density of at most about 0.7, 0.8, 0.9, 1, 1.1, 1.2, 1.3, 1.4, or 1.5 g/mL.

In some cases, zirconia or $Zr_xO_y$ may comprise a chemical resistance. In some cases, the chemical resistance may be an anti-corrosive property. In some cases, the chemical resistance may be against an acid (e.g., strong acids: nitric acid, hydrochloric acid, or sulfuric acid). In some cases, the chemical resistance may be against an organic solvent. In some cases, the chemical resistance may be against an alkaline environment. In some cases, the chemical resistance may impart stability properties to the catalyst. In some cases, the chemical resistance may reduce a rate of fouling of the catalyst when the catalyst is used for ammonia cracking. For example, ammonia provided to the catalyst may comprise trace amounts of contaminants. In some cases, the chemical resistance of the catalyst may slow down or prevent fouling by the contaminants. In some cases, the chemical resistance may reduce a rate of fouling of the catalyst when the catalyst is exposed to fouling contaminants. In some cases, the chemical resistance may reduce the corrosion of the catalyst during the reaction.

In some cases, the support may comprise $Ce_xO_y$. In some cases, the support may comprise $CeO_2$. In some cases, the support may be doped with $Ce_xO_y$. In some cases, the support comprises a solid solution of $Zr_xO_y$ and $Ce_xO_y$. In some cases, the $Zr_xO_y$ and the $Ce_xO_y$ may be substantially mixed. In some cases, the $Zr_xO_y$ and the $Ce_xO_y$ may be substantially mixed to a degree such that the $Zr_xO_y$ and the $Ce_xO_y$ form a continuous phase. In some cases, the continuous phase does not comprise one or more grain boundaries within. In some cases, the support may comprise a homogeneous phase comprising zirconium and cerium in an oxide network. In some cases, the oxide network may comprise a tetragonal crystal structure. In some cases, the support may comprise a heterogeneous phase comprising regions comprising $Zr_xO_y$ and regions comprising $Ce_xO_y$. In some cases, the heterogenous phase may comprise a $Zr_xO_y$ matrix and $Ce_xO_y$ phases embedded therein. In some cases, the $Ce_xO_y$ phases may comprise a dimension of at least about 1, 2, 3, 4, 5, 6, 7, 8, 9, 10, 100, 1000, or 10000 nm. In some cases, the $Ce_xO_y$ phases may comprise a dimension of at most about 1, 2, 3, 4, 5, 6, 7, 8, 9, 10, 100, 1000, or 10000 nm. In some cases, the heterogenous phase may comprise a $Ce_xO_y$ matrix and $Zr_xO_y$ phases embedded therein. In some cases, the $Zr_xO_y$ phases may comprise a dimension of at least about 1, 2, 3, 4, 5, 6, 7, 8, 9, 10, 100, 1000, or 10000 nm. In some cases, the $Zr_xO_y$ phases may comprise a dimension of at most about 1, 2, 3, 4, 5, 6, 7, 8, 9, 10, 100, 1000, or 10000 nm. In some cases, the $Zr_xO_y$ matrix may comprise a percolating network. In some cases, the $Ce_xO_y$ phase may comprises a non-percolating network.

In some cases, the support comprising ceria ($Ce_xO_y$) may reduce a binding energy of an electron in a $3P_{3/2}$ orbital of one or more active metal particles. In some cases, the comprising the ($Ce_xO_y$) may increase the metal-support interaction. In some cases, the $Ce_xO_y$ may be configured to reduce a metal-nitrogen binding energy during an ammonia cracking reaction. In some cases, the $Ce_xO_y$ may be configured to increase electron occupancy in a metal-nitrogen anti-bonding molecular orbital during an ammonia cracking reaction. In some cases, the $Ce_xO_y$ of a $Ce_xO_y$-doped $Zr_xO_y$ (or zirconia) support may be partially reduced For example, Ce(IV) may be converted to Ce(III) with a concurrent loss of oxygen to generate $CeO_{(2-x)}$. In the case of a $(Zr:Ce)O_2$ doped phase, the cerium cations may be reduced with a loss of oxygen to generate oxygen vacancies. It is noted that Ce metal may not be generated by the reduction and loss of oxygen.

In some cases, one or more XRD peaks of the catalyst doped with $Ce_xO_y$ may comprise a lower angle of diffraction compared to one or more corresponding XRD peaks of an undoped catalyst. In some cases, one or more XRD peaks of zirconia in Ru/Ce doped zirconia catalyst may comprise a lower angle of diffraction compared to one or more corresponding XRD peaks of an undoped catalyst. In some cases, the catalyst comprising the molar ratio of the Ce to the $ZrO_2$ of about 20:80 is configured to produce a detectable XRD peak of $Ce_xO_y$. In some cases, the catalyst comprises Ce at an amount of at least about 1, 5, 10, 20, 30, 40, 50 mols of Ce per 100 mols of $ZrO_2$. In some cases, the catalyst comprises Ce at an amount of at least about 10, 20, 30, 40, 50, 60, 70, 80, or 90 mols of Ce per 100 mols of Ce and $ZrO_2$. In some cases, the catalyst comprises Ce at an amount of at most about 10, 20, 30, 40, 50, 60, 70, 80, or 90 mols of Ce per 100 mols of Ce and $ZrO_2$. In some cases, the catalyst comprises $ZrO_2$ at an amount of at least about 1, 5, 10, 20, 30, 40, 50 mols of $ZrO_2$ per 100 parts of Ce mols $ZrO_2$. In some cases, the catalyst comprises $ZrO_2$ at an amount of at least about 10, 20, 30, 40, 50, 60, 70, 80, or 90 mols of $ZrO_2$ per 100 parts of Ce mols $ZrO_2$. In some cases, the catalyst comprises $ZrO_2$ at an amount of at most about 1, 5, 10, 20, 30, 40, 50, 60, 70, 80, or 90 mols of $ZrO_2$ per 100 parts of Ce mols $ZrO_2$.

In some cases, the support comprises a layer provided on the support. In some cases, the layer comprises $Zr_xO_y$. In some cases, the layer comprises zirconia. In some cases, the layer comprises $Ce_xO_y$. In some cases, the layer comprises ceria. In some cases, the layer comprises $Zr_xO_y$ doped with cerium (Ce) and oxygen (O). In some cases, the layer comprises a solid solution of $Zr_xO_y$ and $Ce_xO_y$. In some cases, the $Zr_xO_y$ may be doped with $Ce_xO_y$. In some cases, the $Zr_xO_y$ and the $Ce_xO_y$ may be partially mixed. In some cases, the layer may comprise a heterogenous phase comprising regions of the $Zr_xO_y$ and regions of the $Ce_xO_y$. In some cases, the layer may comprise a thickness of at least about 1, 10, 100, 1000, 10000 nm. In some cases, the layer may comprise a thickness of at most about 1, 10, 100, 1000, 10000 nm.

In some cases, a molar ratio of Ce to Zr in the layer ranges from about 1:5 to about 1:25. In some cases, the molar ratio of the Ce to the Zr ranges from about 1:8 to about 1:12. In some cases, a molar ratio of Ce to Zr in the layer is at least about 1:2, 1:3, 1:4, 1:5, 1:6, 1:7, 1:8, 1:9, 1:10, 1:15, 1:20, 1:25, 1:30, 1:35, 1:40, 1:45, 1:50, 1:60, 1:70, 1:80, 1:90, or 1:100. In some cases, a molar ratio of Ce to Zr in the layer is at most about 1:2, 1:3, 1:4, 1:5, 1:6, 1:7, 1:8, 1:9, 1:10, 1:15, 1:20, 1:25, 1:30, 1:35, 1:40, 1:45, 1:50, 1:60, 1:70, 1:80, 1:90, or 1:100.

In some cases, the layer comprises an amorphous structure, a monoclinic structure, and/or a tetragonal network structure of $(Zr_x:Ce_y)O_z$. In some cases, the layer comprises a plurality of nanoparticles comprising $CeO_2$. In some cases, the layer comprises $Ce^{3+}$ ions and $Ce^{4+}$ ions, wherein a ratio of the $Ce^{3+}$ ions to the $Ce^{4+}$ ions ranges from about 0.3 to about 0.9. In some cases, the ratio ranges from about 0.7 to about 0.8. In some cases, the ratio of the $Ce^{3+}$ ions to the $Ce^{4+}$ ions is at least about 0.2, 0.3, 0.4, 0.5, 0.6, 0.7, 0.8, 0.9, or 1. In some cases, the ratio of the $Ce^{3+}$ ions to the $Ce^{4+}$ ions is at most about 0.2, 0.3, 0.4, 0.5, 0.6, 0.7, 0.8, 0.9, or 1.

FIG. 23 shows ammonia conversion percentage versus temperature for various catalysts, in accordance with some embodiments. Experiments were conducted to compare various catalysts comprising $Ce_xO_y$-doped $Zr_xO_y$ supports, including a control catalyst comprising $Ru/ZrO_2$ (i.e., Ru supported on zirconia). Ammonia conversion efficiency was tested by applying ammonia to the catalyst with $P_{NH_3}$=1 atm and with space velocity=10000 $mL_{NH3}$ $mL_{cat}^{-1}$ $hr^{-1}$. In the range of temperatures investigated (from 400° C. to 550° C.), the catalysts comprising the $Ce_xO_y$-doped $Zr_xO_y$ supports provided increased ammonia conversion efficiency compared to the control catalyst (e.g., $2Ru/ZrO_2$). In some cases, increasing the amount of Ru loaded in the catalyst can increase ammonia conversion efficiency. In some cases, loading the catalyst with potassium (e.g., via coprecipitation of $Ce(NO_3)_3$ with KOH during support synthesis) can lead to improvements in ammonia conversion efficiency. For example, $2Ru$—$K/10Ce$—$ZrO_2$-A900 (Ru to K ratio of 1:1) and $2Ru/K$-A900-$10Ce$-$ZrO_2$-A900 (Ru to K ratio of 1:1) provides similar ammonia conversion efficiency as 8R/10Ce—$ZrO_2$-A900, replacing about 6 wt % of Ru while maintaining the similar ammonia conversion efficiency. In some cases, a support comprising potassium increases ammonia conversion efficiency. Table 1 shows protocols for synthesizing some of the catalysts disclosed herein.

In some cases, the ammonia conversion efficiency or the turnover frequency may be measured on a set of predetermined conditions. In some cases, the set of predetermined conditions may comprise temperature, ammonia pressure, ammonia flow rate, levels of one or more inert gases, or any combination thereof.

Figure 23A:
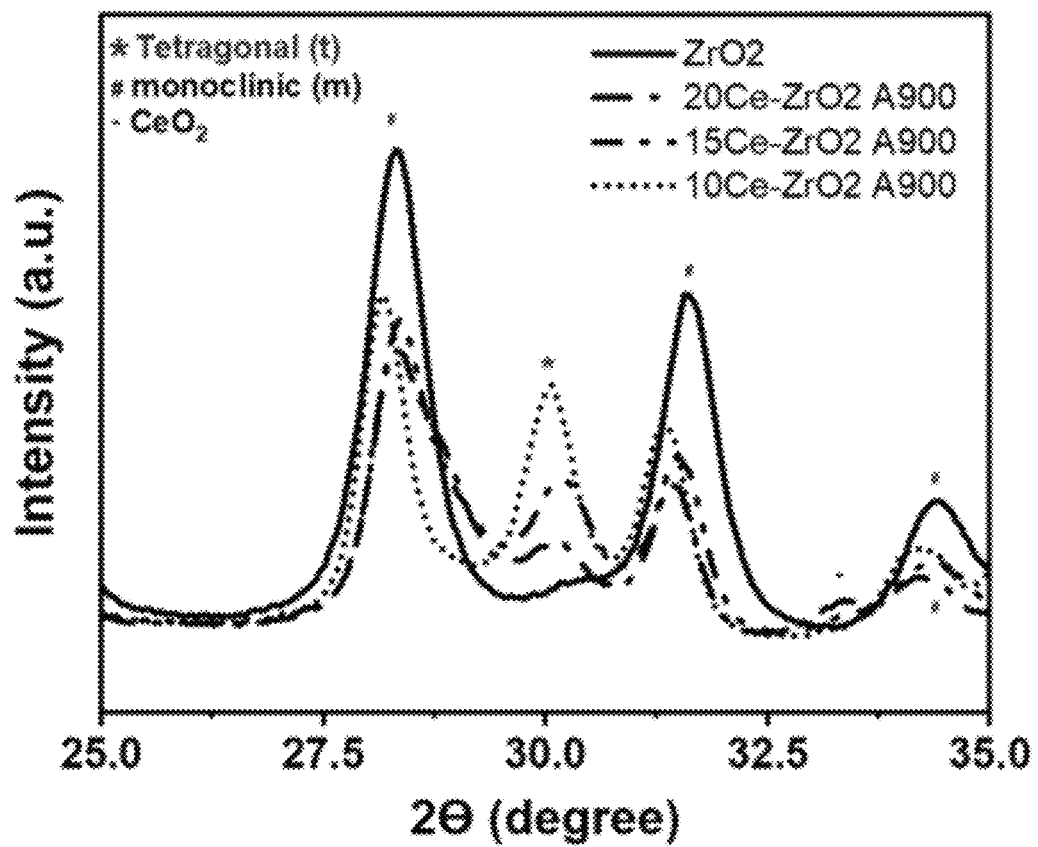
FIG. 23A shows powder X-ray diffraction (pXRD) spectra of supports comprising varying amounts of ceria with zirconia, in accordance with some embodiments.

In some cases, a support may comprise a metal oxide phase. FIG. 23A shows pXRD spectra of supports comprising varying amounts of $Ce_xO_y$ with $Zr_xO_y$, in accordance with some embodiments. Doping of $Zr_xO_y$ with cerium may incorporate the cerium into a lattice of the $Zr_xO_y$ and a shift of a pXRD peak of the lattice framework towards a lower angle of diffraction. Upon doping $ZrO_2$ support with 10 mol % Ce (such that the support may comprises 10% mol of Ce atoms and 90% mol of $ZrO_2$ compound), a peak shift towards lower angles of diffraction was observed, consistent with doping of the cerium atoms into the $Zr_xO_y$ lattice. Increasing the doping further to 15-20 mol % Ce led to the peaks shifting to the right, which is closer to the results of the control group (undoped $Zr_xO_y$), and at 20 mol % Ce, new peaks for $Ce_xO_y$ were observed. The result at 20 mol % Ce may indicate exsolution/agglomeration of the cerium from the lattice to generate discrete $Ce_xO_y$ nanoparticles on the support. It may also be possible that $Ce_xO_y$ ceria nanoparticles are produced on the surface of the 15 mol % Ce material, but that the nanoparticles are smaller than the size limit of detection of the powder-XRD instrumentation (approximately 2 nm). It was observed that when the amount of Ce is decreased from 20 wt % to 10 wt %, the strength of the

TABLE 1

Catalyst synthesis protocols

| Catalyst | Synthesis Protocol |
| --- | --- |
| 8Ru/10Ce-ZrO$_2$-A900 | (1) Ce(NO$_3$)$_3$ deposited in aqueous solution in order to achieve a final nominal loading of 10 mol % Ce, (2) Sample is dried in vacuo, (3) Sample is annealed at 900° C. under nitrogen, (4) Ru(NO)(NO$_3$)$_3$ deposited in order to achieve a final nominal Ru loading of 8 wt %. |
| 2Ru/K-10Ce-ZrO$_2$-C900 | (1) Ce(NO$_3$)$_3$ deposited in aqueous solution in order to achieve a final nominal loading of 10 mol % Ce, (2) Sample is dried in vacuo, (3) KOH deposited in aqueous solution to achieve a final molar ratio of K:Ce = 1:1, (4) Sample is dried in vacuo, (5) Sample is calcined at 900° C. under ambient air, (6) Ru(NO)(NO$_3$)$_3$ deposited in order to achieve a final nominal Ru loading of 2 wt %, (7) Sample is reduced under hydrogen at 300° C. |
| 2Ru/K-10Ce-ZrO$_2$-A900 | (1) Ce(NO$_3$)$_3$ deposited in aqueous solution in order to achieve a final nominal loading of 10 mol % Ce, (2) Sample is dried in vacuo, (3) KOH deposited in aqueous solution to achieve a final molar ratio of K:Ce = 1:1, (4) Sample is dried in vacuo, (5) Sample is annealed at 900° C. under nitrogen, (6) Ru(NO)(NO$_3$)$_3$ deposited in order to achieve a final nominal Ru loading of 2 wt %, (7) Sample is reduced under hydrogen at 300° C. |
| 2Ru + K/ 10Ce-ZrO$_2$-A900 | (1) Ce(NO$_3$)$_3$ deposited in aqueous solution in order to achieve a final nominal loading of 10 mol % Ce, (2) Sample is dried in vacuo, (3) Sample is annealed at 900° C. under nitrogen, (4) Ru(NO)(NO$_3$)$_3$ deposited in order to achieve a final nominal Ru loading of 2 wt %, (5) Sample is dried in vacuo, (6) KOH deposited in aqueous solution to achieve a final molar ratio of K:Ce = 1:1, (7) Sample is reduced under hydrogen at 300° C. |
| 2Ru/10Ce-ZrO$_2$-A900 | (1) Ce(NO$_3$)$_3$ deposited in aqueous solution in order to achieve a final nominal loading of 10 mol % Ce, (2) Sample is dried in vacuo, (3) Sample is annealed at 900° C. under nitrogen, (4) Ru(NO)(NO$_3$)$_3$ deposited in order to achieve a final nominal Ru loading of 2 wt %, (5) Sample is reduced under hydrogen at 300° C. |
| 2Ru/ZrO$_2$ | (1) Ru(NO)(NO$_3$)$_3$ deposited in order to achieve a final nominal Ru loading of 2 wt %, (2) Sample is dried in vacuo, (3) Sample is reduced under hydrogen at 300° C. |

XRD signal that is associated with the tetragonal phase of $Zr_xO_y$ (star) was increased. It was observed that in the absence of Ce, the XRD signal that indicates tetragonal phase of $Zr_xO_y$ can be non-prominent or absent. Without being bound to a particular theory, the tetragonal phase of $Zr_xO_y$ could be caused by $(Zr_x:Ce_y)O_z$ (i.e., solid solution of $Zr_xO_y$ and $Ce_xO_y$) comprising a tetragonal network structure. The tetragonal phase may indicate that there is strong grafting of ceria on the $Zr_xO_y$ surface. At the highest ceria loading, 20 wt %, an XRD signal indicating excess $Ce_xO_y$ was detected (arrow).

Figure 23B:
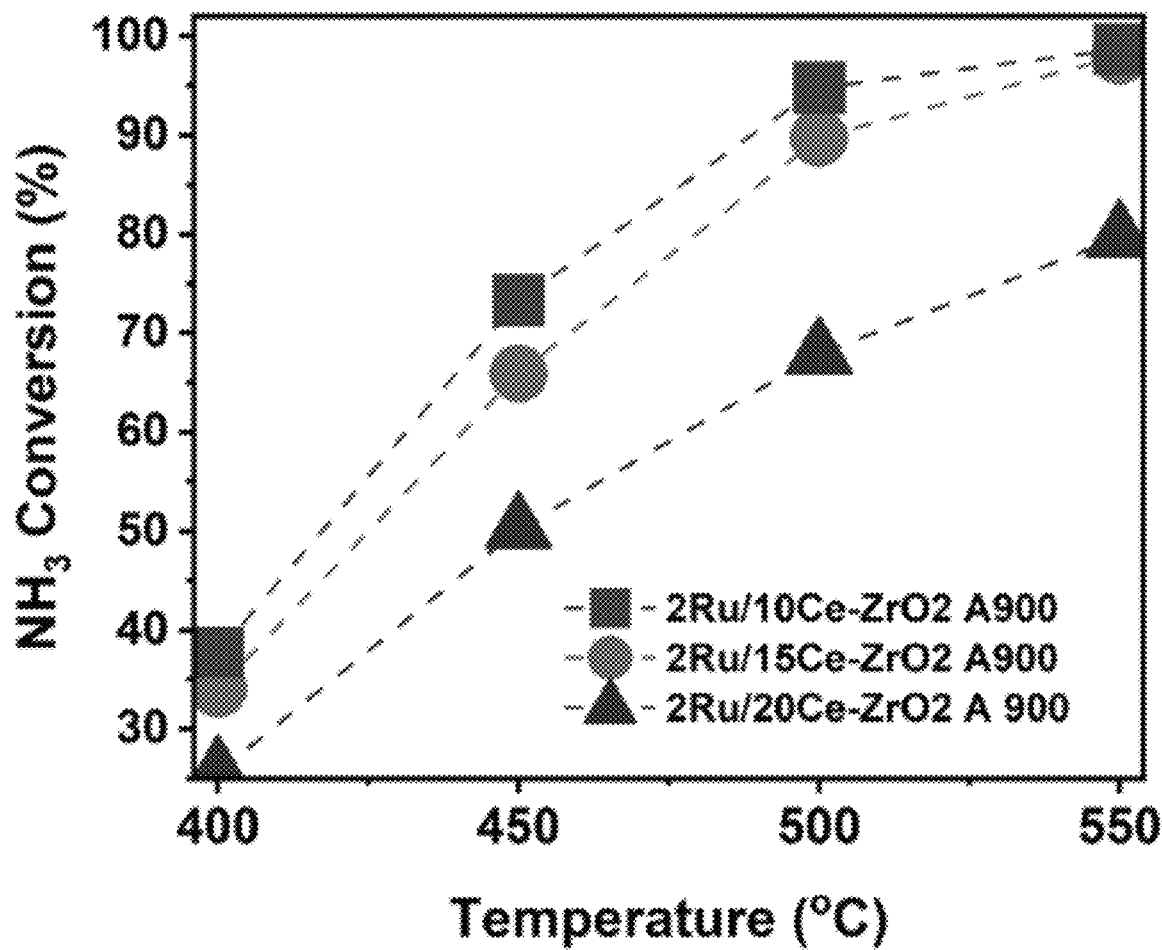
FIG. 23B shows ammonia conversion efficiencies of various catalysts as a function of temperature, in accordance with some embodiments.

The ammonia conversion efficiency of catalysts, as shown in FIG. 23B, increased in the following order: $Ru/ZrO_2$, $Ru/20Ce$—$ZrO_2$, $Ru/15Ce$—$ZrO_2$, then $Ru/10Ce$—$ZrO_2$. In some cases, this trend may correlate with incorporation of the cerium into the $Zr_xO_y$ framework to generate a solid solution, which may be determined using pXRD. In some cases, the ammonia conversion efficiency may correlate with the total intensity of the pXRD signals that indicate a tetragonal $(Zr_x:Ce_y)O_z$ network in the support.

Figure 24A:
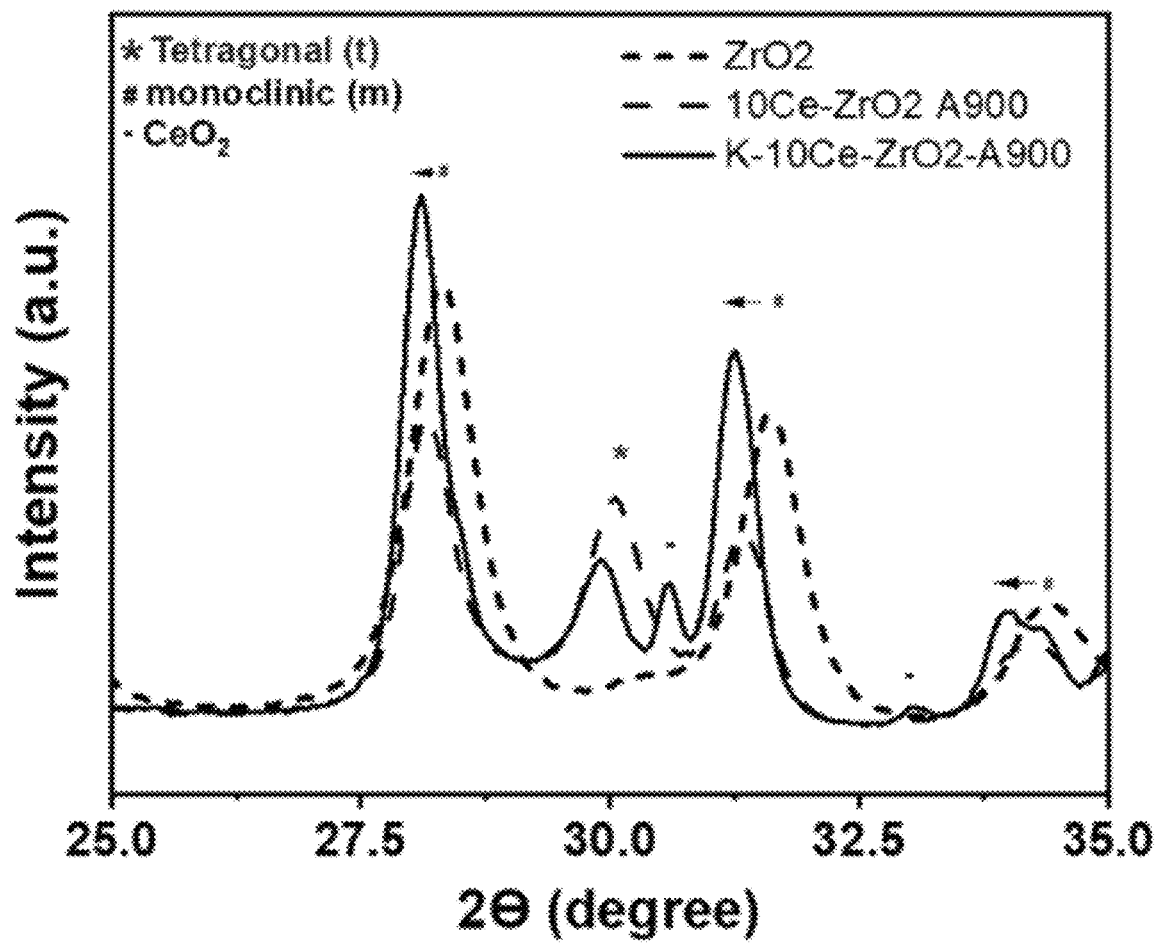
FIGS. 24A-24B show pXRD spectra of different catalysts, in accordance with some embodiments.
Figure 24B:
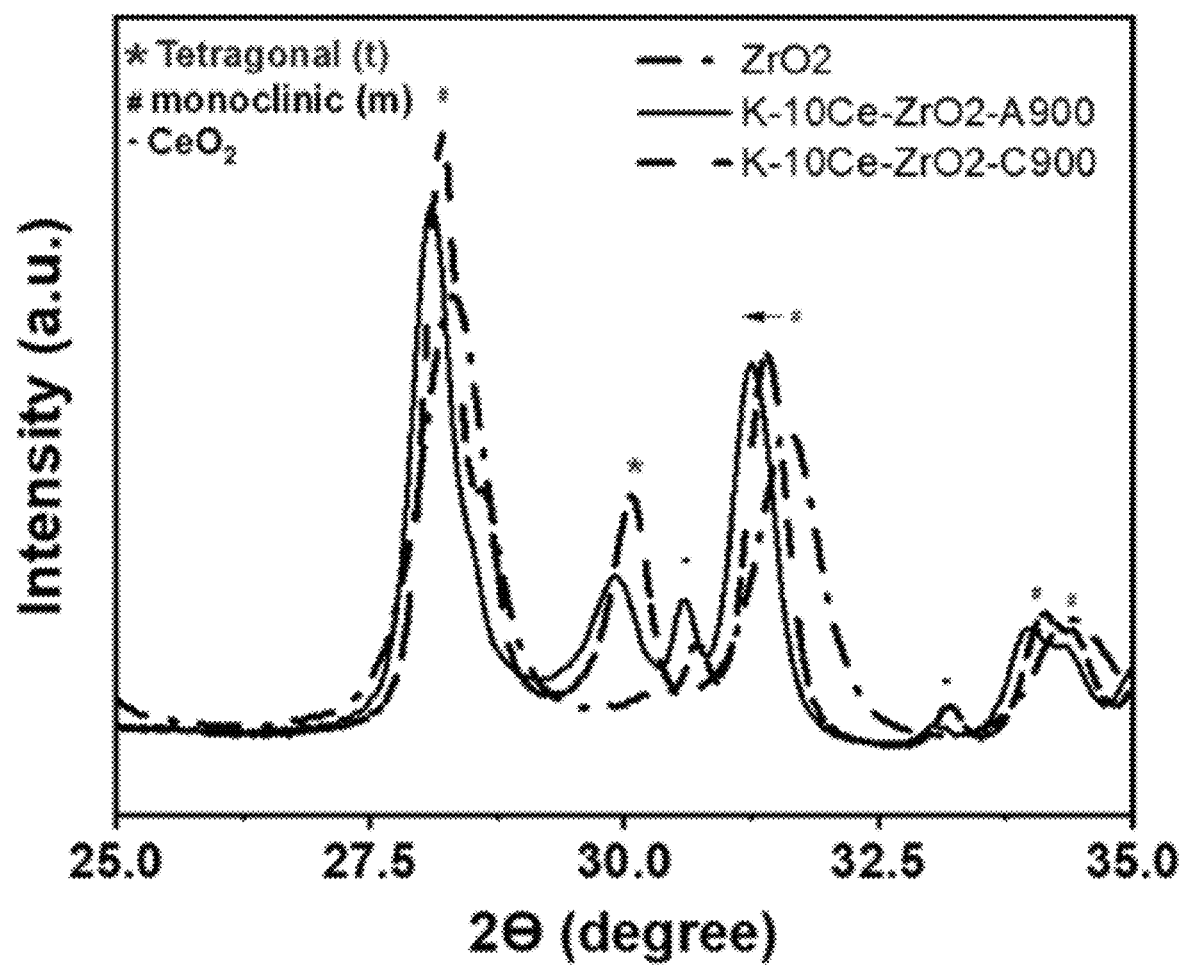

FIGS. 24A-24B show powder X-ray diffraction (XRD) spectra, in accordance with some embodiments. In some cases, codeposition of KOH with $Ce(NO_3)_3$ followed by calcining (e.g., in air) results in an intermediate peak shift to the left, indicating incorporation of Ce into the zirconia matrix. In some cases, codeposition of KOH with $Ce(NO_3)_3$ followed by annealing ($N_2$) results in an even further peak shift to the left, indicating more efficient incorporation of Ce into the zirconia matrix. In some cases, new peaks are observed corresponding to $Ce_xO_y$ in both K-doped samples. In some cases, the new peaks may be due to exsolution and/or agglomeration of the cerium from the lattice to generate discrete ceria nanoparticles on the support.

Figure 24C:
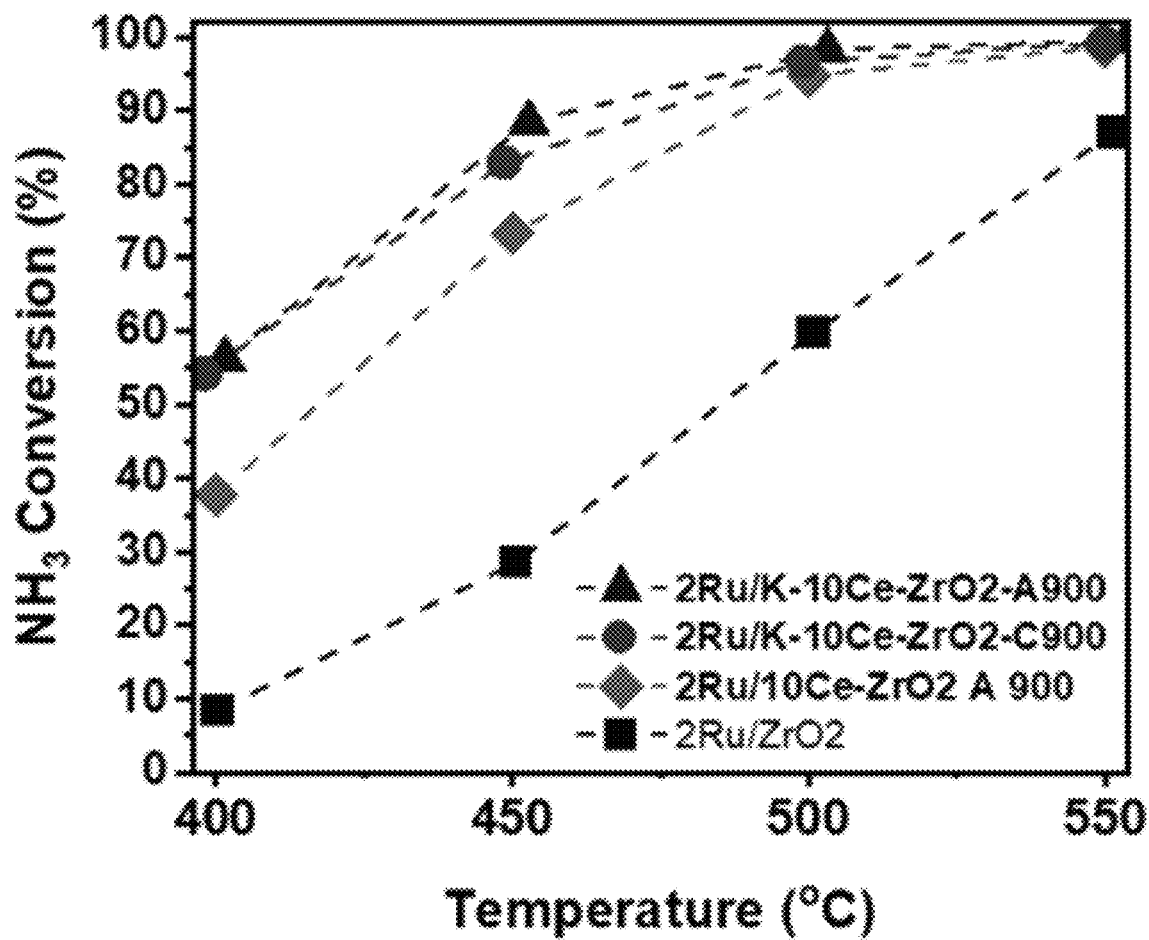
FIG. 24C shows ammonia conversion efficiency of catalysts, in accordance with some embodiments.

FIG. 24C shows ammonia conversion efficiency of catalysts, in accordance with some embodiments. The ammonia conversion efficiency of samples increased in the following order: $Ru/ZrO_2$, $Ru/10Ce$—$ZrO_2$-C900, $Ru/K$-$10Ce$-$ZrO_2$-C900, then $Ru/K$-$10Ce$-$ZrO_2$-A900. In some cases, ammonia conversion efficiency may correlate with incorporation of cerium into the zirconia framework to generate a solid solution, as shown using pXRD.

Figure 25B:
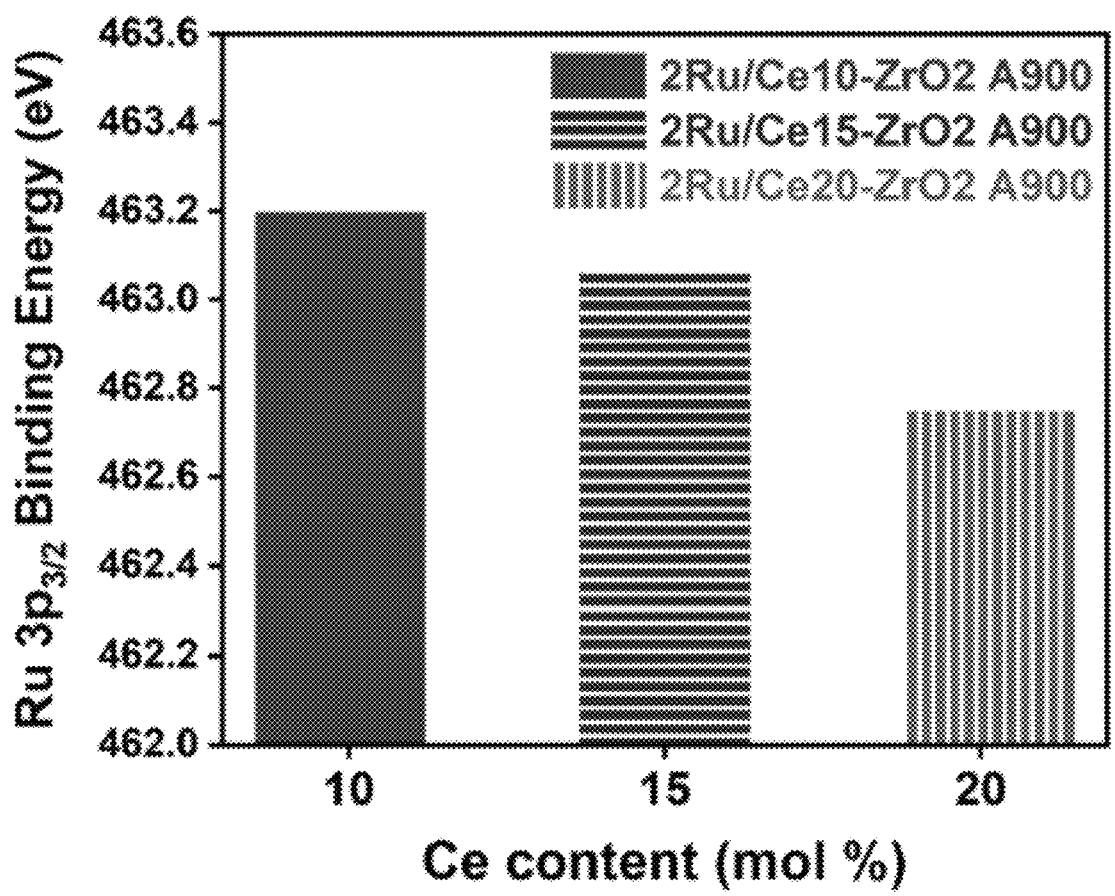
FIG. 25B shows electron binding energy for electrons in the $3P_{3/2}$ orbital of ruthenium provided on the supports measured using X-Ray Photoelectron Spectroscopy (XPS), in accordance with some embodiments.

FIG. 25A shows powder X-ray diffraction (XRD) spectra of supports, in accordance with some embodiments. In some cases, the tetragonal phase of $Zr_xO_y$ increases when the Ce content decreases. Without being bound to a particular theory, the tetragonal network of the $(Zr_x:Ce_y)O_z$ may induce a concentration of oxygen vacancies and/or high density of surface oxygen vacancies in the support. In some cases, the concentration of oxygen and/or high density of surface oxygen vacancies may increase a strength of the metal-support interaction. FIG. 25B shows electron binding energy for electrons in the $3P_{3/2}$ orbital of ruthenium provided on the supports measured using X-Ray Photoelectron Spectroscopy (XPS), in accordance with some embodiments. In some cases, the tetragonal $(Zr_x:Ce_y)O_z$ network may provide a strong metal-support interaction. The $Ru/10Ce$—$ZrO_2$, which was measured to have the highest content of the tetragonal $(Zr_x:Ce_y)O_z$ network among the catalysts shown in FIG. 25B, had the highest binding energy, which may indicate that Ru strongly interacts with the $10Ce$—$ZrO_2$ support. Without being bound to a particular theory, the solid solution comprising $(Zr_x:Ce_y)O_z$ in the tetragonal phase may provide an electron poor environment on a surface of the support, to allow the Ru to interact strongly with the support (e.g., at 10 mol % loading of Ce). In some cases, the tetragonal phase of $Zr_xO_y$ may have a lower hydroxyl group surface density than a monoclinic phase of $Zr_xO_y$. In some cases, a hydroxyl group may be a Brønsted acid site. In some cases, high density of the strong acid sites may reduce the ammonia conversion efficiency of the catalyst (e.g., and may reduce the rate of the ammonia decomposition reaction). In some cases, the transformation from monoclinic $Zr_xO_y$ to tetragonal $Zr_xO_y$ may promote ammonia conversion efficiency by reducing hydroxyl group surface density.

Figure 25C:
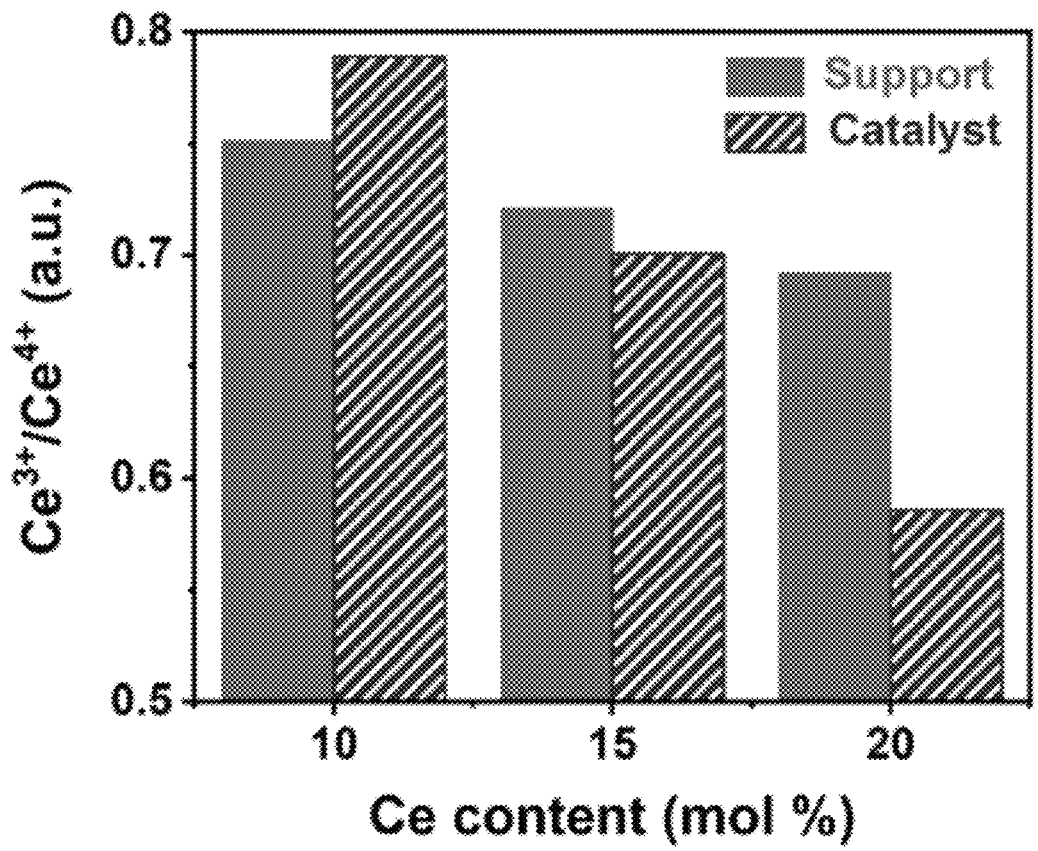
FIG. 25C shows $Ce^{3+}/Ce^{4+}$ ratio determined using XPS, in accordance with some embodiments.

In some cases, synthesis of $(Zr_x:Ce_y)O_z$ may be performed to create nanoparticles of $CeO_2$ on the surface. In some cases, the nanoparticles may comprise a size that is below a spatial resolution of some instruments (e.g., some pXRD machines). In some cases, reducing cerium content increases the $Ce^{3+}/Ce^{4+}$ ratio. FIG. 25C shows $Ce^{3+}/Ce^{4+}$ ratio determined using XPS, in accordance with some embodiments. In some cases, high $Ce^{3+}/Ce^{4+}$ ratio may indicate a small particle size. In some cases, small nanoparticles of cerium may cause high $Ce^{3+}/Ce^{4+}$ ratios. In some cases, a high $Ce^{3+}/Ce^{4+}$ ratio may be associated with high dispersion of cerium with the small nanoparticle. In some cases, $Ce^{3+}/Ce^{4+}$ ratio and/or high dispersion of cerium may be correlated with ammonia conversion efficiency and the strength of the metal-support interaction, as derived from ruthenium binding energies (e.g., as measured with XPS). In some cases, the $Ce^{3+}/Ce^{4+}$ ratio, the strength of the metal-support interaction, and the ammonia conversion efficiency may increase in the order comprising: $Ru/Ce20$-$ZrO_2$, $Ru/Ce15$-$ZrO_2$, then $Ru/Ce10$-$ZrO_2$. In some cases, a high $Ce^{3+}/Ce^{4+}$ ratio and/or high dispersion of Ce caused by small nanoparticles of $Ce_xO_y$ can indicate a large number of surface oxygen vacancies. In some cases, dispersing Ce may reduce the loss of active sites via wetting of the ruthenium by the support/bulkarization and induce the strong-metal support interaction.

Figure 26A:
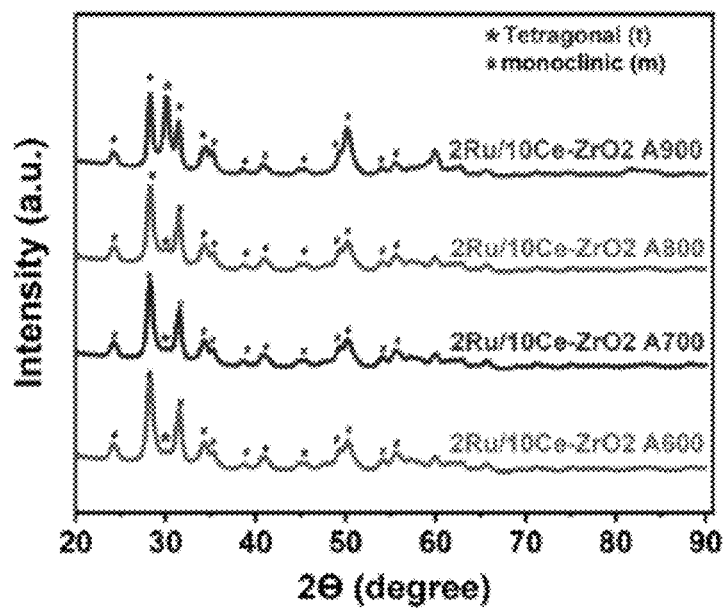
FIGS. 26A-26B show pXRD spectra of supports and catalysts annealed under various temperatures, respectively, in accordance with some embodiments.
Figure 26B:
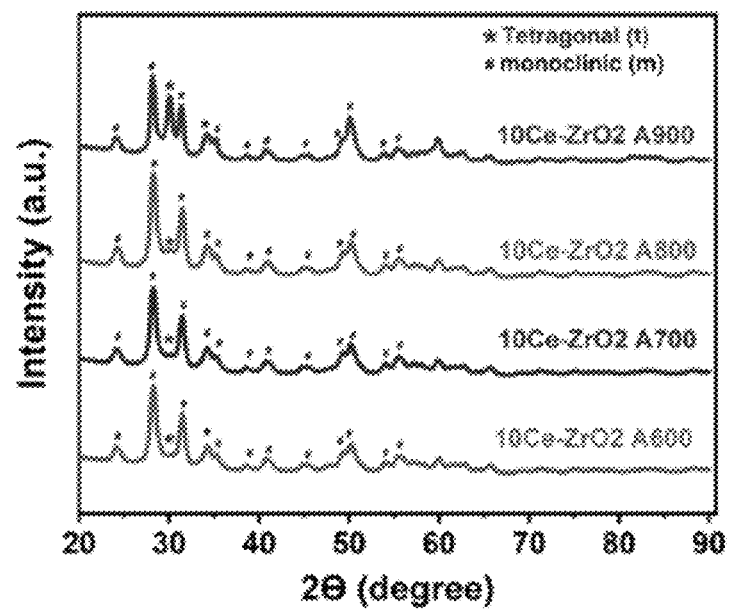
Figure 26C:
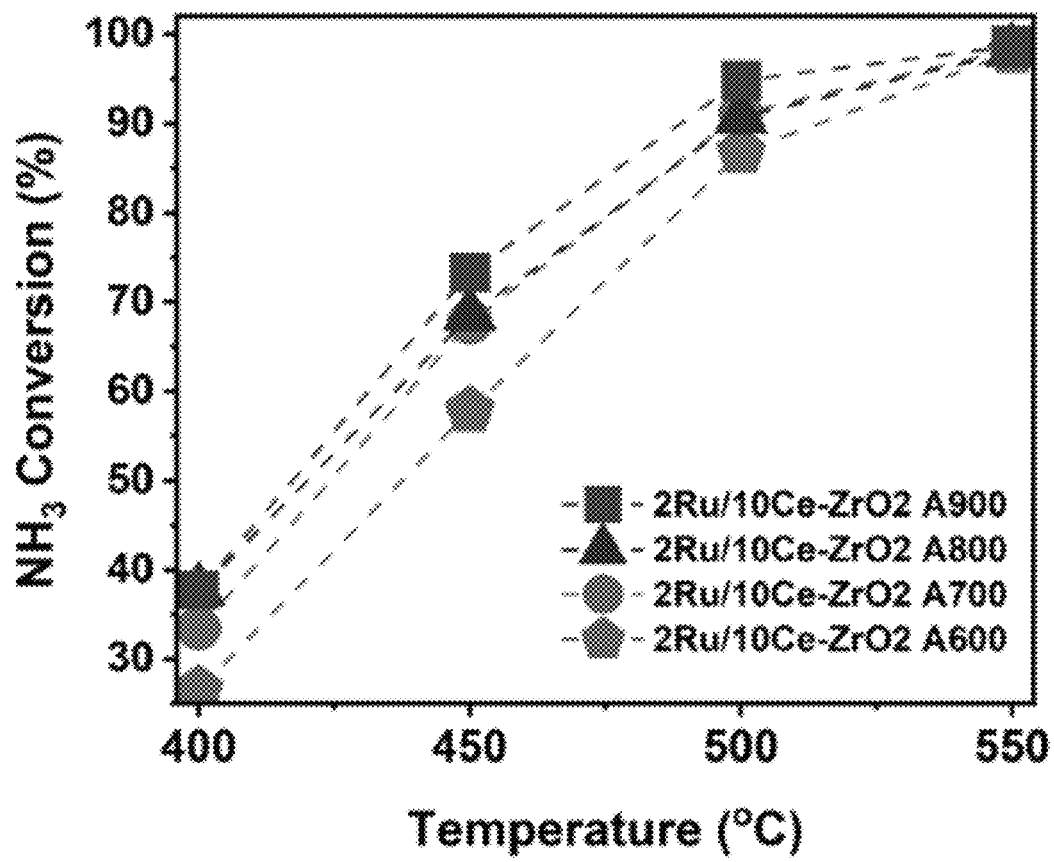
FIG. 26C shows ammonia conversion efficiency of catalysts, in accordance with some embodiments.

FIGS. 26A-26B show powder X-ray diffraction (pXRD) spectra of supports and catalysts annealed under various temperatures, respectively, in accordance with some embodiments. Experiments were conducted to investigate the effects of annealing temperature on the support or catalyst structure. In some cases, increasing the annealing temperature increases the XRD signal (Asterisk) for the tetragonal phase of $Zr_xO_y$. In some cases, increasing annealing temperatures increased the ammonia conversion efficiency of the catalyst, as shown in FIG. 26C. In some cases, the correlated relationship between the tetragonal $(Zr_x:Ce_y)O_z$ phase and ammonia conversion efficiency in the different test results indicated that the high tetragonal network of the $(Zr_x:Ce_y)O_z$ mixture oxide leads to a reduction in strong acid sites and facilitates the kinetics of the ammonia decomposition reaction. In some cases, the ammonia conversion efficiency of samples increased in the following order: $Ru/10Ce$—$ZrO_2$ A600C, $Ru/10Ce$—$ZrO_2$ A700C, $Ru/10Ce$—$ZrO_2$ A800C, then $Ru/10Ce$—$ZrO_2$ A900C. In some cases, the catalytic performance correlated with the total intensity of the tetragonal $(Zr_x:Ce_y)O_z$ network XRD signal of the support. Without being bound to a particular theory, the correlated relationship between the tetragonal $(Zr_x:Ce_y)O_z$ phase and catalytic performance in the different test results may be due to the tetragonal network of the $(Zr_x:Ce_y)O_z$ mixture oxide inducing strong metal-support interaction, thereby facilitating the kinetics of ammonia decomposition reaction.

Figure 27A:
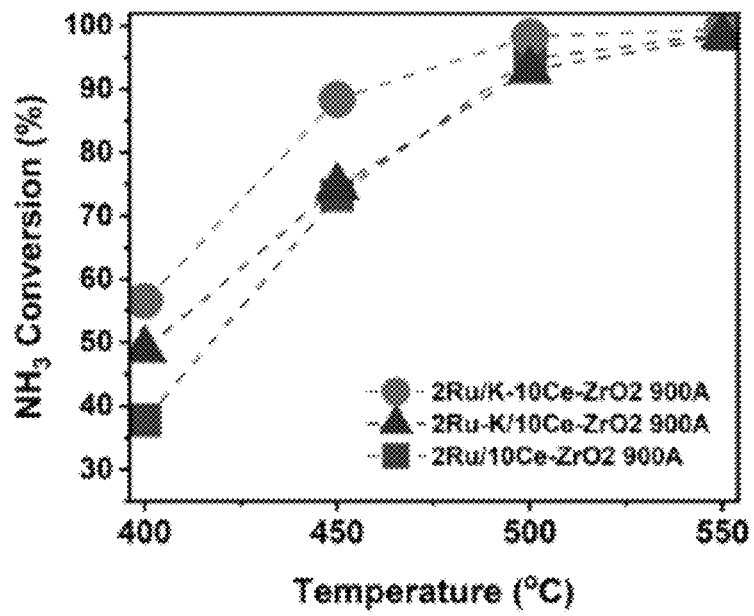
FIG. 27A shows ammonia conversion efficiency of various catalysts with a potassium impregnation step varied in sequence between each catalyst, in accordance with some embodiments.
Figure 27B:
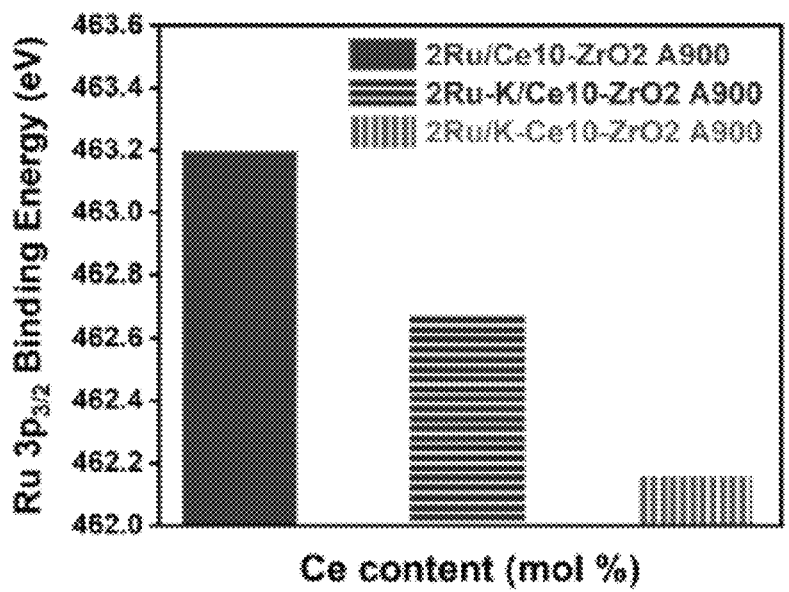
FIG. 27B shows electron binding energy for electrons in the $3P_{3/2}$ orbital of ruthenium provided on the supports measured using X-Ray Photoelectron Spectroscopy (XPS), in accordance with some embodiments.

FIG. 27A shows ammonia conversion efficiency of various catalysts, in accordance with some embodiments. FIG. 27B shows electron binding energy for electrons in the $3P_{3/2}$ orbital of ruthenium provided on the supports measured using XPS, in accordance with some embodiments. In some cases, including an alkali promoter (e.g., potassium) can increase the basicity of a support. In some cases, increased basicity of the support may correlate with an increased electron density of the Ru sites surrounding basic sites (as determined from the lower Ru binding energy, measured via XPS). In some cases, the increased electron density of the Ru may improve the efficiency of a recombinative nitrogen desorption step by back-donation of electrons into the antibonding orbital of Ru—N. In some cases, the increased electron density of the Ru may weaken the N—H bond, which can promote N—H bond cleavage. In some cases, the catalyst comprises one or more promotors.

In some cases, the catalyst comprises a density of acid sites ranging from about 10 mol/g to about 1000 mol/g. In some cases, the density of acid sites is from about 50 mol/g to about 300 mol/g. In some cases, the density of acid sites is at least about 10, 20, 30, 40, 50, 60, 70, 80, 90, 100, 200, 300, 400, 500, 600, 700, 800, 900, or 1000 mol/g. In some cases, the density of acid sites is at most about 10, 20, 30, 40, 50, 60, 70, 80, 90, 100, 200, 300, 400, 500, 600, 700, 800, 900, or 1000 mol/g. In some cases, the one or more promoters modify a basicity of the support. In some cases, the one or more promoters comprise alkali metals and/or alkaline rare earth metals.

In some cases, the one or more active metals comprise Ru having a binding energy of 460 eV to 465 eV for an electron in a 3P3/2 orbital, Ni having a binding energy of 870 eV to 880 eV for an electron in a Ni 2P½ orbital, Rh having a binding energy of 305 eV to 315 eV for an electron in a Rh 3d3/2 orbital, Ir having a binding energy of 55 eV to 65 eV for an electron in a Ir 4f 7/2 orbital, Co having a binding energy of 790 eV to 805 eV for an electron in a Co 2P½ orbital, Fe having a binding energy of 720 eV to 735 eV for an electron in a Fe2P½ orbital, Pt having a binding energy of 67 eV to 75 eV for an electron in a Pt 4f7/2 orbital, Cr having a binding energy of 585 eV to 595 eV for an electron in a Cr 2P½ orbital, Mo having a binding energy of 230 eV to 240 eV for an electron in a Mo 3d 3/2 orbital, Pd having a binding energy of 335 ev to 345 eV for an electron in a Pd 3d3/2 orbital, or Cu having a binding energy of 950 eV to 965 eV for an electron in a Cu 2p½ orbital.

In some aspects, the present disclosure provides a method of producing a catalyst. In some cases, the method comprises using (i) $Ce_xO_y$ or a precursor(s) thereof and (ii) $Zr_sO_t$ or a precursor(s) thereof to produce a support comprising cerium (Ce), zirconium (Zr), and oxygen (O), wherein 'x', 'y', 's', and 't' are numbers greater than zero. In some cases, the method comprises heating the support to a target temperature. In some cases, the method comprises depositing one or more promoter precursors on the support to produce the catalyst. In some cases, the catalyst is configured to decompose ammonia to generate hydrogen. In some cases, the catalyst is configured to decompose ammonia to generate hydrogen and nitrogen.

In some cases, the processing is performed with an oxide comprising the $Ce_xO_y$ and the $Zr_sO_t$. In some cases, the heating is performed in the presence of an inert gas phase. In some cases, the processing comprises doping the $Zr_sO_t$ with the $Ce_xO_y$ precursor to produce the support comprising $Ce_xO_y$ and $Zr_sO_t$. In some cases, the processing comprises reacting the $Ce_xO_y$ precursor and the $Zr_sO_t$ precursor to produce the support comprising $Ce_xO_y$ and $Zr_sO_t$.

In some cases, the $Ce_xO_y$ precursor comprises $Ce(NO_3)_3$, cerium nitrate hexahydrate, cerium nitrate x-hydrate, cerium chloride, cerium oxide, cerium oxide nanofiber, cerium fluoride, cerium chloride, cerium chloride heptahydrate, cerium chloride hydrate, cerium acetate hydrate, cerium sulfate, cerium nitrate hydrate, cerium nitrate hexahydrate, cerium bromide, ammonium cerium nitrate, cerium acetylacetonate hydrate, cerium iodide, cerium hydroxide, ammonium cerium sulfate dihydrate, cerium sulfate tetrahydrate, cerium carbonate hydrate, or cerium sulfate hydrate.

In some cases, the $Zr_sO_t$ precursor comprises zirconium n-butoxide, zirconium acetylacetonate, zirconium propoxide, zirconium oxychloride, zirconium hydroxide, zirconium oxide, zirconium oxide nanofiber, zirconium ethoxide, zirconium acetate, zirconium hydroxide, zirconium trifluoroacetylacetonate, zirconium hydride, zirconium acetylacetonate, zirconium chloride, zirconium sulfate hydrate, zirconium butoxide, zirconium carboxyethyl acrylate, zirconium oxynitrate hydrate, zirconium propoxide, or zirconium fluoride.

In some cases, the target temperature ranges from about 600° C. to about 1200° C. In some cases, the target temperature ranges from about 700° C. to about 1000° C. In some cases, the target temperature is about 900° C. In some cases, the target temperature is at least about 600, 700, 800, 900, 1000, 1100, or 1200° C. In some cases, the target temperature is at most about 600, 700, 800, 900, 1000, 1100, or 1200° C.

In some cases, the one or more active metal precursors comprise a Ru precursor, a Ni precursor, a Rh precursor, a Ir precursor, a Co precursor, a Fe precursor, a Pt precursor, a Cr precursor, a Mo precursor, a Pd precursor, or a Cu precursor. In some cases, the ruthenium precursor comprises ruthenium iodide, ruthenium acetylacetonate, ruthenium chloride hydrate, ruthenium oxide hydrate, ruthenium chloride, bis(cyclopentadienyl)ruthenium, ruthenium nitrosyl nitrate, ruthenium iodide hydrate, triruthenium dodecacarbonyl, or any combination thereof.

In some cases, the catalyst comprises about 0.2 wt % to about 20 wt % of ruthenium. In some cases, the catalyst comprises about 0.5 wt % to about 5 wt % of ruthenium. In some cases, the catalyst comprises at least about 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 wt % of ruthenium. In some cases, the catalyst comprises at most about 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, or 20 wt % of ruthenium.

In some cases, the processing further comprises processing (iii) a promotor or a promotor precursor to produce or yield a target molar ratio of the dopant and Ce in the support. In some cases, the promotor precursor comprises an alkali metal precursor, and/or an alkaline rare earth metal precursor. In some cases, an alkali metal of the alkali metal precursor comprises Li, Na, K, Rb, Cs, or Fr. In some cases, an alkaline rare earth metal of the alkaline rare earth metal comprises Mg, Ca, Sr, Ba, or Ra.

In some cases, the promotor precursor comprises potassium methylate, potassium tetrafluoroborate, potassium hydrogen fluoride, potassium thiocyanate, potassium disulfite, potassium bisulfate, potassium sulfide, potassium methoxide, potassium trifluoroacetate, potassium dioxide, potassium persulfate, potassium formate, potassium bicarbonate, potassium sorbate, potassium hydroxide, potassium borohydride, potassium dichloroacetate, potassium iodate, potassium chlorate, potassium fluoride, potassium chloride, potassium nitrate, potassium perchlorate, potassium cyanate, or potassium hexachloroiridate.

In some cases, the promotor precursor is processed in an aqueous solution. In some cases, the promotor precursor is processed in an organic solution. In some cases, the target molar ratio of the promotor and Ce ranges from about 0.1:1 to about 3:1. In some cases, the target molar ratio of the promotor and Ce is about 1:1.

In some cases, the method comprises drying the support in a vacuum. In some cases, the method comprises heating the support to a first target temperature. In some cases, the method comprises reducing the one or more promoter precursors, the $Ce_xO_y$, the $Zr_sO_t$, and/or the mixed oxide on the support under hydrogen at a second target temperature. In some cases, the method comprises drying the impregnated support in a vacuum prior to depositing the one or more promotors or dopant precursors. In some cases, drying the impregnated support comprises vacuum drying. In some cases, the vacuum may comprise a pressure that is less than 1 bar. In some cases, the vacuum may comprise a pressure that is less than about 1, 0.1, 0.01, 0.001, 0.0001, or 0.00001 bar. In some cases, the heating comprises using an inert gas. In some cases, the heating comprises using air. In some cases, the inert gas may comprise He, Ne, Ar, Kr, Xe, or $N_2$.

In some cases, the first target temperature ranges from about 600° C. to about 1200° C. In some cases, the first target temperature ranges from about 700° C. to about 1000° C. In some cases, the first target temperature is about 900° C. In some cases, the first target temperature is at least about 600, 700, 800, 900, 1000, 1100, or 1200° C. In some cases, the first target temperature is at most about 600, 700, 800, 900, 1000, 1100, or 1200° C. In some cases, the second target temperature ranges from about 250° C. to about 600° C. In some cases, the second target temperature ranges from about 250° C. to about 450° C. In some cases, the second target temperature is about 300° C. In some cases, the second target temperature is at least about 600, 700, 800, 900, 1000, 1100, or 1200° C. In some cases, the second target temperature is at most about 600, 700, 800, 900, 1000, 1100, or 1200° C.

In some cases, one or more XRD peaks of the catalyst, when the catalyst comprises a K promotor and is processed by the heating under an inert gas, comprise a lower angle of diffraction compared to one or more corresponding XRD peaks of the catalyst not comprising the K promoter and/or not processed by the heating under the inert gas. In some cases, one or more XRD peaks of the catalyst, when the catalyst comprises a K promotor and is processed by the heating under air, comprise a higher angle of diffraction compared to corresponding XRD peak of the catalyst of the catalyst not comprising the K promoter and/or not processed by the heating under the inert gas. In some cases, the catalyst comprises a lower angle of diffraction compared to corresponding XRD peak of zirconia or $Zr_xO_y$ without doping of a ceria. In some cases, the catalyst is configured to produce a XRD peak of ceria, wherein the promoter is K. In some cases, the processing comprises processing one or more promotor precursors to produce/yield a target molar ratio of the promotor and Ce in the support. In some cases, the promoter is reduced under hydrogen at a target temperature.

In some cases, the promoter is configured to modify the basicity of the composite oxide support. In some cases, the promoter is configured to increase the electron density of active metal to facilitate recombinative nitrogen desorption and/or N—H bond cleavage during an ammonia decomposition reaction.

In some cases, the catalyst may comprise nanorod supports. In some cases, the support comprises one or more nanorods comprising the $Ce_xO_y$. In some cases, nanorod supports may advantageously improve ammonia conversion efficiency compared to other form factors. In some cases, immobilization or growth of $CeO_2$ nanorods on $Zr_sO_t$ might further increase efficiency of final catalyst. In some cases, the nanorod supports may be produced using hydrothermal synthesis. In some cases, processing conditions of the hydrothermal synthesis may be tuned to control the morphology of the support. For example, the morphology of the support may comprise a nanorod diameter, a nanorod length, polydispersity, aggregation, or any combination thereof. In some cases, the support may be produced using hydrothermal synthesis to coprecipitate an oxide with a promoter. In some cases, $Ce(NO_3)_3$ and KOH may be coprecipitated. As shown in FIG. 27A, the coprecipitation of a cerium oxide precursor and a promoter precursor may advantageously confer a high ammonia conversion efficiency (e.g., 90% ammonia conversion efficiency at about 450° C.). In some cases, co-impregnation of a promoter and an oxide (e.g., KOH and $Ce(NO_3)_3$) may be performed at high pH reaction conditions.

In some cases, Ru supported on $Ce_xO_y$ nanorods may advantageously confer a high ammonia conversion efficiency. In some cases, immobilization or growth of ceria or $Ce_xO_y$ nanorods on zirconia or $Zr_xO_y$ may further increase efficiency of final catalyst.

Figure 28A:
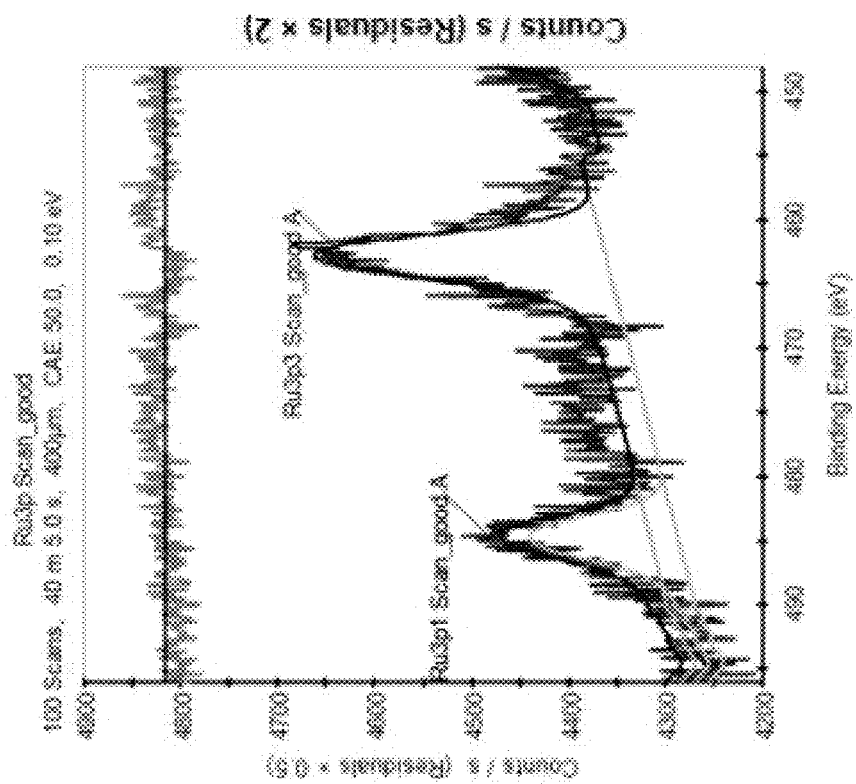
FIGS. 28A-28B show XPS spectra of ruthenium and cerium, respectively, in accordance with some embodiments.
Figure 28B:
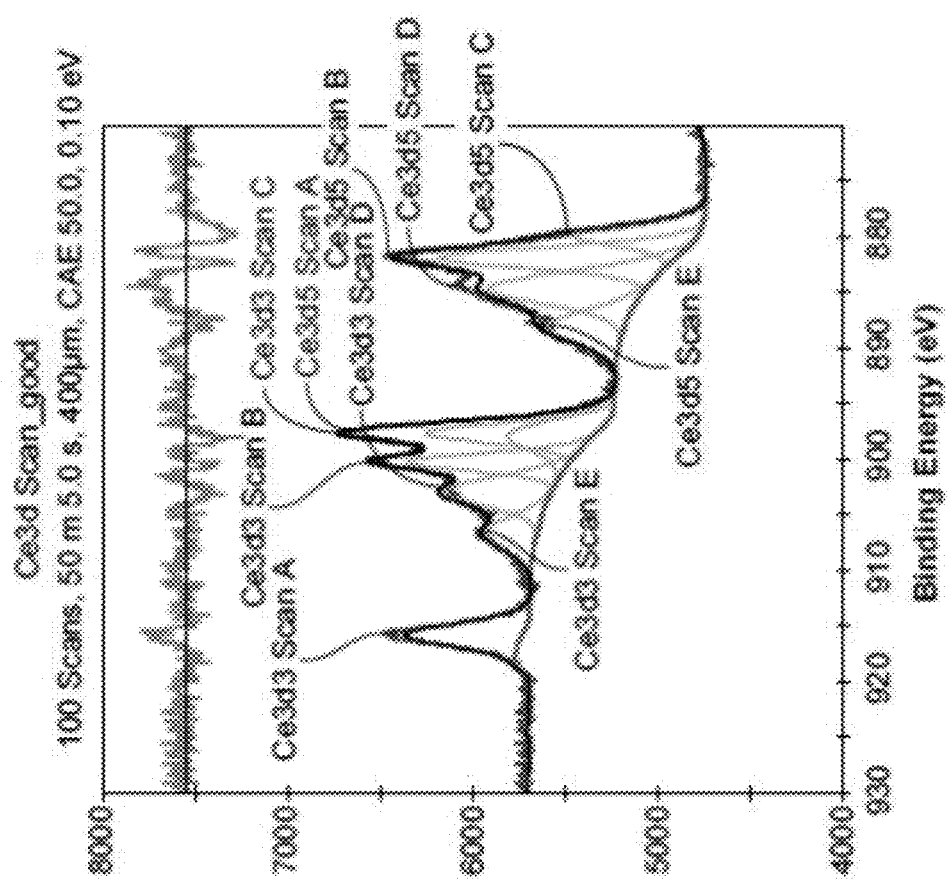

FIGS. 28A-28B show XPS spectra of ruthenium and cerium, respectively, in accordance with some embodiments. In some cases, X-Ray Photoelectron Spectroscopy (XPS) may be used to determine electron density by measuring the electron binding energy of electron states. In some cases, XPS may be used to analyze the electronic state by measuring the electron binding energy in a surface region. It is noted that a higher binding energy may indicate an increased difficulty in removing an electron. In some cases, higher binding energy may indicate a more electropositive environment. In some cases, the deconvolution of cerium feature in an XPS spectra may show relative abundances of $Ce^{3+}$ and $Ce^{4+}$. In some cases, a plurality of peaks in the XPS spectra may be considered, because the XPS features of Ce are complex. In some cases, the catalyst comprises one or more nanoparticles or nanorods comprising the ceria. In some cases, the one or more nanoparticles or nanorods are immobilized on $Zr_sO_t$. In some cases, the one or more nanoparticles or nanorods are formed by co-impregnation of KOH and $Ce(NO_3)_3$.

In some aspects, the present disclosure provides a method of producing a catalyst. In some cases, the method comprises providing a support comprising alumina. In some cases, the method comprises depositing a precursor comprising ruthenium and a precursor comprising phosphorous on the support. In some cases, the method comprises processing the support by annealing the support at a first target temperature under $N_2$. In some cases, the method comprises processing the support by reducing the support at a second target temperature under $H_2$ to yield the catalyst.

In some cases, the catalyst comprises Ru from about 0.5 to about 8 weight %. In some cases, the catalyst comprises at least 0.1, 0.2, 0.3, 0.4, 0.5, 1, 2, 3, 4, 5, 6, 7, 8, 9, or 10 wt % Ru. In some cases, the catalyst comprises at most 0.1, 0.2, 0.3, 0.4, 0.5, 1, 2, 3, 4, 5, 6, 7, 8, 9, or 10 wt % Ru. In some cases, the catalyst comprises a molar ratio of Ru to P from about 0.3 to about 2.5. In some cases, the catalyst comprises a molar ratio of Ru to P of at least about 0.3, 0.5, 1, 1.5, 2, or 2.5. In some cases, the catalyst comprises a molar ratio of Ru to P of at most about 0.3, 0.5, 1, 1.5, 2, or 2.5.

In some cases, method comprises drying the support in a vacuum prior to deposition of a Ru precursor. In some cases, the support is dried in a vacuum prior to depositing a layer comprising $NaH_2PO_2$. In some cases, the target temperature ranges from about 500° C. to about 1200° C. In some cases, the target temperature ranges from about 700° C. to about 1000° C. In some cases, the target range is at least about 500, 600, 700, 800, 900, 1000, 1100, or 1200° C. In some cases, the target range is at most about 500, 600, 700, 800, 900, 1000, 1100, or 1200° C.

In some cases, the precursor containing ruthenium comprises $Ru(NO)(NO_3)_3$. In some cases, the precursor containing phosphorous comprises $NaH_2PO_2$. In some cases, the support comprises theta-$Al_xO_y$. In some cases, the support comprises theta-$Al_2O_3$.

In some aspects, the present disclosure provides a catalyst. In some cases, the catalyst comprises a support comprising $Al_xO_y$. In some cases, the catalyst comprises a support comprising $Al_2O_3$. In some cases, the catalyst comprises a dopant provided on the support. In some cases, the catalyst comprises one or more active metal particles deposited on the support. In some cases, the support, the dopant, and the one or more active metal particles are configured to decompose ammonia to generate at least hydrogen. In some cases, the $Al_xO_y$ comprises $\theta$-$Al_xO_y$. In some cases, the $Al_2O_3$ comprises $\theta$-$Al_2O_3$.

In some cases, the dopant comprises one or more rare earth metals. In some cases, the one or more rare earth metals comprises early f-block metals. In some cases, the early f-block metals comprise La, Ce, Pr, Nd, and Pm. In some cases, the one or more active metals comprise Ru, Ni, Rh, Ir, Co, Fe, Pt, Cr, Pd, Mo, or Cu. In some cases, a molar ratio of the one or more rare earth metals in the dopant to Al in the support ranges from about 1:5 to about 1:25. In some cases, a molar ratio of the one or more rare earth metals in the dopant to Al in the support is about 1:15. In some cases, the molar ratio is least about 1:25, 1:20, 1:15, 1:10, or 1:5. In some cases, the molar ratio is at most about 1:25, 1:20, 1:15, 1:10, or 1:5.

In some cases, metal phosphide catalysts may be used for decomposing ammonia. In some cases, metal phosphides may be used in other reactions, such as electrocatalytic water splitting (e.g. $Ni_xP_y$) and thermocatalytic alkane dehydrogenation (e.g. $Ir_xP_y$).

Figure 29A:
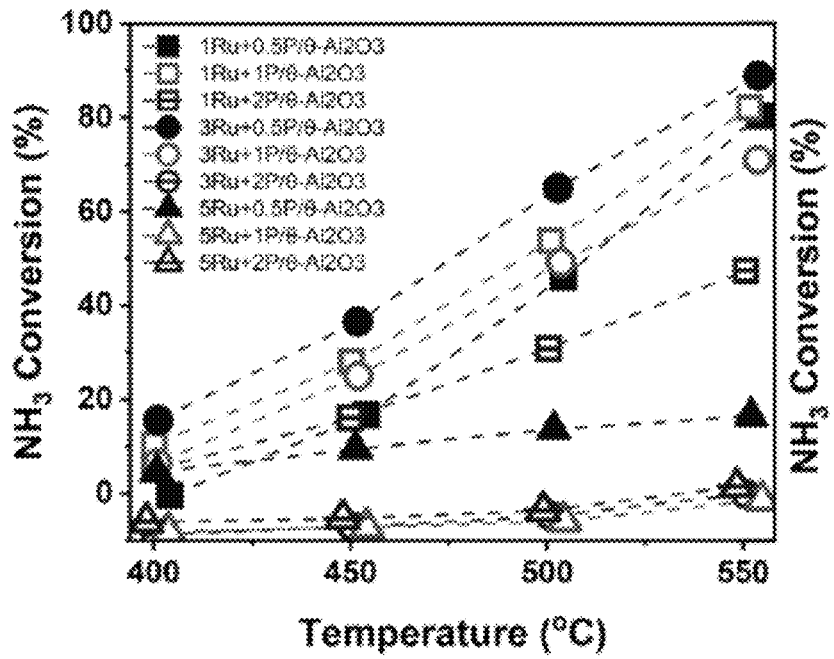
FIGS. 29A-29B show ammonia conversion efficiency of various RuP catalysts that were annealed or reduced, respectively, in accordance with some embodiments.
Figure 29B:
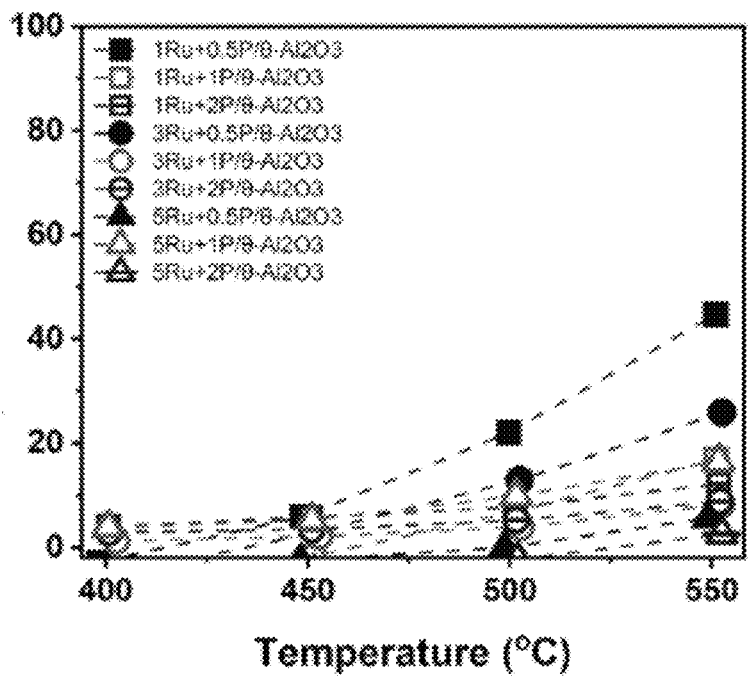

FIGS. 29A-29B show ammonia conversion efficiency of various RuP catalysts that were annealed or reduced, respectively, in accordance with some embodiments. Samples were made by depositing $Ru(NO)(NO_3)_3$ in a theta-aluminum oxide support to achieve a nominal loading of 1-, 3- or 5-wt % Ru in the catalyst. The samples were dried in vacuo, and then $NaH_2PO_2$ was deposited in an aqueous solution to achieve a final Ru:P molar ratio of about 0.5, 1, or 2, to yield nominally $Ru_2P$, RuP and $RuP_2$ phases. The samples were either annealed (under nitrogen) or reduced (under hydrogen) at about 900° C.

As shown in FIG. 29A, among the catalysts tested, (3Ru+0.5P)/$\theta$-$Al_2O_3$ (which may contain $Ru_2P$ phases) had the highest $NH_3$ conversion efficiency from 400° C. to 550° C. Between annealed samples, nominal RuP and $Ru_2P$ phases showed higher ammonia conversion efficiency than nominal $RuP_2$ phases. As shown in FIG. 29B, between reduced samples, $Ru_2P$ phase showed higher ammonia conversion efficiency than other phases.

In some aspects, the present disclosure provides a catalyst. In some cases, the catalyst comprises a support comprising SiC. In some cases, the catalyst comprises a layer provided on the support, wherein the layer comprises $Si_xO_y$. In some cases, the catalyst comprises a layer provided on the support, wherein the layer comprises $SiO_2$. In some cases, the catalyst comprises one or more active metal particles deposited on the layer. In some cases, the support, the layer, and the one or more active metal particles are configured to decompose ammonia to generate at least hydrogen.

In some cases, a partially oxidized SiC support may comprise high thermal conductivity. In some cases, a partially oxidized SiC support may comprise high durability. In some cases, a partially oxidized SiC support may comprise higher metal loading capacity than non-oxidized SiC support.

In some cases, SiC may comprise high thermal conductivity, stability, and/or chemical resistance. In some cases, SiC may comprise relatively low number of metal anchoring sites. In some cases, partially oxidizing the surface of SiC increases anchoring sites for a metal (e.g., Ru). In some cases, the SiC may be doped with Ce to increase the ammonia conversion efficiency of the catalyst.

In some cases, the one or more active metals comprise Ru, Ni, Rh, Ir, Co, Fe, Pt, Cr, Pd, Mo, or Cu. In some cases, the catalyst further comprises one or more dopants. In some cases, the one or more dopants comprises Ce, La, Sm, Pr, Y, Al, Si, Ti, Zr, Ba, Sr, Mg, or Ca. In some cases, at least 90 wt % of the catalyst is larger than 1 mm in at least one dimension.

Figure 30:
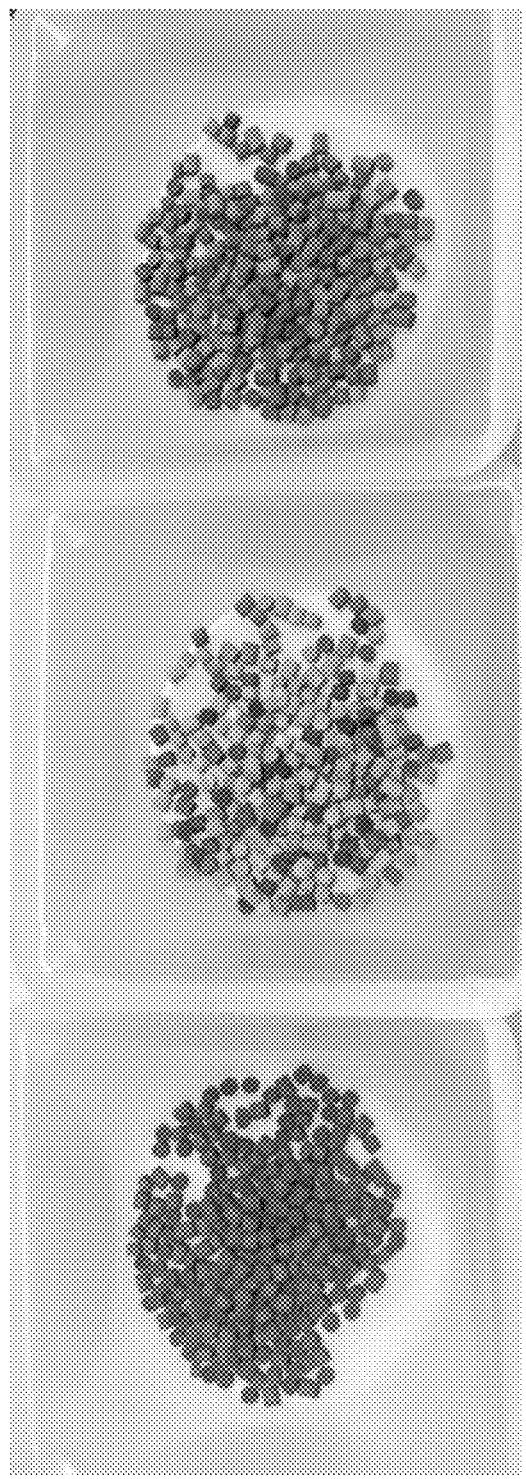
FIG. 30 shows a comparison between neat mesoporous silica pellets (Left), mesoporous silica pellets oxidized at 1050° C. (Middle), and mesoporous silica pellets oxidized at 1200° C. (Right), in accordance with some embodiments.

In some cases, a support may comprise $Si_xO_y$ and/or $Si_xC_y$. In some cases, a support may comprise porous and/or non-porous $Si_xO_y$ and/or $Si_xC_y$. FIG. 30 shows a comparison between neat mesoporous silica pellets (Left), mesoporous silica pellets oxidized at 1050° C. (Middle), and mesoporous silica pellets oxidized at 1200° C. (Right), in accordance with some embodiments. In some cases, mesoporous SiC pellets may be oxidized in a muffle furnace at various temperatures to yield $SiO_2$ phases on the surface of the pellets. In some cases, thermal oxidation of the support may cause white coloration. In some cases, the white coloration may indicate formation of $SiO_2$ on the surface of the support.

Figure 31:
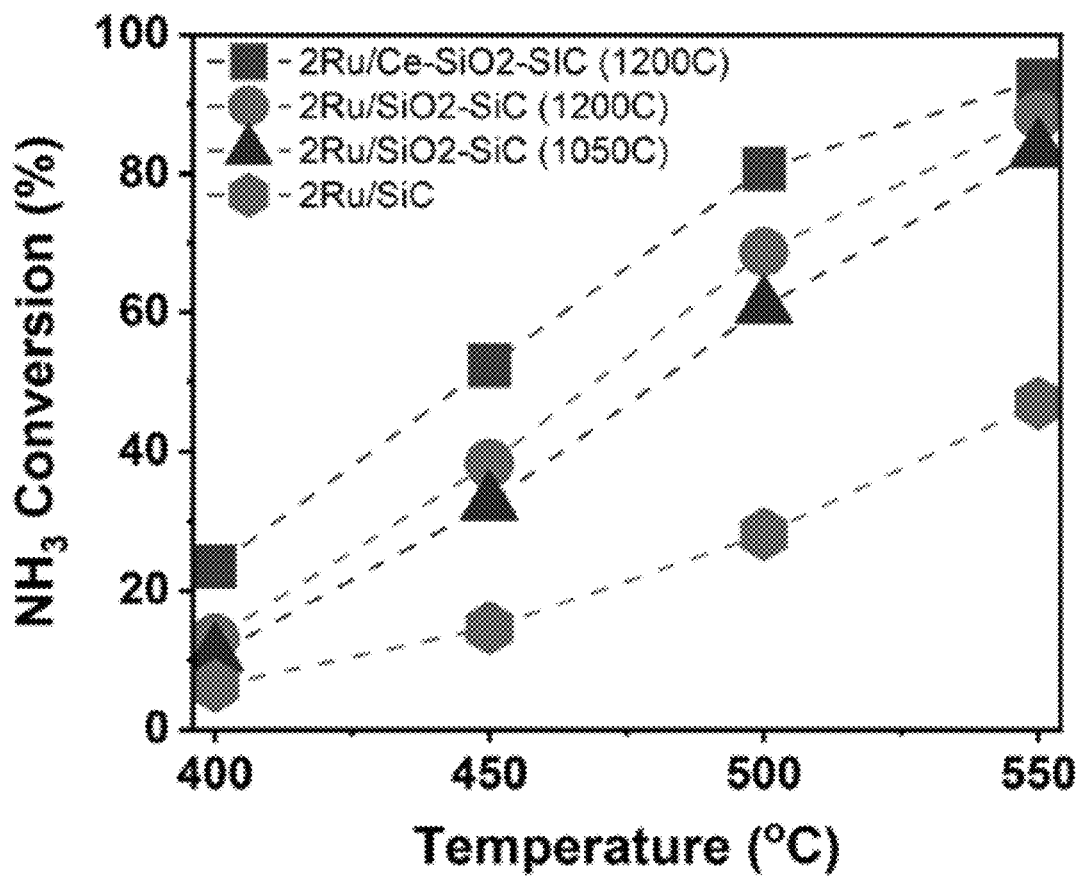
FIG. 31 shows ammonia conversion efficiency of Ru supported on oxidized mesoporous silica doped with cerium, in accordance with some embodiments.

FIG. 31 shows ammonia conversion efficiency of Ru supported on oxidized silicon carbide doped with cerium, in accordance with some embodiments. Ammonia was catalyzed by being applied to the catalyst with $P_{NH3}$=1 atm and with space velocity=10000 $mL_{NH3}$ $g_{cat}^{-1}$ $hr^{-1}$.

In some cases, thermal degradation of a catalyst may cause by formation of hotspots, agglomeration of catalyst, and non-uniform ammonia conversion. In some cases, low thermal conductivity of catalyst may cause the thermal degradation, which can cause formation of hotspots, agglomeration of catalyst, and/or non-uniform ammonia decomposition reaction. In some cases, high thermal conductivity of a catalyst may reduce the magnitude or the risk of one or more thermal degradation mechanisms. In some cases, a high thermal conductivity catalyst may comprise structured catalysts and/or bare metal. For example, the structured catalysts may comprise a thin film, a monolith, a foam, a reactor wall, a heating element, one or more wires, a mesh, or a porous solid material form factor. In some cases, a high thermal conductivity catalyst may comprise a high thermal conductivity support. In some cases, other challenges in catalyst design may comprise overcoming low ammonia conversion efficiency, durability, and loading capacity of catalysts.

In some aspects, the present disclosure provides an ammonia decomposition method using any of the aforementioned catalysts disclosed herein to generate at least hydrogen. For example, decomposing ammonia using a catalyst comprising Ru as the active metal and K as the promoter (e.g., with a molar ratio of Ru to K being 1:1) may convert 98% of the ammonia at a temperature of about 500° C. (see, e.g., FIG. 23).

LIST OF EMBODIMENTS

The following list of embodiments of the invention are to be considered as disclosing various features of the invention, which features can be considered to be specific to the particular embodiment under which they are discussed, or which are combinable with the various other features as listed in other embodiments. Thus, simply because a feature is discussed under one particular embodiment does not necessarily limit the use of that feature to that embodiment.

Embodiment 1. A method for fabricating a catalyst for ammonia processing or decomposition, comprising: (a) providing a catalyst support; (b) thermally or chemically processing the catalyst support to alter a pore characteristic of the catalyst support; (c) depositing a composite support material on the catalyst support, wherein the composite support material comprises a morphology or a surface chemistry or property; and (d) depositing one or more active metals on at least one of the composite support material and the catalyst support, wherein the one or more active metals comprise one or more nanoparticles configured to conform to the morphology or the surface chemistry or property of the composite support material when subjected to a thermal or chemical treatment, thereby optimizing one or more active sites on the nanoparticles for ammonia processing or decomposition.

Embodiment 2. The method of embodiment 1, wherein the morphology comprises a pore structure, a pore size, a pore shape, a pore volume, a pore density, a grain structure, a grain size, a grain shape, a crystal structure, a flake size, or a layered structure.

Embodiment 3. The method of embodiment 1, wherein the surface chemistry or property comprises an Arrhenius acidity or basicity, a Lewis acidity or basicity, or a hydrophilicity or hydrophobicity.

Embodiment 4. The method of embodiment 1, wherein thermally or chemically processing the catalyst support comprises subjecting the catalyst support to one or more physical or chemical processes or treatments to optimize one or more pores or a surface chemistry or property of the catalyst support.

Embodiment 5. The method of embodiment 4, wherein optimizing the one or more pores comprises (i) modifying a size of the one or more pores, (ii) modifying a pore volume of the catalyst support, or (iii) modifying a pore density of the catalyst support.

Embodiment 6. The method of embodiment 4, wherein optimizing the surface chemistry or property comprises modifying (i) an Arrhenius acidity or basicity, (ii) a Lewis acidity or basicity, or (iii) a surface hydrophilicity or hydrophobicity.

Embodiment 7. The method of embodiment 1, wherein in (c) the composite support material is deposited using physical vapor deposition or chemical vapor deposition.

Embodiment 8. The method of embodiment 1, wherein in (c) the morphology or the surface chemistry or property of the composite support material conforms to a morphology or a surface chemistry or property of the catalyst support.

Embodiment 9. The method of embodiment 1, wherein the (d) the one or more active metals are deposited using physical vapor deposition or chemical vapor deposition.

Embodiment 10. The method of embodiment 1, wherein (d) further comprises thermally or chemically activating the one or more active metals.

Embodiment 11. The method of embodiment 10, wherein thermally or chemically activating the one or more active metals induces a growth of one or more nanoparticles of the active metals.

Embodiment 12. The method of embodiment 11, wherein the one or more nanoparticles are configured to grow while conforming to the morphology or the surface chemistry or property of the composite support material when thermally or chemically activated.

Embodiment 13. The method of embodiment 1, further comprising promoting the catalyst with one or more promoters to modify or optimize a morphology, an active site, an electron density, or an electron state of the catalyst.

Embodiment 14. The method of embodiment 10, wherein the one or more promoters comprise sodium (Na), potassium (K), rubidium (Rb), cesium (Cs), magnesium (Mg), Calcium (Ca), Strontium (Sr), or Barium (Ba).

Embodiment 15. The method of embodiment 1, wherein the one or more active metals comprise ruthenium (Ru), nickel (Ni), rhodium (Rh), iridium (Ir), cobalt (Co), iron (Fe), platinum (Pt), chromium (Cr), palladium (Pd), or copper (Cu).

Embodiment 16. The method of embodiment 1, wherein the catalyst support comprises aluminum oxide ($Al_2O_3$), magnesium oxide (MgO), cerium dioxide ($CeO_2$), silicon dioxide ($SiO_2$), yttrium oxide ($Y_2O_3$), one or more zeolites, or titanium dioxide ($TiO_2$).

Embodiment 17. The method of embodiment 1, wherein the composite support material comprises a carbon-based material, a boron-based material, or a metal oxide.

Embodiment 18. The method of embodiment 17, wherein the carbon-based material comprises graphite, activated carbon (AC), one or more carbon nanotubes (CNT), one or more carbon nanofibers (CNF), graphene oxide (GO), one or more carbon nanoribbons, or reduced graphene oxide (rGO).

Embodiment 19. The method of embodiment 17, wherein the boron-based material comprises hexagonal boron nitride (hBN), boron nitride nanotubes (BNNT), or boron nitride nanosheets (BNNS).

Embodiment 20. The method of embodiment 17, wherein the metal oxide comprises titanium dioxide ($TiO_2$), magnesium oxide (MgO), lanthanum oxide ($La_2O_3$), cerium dioxide ($CeO_2$), yttrium oxide ($Y_2O_3$), one or more $CeO_2$ nanotubes, mesoporous silica, or zirconium dioxide ($ZrO_2$).

Embodiment 21. The method of embodiment 1, further comprising thermally or chemically treating a surface of the catalyst support material to optimize a pore structure or a surface chemistry or property of the catalyst support material.

Embodiment 22. The method of embodiment 1, wherein one or more ammonia molecules are configured to bind or attach to the one or more active sites on the active metals for decomposition of the one or more ammonia molecules.

Embodiment 23. The method of embodiment 22, wherein the positions, orientations, and/or density of the one or more active sites are determined based at least in part on the morphology and/or surface chemistry or property.

Embodiment 24. The method of embodiment 1, wherein the catalyst support comprises a bead, a pellet, a powder, a thin film, a monolith, a foam, or a porous solid material form factor.

Embodiment 25. The method of embodiment 1, wherein the pore characteristic comprises a pore structure, a pore size, a pore shape, a pore volume, or a pore density.

Embodiment 26. The method of embodiment 1, wherein (b) comprises altering a pore density of the catalyst support.

Embodiment 27. The method of embodiment 26, wherein (b) comprises increasing the pore density of the catalyst support.

Embodiment 28. A catalyst for ammonia processing, comprising: a catalyst support comprising one or more modified pore characteristics generated by thermal or chemical processing of the catalyst support; a composite support material provided on the catalyst support, wherein the composite support material comprises a morphology or a surface chemistry or property; and one or more active metals provided on or embedded in at least one of the composite support material and the catalyst support, wherein the one or more active metals comprise one or more nanoparticles configured to conform to the morphology or the surface chemistry or property of the composite support material when thermally or chemically activated, thereby optimizing one or more active sites on the nanoparticles for ammonia processing or decomposition.

Embodiment 29. The catalyst of embodiment 28, wherein the morphology comprises a pore structure, a pore size, a pore shape, a pore volume, a pore density, a grain structure, a grain size, a grain shape, a crystal structure, a flake size, or a layered structure.

Embodiment 30. The catalyst of embodiment 28, where the surface chemistry or property comprises an Arrhenius acidity or basicity, a Lewis acidity or basicity, or a hydrophilicity or hydrophobicity.

Embodiment 31. The catalyst of embodiment 28, wherein the catalyst support comprises one or more properties or characteristics that are optimizable using one or more physical or chemical processes.

Embodiment 32. The catalyst of embodiment 31, wherein the one or more properties or characteristics comprise a morphology or a surface chemistry or property of the catalyst support.

Embodiment 33. The catalyst of embodiment 32, wherein the morphology comprises a pore structure, a pore size, a pore shape, a pore volume, a pore density, a grain structure, a grain size, a grain shape, a crystal structure, a flake size, or a layered structure.

Embodiment 34. The catalyst of embodiment 32, wherein the surface chemistry or property comprises an Arrhenius acidity or basicity, a Lewis acidity or basicity, or a hydrophilicity or hydrophobicity.

Embodiment 35. The catalyst of embodiment 28, wherein the composite support material is deposited using physical vapor deposition or chemical vapor deposition.

Embodiment 36. The method of embodiment 28, wherein the morphology or the surface chemistry or property of the composite support material conforms to a morphology or a surface chemistry or property of the catalyst support.

Embodiment 37. The catalyst of embodiment 28, wherein the one or more active metals are deposited using physical vapor deposition or chemical vapor deposition.

Embodiment 38. The catalyst of embodiment 28, wherein the one or more active metals are configured to conform to the morphology or the surface chemistry or property of the composite support material when thermally or chemically activated.

Embodiment 39. The catalyst of embodiment 38, wherein the one or more active metals are configured to grow when thermally or chemically activated.

Embodiment 40. The catalyst of embodiment 39, wherein the one or more nanoparticles are configured to grow while conforming to the morphology or the surface chemistry or property of the composite support material.

Embodiment 41. The catalyst of embodiment 28, wherein the catalyst is promoted with one or more promoters.

Embodiment 42. The catalyst of embodiment 41, wherein the one or more promoters comprise Na, K, Rb, Cs, Mg, Ca, Sr, or Ba.

Embodiment 43. The catalyst of embodiment 28, wherein the one or more active metals comprise Ru, Ni, Rh, Ir, Co, Fe, Pt, Cr, Pd, or Cu.

Embodiment 44. The catalyst of embodiment 28, wherein the catalyst support comprises $Al_2O_3$, MgO, $CeO_2$, $SiO_2$, $Y_2O_3$, one or more zeolites, or $TiO_2$.

Embodiment 45. The catalyst of embodiment 28, wherein the composite support comprises a carbon-based material, a boron-based material, or a metal oxide.

Embodiment 46. The catalyst of embodiment 45, wherein the carbon-based material comprises graphite, activated carbon (AC), one or more carbon nanotubes (CNT), one or more carbon nanofibers (CNF), graphene oxide (GO), one or more carbon nanoribbons, or reduced graphene oxide (rGO).

Embodiment 47. The catalyst of embodiment 45, wherein the boron-based material comprises hexagonal boron nitride (hBN), boron nitride nanotubes (BNNT), or boron nitride nanosheets (BNNS).

Embodiment 48. The catalyst of embodiment 45, wherein the metal oxide comprises $TiO_2$, MgO, $La_2O_3$, $CeO_2$, $Y_2O_3$, one or more $CeO_2$ nanotubes, mesoporous silica, or $ZrO_2$.

Embodiment 49. The catalyst of embodiment 28, wherein the morphology or the surface chemistry or property is generated or optimized by thermally or chemically treating a surface of the catalyst support material.

Embodiment 50. The catalyst of embodiment 28, wherein the one or more nanoparticles comprise one or more active sites to which one or more ammonia molecules are configured to attach or bind to for decomposition of the one or more ammonia molecules.

Embodiment 51. The catalyst of embodiment 50, wherein the positions, orientations, or density of the one or more active sites are determined based at least in part on the morphology or surface chemistry or property.

Embodiment 52. The catalyst of embodiment 28, wherein the catalyst support comprises a bead, a pellet, a powder, a thin film, a monolith, a foam, or a porous solid material form factor.

Embodiment 53. A system for fabricating a catalyst for ammonia processing, comprising: a rotatable reaction chamber comprising one or more heating units, wherein the reaction chamber is configured to process one or more catalyst supports to generate one or more optimized catalysts for ammonia processing; and one or more precursor storage chambers in fluid communication with the rotatable reaction chamber, wherein the one or more precursor storage chambers are configured to provide a plurality of precursor materials, wherein the plurality of precursor materials comprise (i) a first precursor material comprising one or more functional materials that provide a platform for nanoparticle growth, (ii) a second precursor material comprising one or more active metal nanoparticles, and (iii) a third precursor material for promoting the one or more active metal nanoparticles.

Embodiment 54. The system of embodiment 53, wherein the one or more heating units are configured to heat the one or more catalyst supports to optimize one or more characteristics or properties of the one or more catalyst supports.

Embodiment 55. The system of embodiment 54, wherein the one or more characteristics or properties comprise a morphology or a surface chemistry or property.

Embodiment 56. The system of embodiment 54, wherein the one or more characteristics or properties comprise a pore size, a pore density, or a pore volume.

Embodiment 57. The system of embodiment 55, wherein the morphology comprises a pore structure, a pore shape, a grain structure, a grain size, a grain shape, a crystal structure, a flake size, or a layered structure.

Embodiment 58. The system of embodiment 55, wherein the surface chemistry or property comprises an Arrhenius acidity or basicity, a Lewis acidity or basicity, or a hydrophilicity or hydrophobicity.

Embodiment 59. The system of embodiment 53, wherein the rotatable reaction chamber comprises one or more inlets for receiving the first precursor material for deposition of a layer of the first precursor material onto a surface of the one or more catalyst supports.

Embodiment 60. The system of embodiment 59, wherein the layer of the first precursor material is deposited using physical vapor deposition or chemical vapor deposition.

Embodiment 61. The system of embodiment 59, wherein a morphology or a surface chemistry or property of the first precursor material conforms to a morphology or a surface chemistry or property of the one or more catalyst supports.

Embodiment 62. The system of embodiment 61, wherein the morphology comprises a pore structure, a pore size, a pore shape, a pore volume, a pore density, a grain structure, a grain size, a grain shape, a crystal structure, a flake size, or a layered structure.

Embodiment 63. The system of embodiment 61, wherein the surface chemistry or property comprises an Arrhenius acidity or basicity, a Lewis acidity or basicity, or a hydrophilicity or hydrophobicity.

Embodiment 64. The system of embodiment 59, wherein the layer of the first precursor material provides a platform for the one or more active metal nanoparticles to grow.

Embodiment 65. The system of embodiment 59, wherein the rotatable reaction chamber is configured to receive a second precursor material for deposition of a layer of the second precursor material onto at least one of (i) the surface of the one or more catalyst supports and (ii) the layer of the first precursor material.

Embodiment 66. The system of embodiment 65, wherein the one or more active metal nanoparticles of the second precursor material are configured to grow on the layer of the first precursor material Embodiment 67. The system of embodiment 66, wherein the one or more active metal nanoparticles are configured to grow according to a morphology or a surface chemistry or property of the first precursor material when thermally or chemically activated.

Embodiment 68. The system of embodiment 65, wherein the layer of the second precursor material is deposited using physical vapor deposition, chemical vapor deposition, vacuum vapor deposition, or incipient wet impregnation.

Embodiment 69. The system of embodiment 67, wherein the morphology comprises a pore structure, a pore size, a pore shape, a pore volume, a pore density, a grain structure, a grain size, a grain shape, a crystal structure, a flake size, or a layered structure.

Embodiment 70. The system of embodiment 67, wherein the surface chemistry or property comprises an Arrhenius acidity or basicity, a Lewis acidity or basicity, or a hydrophilicity or hydrophobicity.

Embodiment 71. The system of embodiment 65, wherein the rotatable reaction chamber is configured to receive a third precursor material for doping or promoting the layer of the first precursor material, the layer of the second precursor material, or the one or more active metal nanoparticles of the second precursor material.

Embodiment 72. The system of embodiment 71, wherein doping comprises impregnation of one or more dopants in the layer of the first precursor material, the layer of the second precursor material, or the one or more active metal nanoparticles for morphology modification, active site modification, electron density modification, or electron state modification.

Embodiment 73. The system of embodiment 72, wherein the one or more promoters comprise Na, K, Rb, Cs, Mg, Ca, Sr, or Ba.

Embodiment 74. The system of embodiment 65, wherein the one or more heating units are configured to heat the catalyst supports comprising (i) the layer of the first precursor material and (ii) the layer of the second precursor material to thermally or chemically activate the one or more active metal nanoparticles to facilitate a growth and a change in the one or more properties or characteristics of the nanoparticles.

Embodiment 75. The system of embodiment 74, wherein the rotatable reaction chamber is configured to provide a reducing environment for thermal or chemical activation of the one or more active metal nanoparticles.

Embodiment 76. The system of embodiment 75, wherein the reducing environment comprises hydrogen or ammonia gas or one or more noble gases.

Embodiment 77. The system of embodiment 53, wherein the one or more active metal nanoparticles comprise Ru, Ni, Rh, Ir, Co, Fe, Pt, Cr, Pd, or Cu.

Embodiment 78. The system of embodiment 53, wherein the catalyst support comprises $Al_2O_3$, MgO, $CeO_2$, $SiO_2$, $Y_2O_3$, one or more zeolites, or $TiO_2$.

Embodiment 79. The system of embodiment 53, wherein the one or more functional materials comprise a carbon-based material, a boron-based material, or a metal oxide.

Embodiment 80. The catalyst of embodiment 79, wherein the carbon-based material comprises graphite, activated carbon (AC), one or more carbon nanotubes (CNT), one or more carbon nanofibers (CNF), graphene oxide (GO), one or more carbon nanoribbons, or reduced graphene oxide (rGO).

Embodiment 81. The catalyst of embodiment 79, wherein the boron-based material comprises hexagonal boron nitride (hBN), boron nitride nanotubes (BNNT), or boron nitride nanosheets (BNNS).

Embodiment 82. The catalyst of embodiment 79, wherein the metal oxide comprises $TiO_2$, MgO, $La_2O_3$, $CeO_2$, $Y_2O_3$, one or more $CeO_2$ nanotubes, mesoporous silica, or $ZrO_2$.

Embodiment 83. The system of embodiment 53, wherein the rotatable reaction chamber is in fluid communication with one or more gas sources comprising a reactive gas, hydrogen gas, or one or more noble gases.

Embodiment 84. The system of embodiment 83, wherein the reactive gas is usable to chemically modify or optimize one or more pores of the catalyst support.

Embodiment 85. The system of embodiment 83, wherein the hydrogen gas and the one or more noble gases are usable to provide a reducing environment during a thermal or chemical activation of the one or more active metal nanoparticles.

Embodiment 86. The system of embodiment 53, further comprising one or more mass flow controllers for controlling a flow of fluid or materials into or out of the rotatable reaction chamber.

Embodiment 87. The system of embodiment 53, further comprising a vacuum pump fluidly connected to the rotatable reaction chamber to provide a vacuum environment in the rotatable reaction chamber.

Embodiment 88. The system of embodiment 53, further comprising an additional heating unit for heating or pre-heating the plurality of precursor materials.

Embodiment 89. A method for fabricating a catalyst for ammonia processing, comprising: (a) providing an alumina carrier; (b) depositing one or more metal salts or metal salt hydrates on a surface of the alumina carrier; (c) calcining the alumina carrier and/or the one or more metal salts or metal salt hydrates deposited thereon to generate a catalyst support comprising an alumina-supported mixed oxide structure; (d) depositing a ruthenium precursor on the catalyst support; and (e) reducing the ruthenium precursor to generate an optimized catalyst comprising one or more ruthenium nanoparticles configured to facilitate ammonia decomposition.

Embodiment 90. The method of embodiment 89, further comprising, subsequent or prior to (e), adding one or more promoters to further enhance catalyst activity.

Embodiment 91. The method of embodiment 90, wherein the one or more promoters comprise Na, K, Rb, Cs, Mg, Ca, Sr, or Ba.

Embodiment 92. The method of embodiment 90, wherein a molar ratio of the one or more promoters to ruthenium is from about 1:1 to about 10:1, wherein the ruthenium is derived from the reduction of the ruthenium precursor in (e).

Embodiment 93. The method of embodiment 89, wherein the ruthenium precursor comprises $Ru(NO)(NO_3)_3$, $RuCl_3$, $Ru_3(CO)_{12}$, or any combination thereof.

Embodiment 94. The method of embodiment 89, wherein the alumina carrier comprises a porous solid material.

Embodiment 95. The method of embodiment 89, wherein the alumina carrier comprises a bead, a pellet, a powder, a monolith, a foam, or any combination thereof.

Embodiment 96. The method of embodiment 95, wherein the bead or the pellet has (i) a diameter ranging from about 0.1 millimeters (mm) to about 10 mm and/or (ii) a surface area per unit mass ranging from about 50 $m^2/g$ to about 500 $m^2/g$.

Embodiment 97. The method of embodiment 89, wherein in (e), the ruthenium precursor is reduced at a temperature ranging from about 500 degrees Celsius to about 1200 degrees Celsius.

Embodiment 98. The method of embodiment 89, wherein the alumina support comprises a gamma-alumina phase or an alpha-alumina phase or a theta-alumina phase or a delta-alumina phase or an eta-alumina phase or any combination thereof.

Embodiment 99. The method of embodiment 89, wherein the one or more metal salts or metal salt hydrates comprise lanthanum.

Embodiment 100. The method of embodiment 89, wherein in (c), the calcined alumina support comprises lanthanum in a concentration that ranges from about 5 mol % of lanthanum to about 25 mol % of lanthanum.

Embodiment 101. The method of embodiment 89, further comprising doping the alumina support with one or more dopants to yield a more active catalyst with enhanced catalytic activity.

Embodiment 102. The method of embodiment 101, wherein the one or more dopants comprise cerium.

Embodiment 103. The method of embodiment 89, wherein the catalyst or a portion thereof comprises a mixed oxide structure.

Embodiment 104. The method of embodiment 103, wherein the mixed oxide structure comprises a mixture of La, Ce, and oxygen.

Embodiment 105. The method of embodiment 104, wherein the mixture of La and Ce comprises a molar ratio of La to Ce that ranges from about 90:10 to about 50:50.

Embodiment 106. The method of embodiment 89, wherein in (e), the reduction is performed for a time period ranging from about 2 hours to about 168 hours.

Embodiment 107. The method of embodiment 89, wherein in (e), the reduction is performed at a temperature ranging from about 500 degrees Celsius to about 1200 degrees Celsius.

Embodiment 108. The method of embodiment 89, wherein an incorporation amount of Ru in the catalyst ranges from about 0.5 wt % to about 10 wt %.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method of ammonia decomposition comprising:
   contacting a catalyst with ammonia at a temperature ranging from about 300° C. to about 600° C. to generate hydrogen and nitrogen at an ammonia conversion efficiency from about 70% to about 99%, wherein the catalyst comprises:
   a support comprising zirconium and oxygen;
   a layer adjacent to the support, wherein the layer comprises $Zr_aO_b$ doped with cerium (Ce) and oxygen (O), wherein 'a' and 'b' are numbers greater than zero, and wherein 'a' is less than 'b', wherein a molar ratio of Ce to Zr in the layer ranges from about 1:25 to 1:5, wherein the layer comprises an amorphous structure, a monoclinic structure, or a tetragonal network structure of $(Zr:Ce)O_2$;
   wherein the layer comprises $Ce^{3+}$ ions and $Ce^{4+}$ ions, wherein a ratio of the $Ce^{3+}$ ions to the $Ce^{4+}$ ions ranges from about 0.3:1 to about 0.9:1; and
   one or more active metal particles adjacent to the layer, wherein the one or more active metal particles are selected from the group consisting of Ru, Ni, Rh, Ir, Co, Fe, Pt, Cr, Mo, Pd, and Cu, wherein a concentration of the active metal particles ranges from 0.5 wt % to 10 wt %.

2. The method of claim 1, wherein the ammonia conversion efficiency is greater than about 90% and the temperature is at least about 500° C.

3. The method of claim 1, further comprising directing at least part of the hydrogen to one or more fuel cells to generate electricity.

4. The method of claim 3, wherein the one or more fuel cells comprise a Proton Exchange Membrane Fuel Cell (PEMFC), a Polymer Electrolyte Membrane (PEM) fuel cell, or a Solid Oxide Fuel Cell (SOFC).

5. The method of claim 1, wherein a ratio of the $Ce^{3+}$ ions to the $Ce^{4+}$ ions ranges from about 0.4:1 to about 0.8:1.

6. The method of claim 1, wherein the support further comprises one or more promoters.

7. The method of claim 6, wherein a molar ratio of the one or more promoters to Ce in the support ranges from about 0.1:1 to about 3:1.

8. The method of claim 7, wherein the one or more promoters are selected from the group consisting of alkali metals and alkaline earth metals.

9. The method of claim 8, wherein the one or more promoters are co-impregnated with the Ce.

10. The catalyst of claim 8, wherein the one or more promoters are selected from the group consisting of K, Cs and Rb.

11. The method of claim 1, wherein the one or more active metal particles are Ru, and wherein the concentration of Ru is at most about 3 wt %.

12. The method of claim 1, wherein the layer comprises $ZrO_2$, and wherein the $ZrO_2$ comprises beads or pellets; wherein the beads or the pellets comprise (i) a diameter ranging from about 0.1 millimeters (mm) to about 10 mm or (ii) a surface area per unit mass ranging from about 50 $m^2/g$ to about 500 $m^2/g$.

13. The method of claim 1, wherein the catalyst is in thermal communication with a combustion heater or electrical heater.

14. The method of claim 1, further comprising the step of heating the catalyst using at least one of an electrical heater or a combustion heater.

15. The method of claim 14, wherein the step of heating the catalyst uses the combustion heater in an autothermal heating process.

* * * * *